United States Patent
Suzuki et al.

(10) Patent No.: US 11,261,043 B2
(45) Date of Patent: Mar. 1, 2022

(54) SHEET PROCESSING DEVICE, SHEET LAMINATOR, IMAGE FORMING APPARATUS, AND IMAGE FORMING SYSTEM

(71) Applicant: Ricoh Company, Ltd., Tokyo (JP)

(72) Inventors: Yoshito Suzuki, Chiba (JP); Tomohiro Furuhashi, Kanagawa (JP); Wataru Takahashi, Tokyo (JP); Sho Asano, Kanagawa (JP); Shinya Monma, Kanagawa (JP); Joji Akiyama, Kanagawa (JP); Wataru Nozaki, Kanagawa (JP); Yohsuke Haraguchi, Kanagawa (JP); Yuji Suzuki, Kanagawa (JP); Yuusuke Shibasaki, Kanagawa (JP); Takuya Morinaga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/307,001

(22) Filed: May 4, 2021

(65) Prior Publication Data
US 2021/0347589 A1   Nov. 11, 2021

(30) Foreign Application Priority Data

May 7, 2020 (JP) .............................. JP2020-082004
May 19, 2020 (JP) .............................. JP2020-087348
Jun. 12, 2020 (JP) .............................. JP2020-102358

(51) Int. Cl.
*B65H 3/06* (2006.01)
*B32B 43/00* (2006.01)
*B32B 37/00* (2006.01)

(52) U.S. Cl.
CPC ....... *B65H 3/0669* (2013.01); *B32B 37/0053* (2013.01); *B32B 43/006* (2013.01);
(Continued)

(58) Field of Classification Search
CPC .... B32B 2037/0069; B32B 2037/0061; B32B 43/006; B32B 37/0053; B65H 3/0669
See application file for complete search history.

(56) References Cited

U.S. PATENT DOCUMENTS 5,217,561 A * 6/1993 Ueda ..................... B32B 37/226
156/359
6,893,521 B2 * 5/2005 Sasaki ................... B32B 37/182
156/354

(Continued)

FOREIGN PATENT DOCUMENTS

| JP | 9-1 64593 | 6/1997 |
| JP | 9-150456 | 6/1997 |
| JP | 2006-160429 | 6/2006 |

*Primary Examiner* — Marc C Howell
*Assistant Examiner* — Abhishek A Patwardhan
(74) *Attorney, Agent, or Firm* — Xsensus LLP

(57) ABSTRACT

A sheet processing device sandwiches a sheet-shaped medium in a two-ply sheet in which two sheets are overlaid and partially bonded. The sheet processing device includes a separator, a conveyor, and a switching member. The separator separates the two sheets of the two-ply sheet. The conveyor is disposed downstream from the separator in a sheet conveyance direction and conveys the two-ply sheet. The switching member is disposed downstream from the conveyor in the sheet conveyance direction. The switching member switches a conveyance path of the two-ply sheet to convey the two-ply sheet to a fixing path on which fixing processing is performed on the two-ply sheet or a non-fixing path on which no fixing processing is performed on the two-ply sheet.

10 Claims, 53 Drawing Sheets

(52) U.S. Cl.
CPC ............... *B32B 2037/0061* (2013.01); *B32B 2037/0069* (2013.01)

(56) References Cited

U.S. PATENT DOCUMENTS

| | | | |
|---|---|---|---|
| 7,946,326 B2* | 5/2011 | Lee | B32B 41/00 156/367 |
| 2005/0079968 A1* | 4/2005 | Trovinger | B65H 45/142 493/356 |
| 2017/0021603 A1* | 1/2017 | Kikuchi | B32B 37/182 |
| 2019/0028401 A1 | 9/2019 | Shinji et al. | |
| 2019/0276263 A1 | 9/2019 | Hidaka et al. | |
| 2019/0284008 A1 | 9/2019 | Sakano et al. | |
| 2019/0284011 A1 | 9/2019 | Furuhashi et al. | |
| 2019/0284012 A1 | 9/2019 | Yoneyama et al. | |
| 2019/0367317 A1 | 12/2019 | Haraguchi et al. | |
| 2020/0140222 A1 | 5/2020 | Takahashi et al. | |
| 2020/0239265 A1 | 7/2020 | Suzuki et al. | |
| 2020/0247107 A1 | 8/2020 | Morinaga et al. | |
| 2020/0247636 A1 | 8/2020 | Furuhashi et al. | |
| 2020/0270093 A1 | 8/2020 | Suzuki et al. | |
| 2020/0307936 A1 | 10/2020 | Sugawara et al. | |
| 2020/0307944 A1 | 10/2020 | Shibasaki et al. | |
| 2020/0307945 A1 | 10/2020 | Mori et al. | |
| 2020/0338877 A1 | 10/2020 | Takahashi et al. | |
| 2020/0341414 A1 | 10/2020 | Watanabe et al. | |
| 2020/0385231 A1 | 12/2020 | Kunieda et al. | |
| 2020/0407187 A1 | 12/2020 | Hidaka et al. | |
| 2021/0039900 A1 | 2/2021 | Shimazu et al. | |
| 2021/0039916 A1 | 2/2021 | Sugiyama et al. | |

* cited by examiner

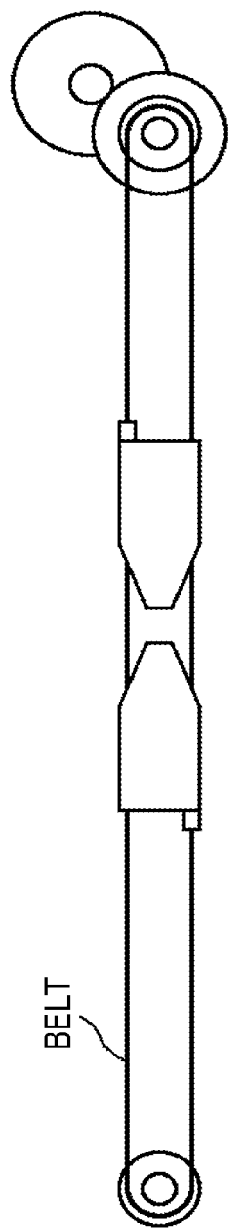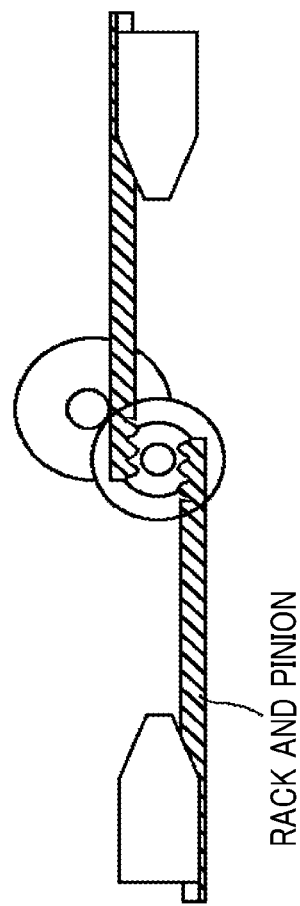

BELT

RACK AND PINION

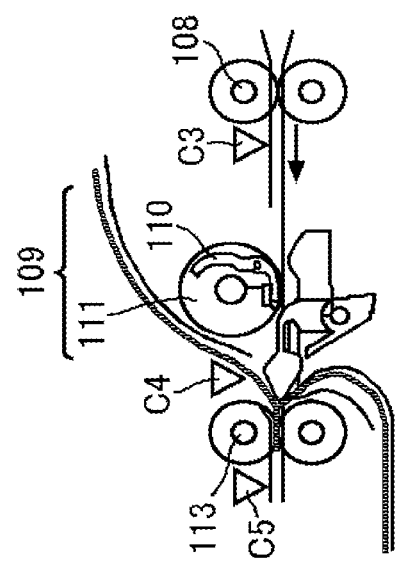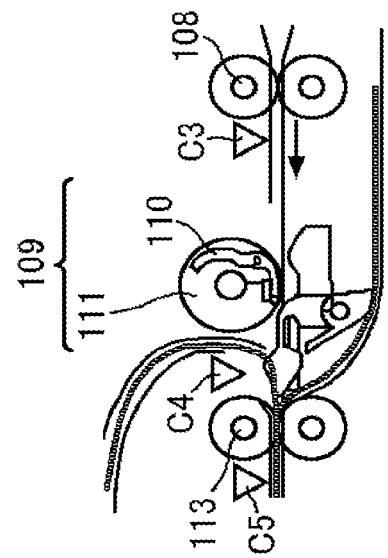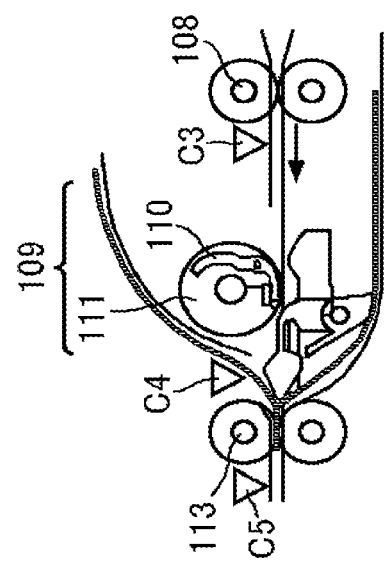

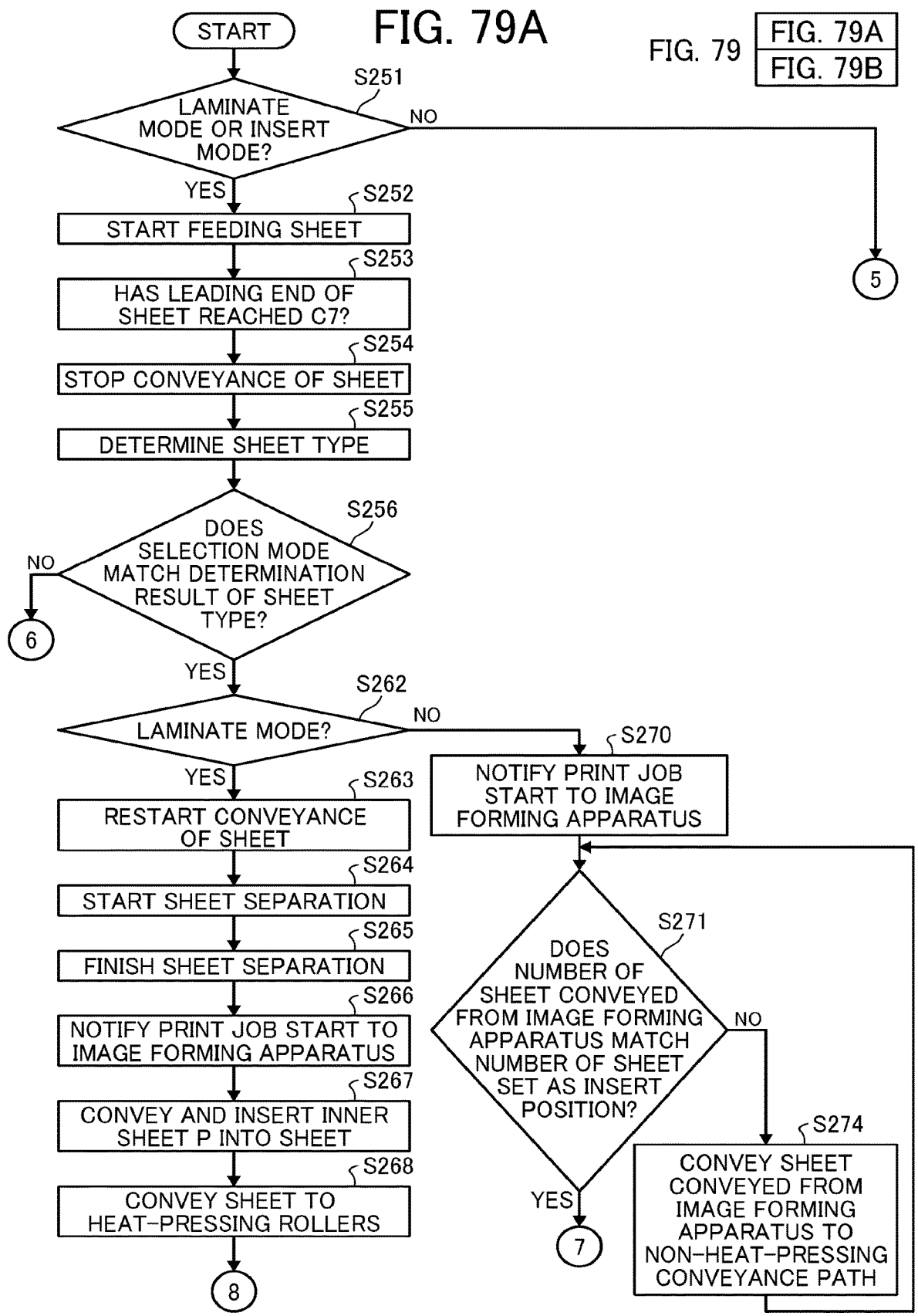

SHEET PROCESSING DEVICE, SHEET LAMINATOR, IMAGE FORMING APPARATUS, AND IMAGE FORMING SYSTEM

CROSS-REFERENCE TO RELATED APPLICATIONS

This patent application is based on and claims priority pursuant to 35 U.S.C. § 119(a) to Japanese Patent Application No. 2020-082004, filed on May 7, 2020, No. 2020-087348, filed on May 19, 2020, and No. 2020-102358, filed on Jun. 12, 2020, in the Japan Patent Office, the entire disclosure of each of which is hereby incorporated by reference herein.

BACKGROUND

Technical Field

This disclosure relates to a sheet processing device, a sheet laminator, an image forming apparatus, and an image forming system.

Related Art

There is known a lamination technology of inserting an inner sheet (e.g., paper or photo) between a two-ply lamination sheet or lamination film (e.g., a lamination pouch or lamination folder) and applying heat and pressure to the two-ply lamination sheet to bond the two-ply lamination sheet. The two-ply sheet is made of two sheets (plies) bonded (sealed) on one side as if one sheet is folded.

In a laminate processing machine, for example, an operation of sandwiching inner sheet (paper, photograph or the like) between films is manually performed one by one. However, it is troublesome to peel off a film by hand due to poor slip due to the presence of an adhesive layer on the inside of the film, and it is also troublesome to hold a sheet or the like to be held in an accurate position after peeling off. Further, when one sheet was prepared and set in the processing machine (laminator), the laminate processing took 30 to 60 seconds, so it is necessary to wait until the next process. As a result, a person cannot leave a laminate processing device for a long time even when the person laminates only several tens of sheets. The person needs to repeat works of sandwiching an inner sheet, set a lamination sheet and performs laminate processing, and sandwiching the sheet while waiting. There was a problem that the user had to repeat the work, which required time and manpower. Further, if it is attempted to avoid it, a dedicated laminator device using a roll film is needed. However, such a dedicated laminator device is very expensive (hundreds of thousands of yen to millions of yen).

Further, in a film separating device that automatically separates a film, it is desired to perform troublesome pinching work by automation. However, there is a demand that the laminate processing be carried out even on an offline machine in consideration of productivity.

SUMMARY

In an aspect of the present disclosure, there is provided a sheet processing device that sandwiches a sheet-shaped medium in a two-ply sheet in which two sheets are overlaid and partially bonded. The sheet processing device includes a separator, a conveyor, and a switching member. The separator separates the two sheets of the two-ply sheet. The conveyor is disposed downstream from the separator in a sheet conveyance direction and conveys the two-ply sheet. The switching member is disposed downstream from the conveyor in the sheet conveyance direction. The switching member switches a conveyance path of the two-ply sheet to convey the two-ply sheet to a fixing path on which fixing processing is performed on the two-ply sheet or a non-fixing path on which no fixing processing is performed on the two-ply sheet.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIGS. 37A and 37B are schematic views, each illustrating an example of the drive configuration of the separation claw illustrated in FIG. 36;

FIG. 50 including

FIGS. 68A, 68B, and 68C are schematic views, each illustrating a sheet guide passage of two sheets separated from a lamination sheet, according to a variation of the present disclosure;

FIG. 72 including

FIGS. 79A and 79B is a flowchart illustrating a series of operations in an image forming system from the selection of laminate processing or insert processing to the ejection of a sheet to a post-processing device.

Figure 1:
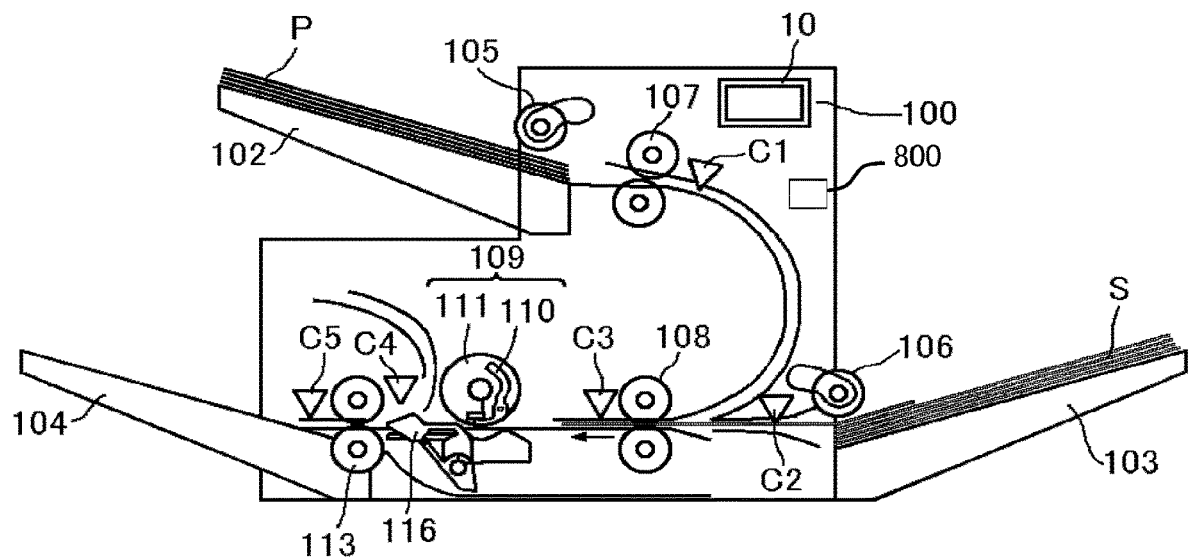
FIG. 1 is a schematic view illustrating an overall configuration of a sheet processing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

For a lamination sheet in which two sheets are connected at one side, for example, a laminator separates the two sheets from each other and inserts an inner sheet between the two sheets. Since the sheets can be separated off automatically, the work efficiency of the user is enhanced. However, the user's demand is not met that the laminate processing be performed on another offline machine in consideration of productivity.

According to at least one embodiment of the present disclosure described below, in a sheet processing device in which a sheet-shaped medium is sandwiched between two stacked sheets, the productivity of the sheet processing work can be enhanced.

In such a laminator, when the laminate processing is to be performed even on an offline machine in consideration of productivity, for example, it is conceivable that a sheet ejection destination having a fixing mechanism, a sheet ejection destination having no fixing mechanism, and a mechanism for switching the sheet ejection destinations are disposed downstream of an inner-sheet insertion mechanism, to eject a sheet with an inner sheet inserted without fixing processing. However, providing a plurality of conveyance paths and sheet ejection mechanisms may cause an increase in the cost of the device and an increase in the size of the device.

According to at least one embodiment of the present disclosure described blow, a heat-pressed sheet and a non-heat-pressed sheet are ejected to a common stacker, thus allowing the cost reduction and downsizing of a sheet processing device.

Further, when lamination films are fed from a sheet feeding portion of an image forming apparatus, heat may affect the lamination film passing through a heat fixing device and the films may undesirably stick to each other.

For example, a laminator separates two films of a lamination film that are connected at one side, and inserts an inner sheet between the two films. However, in such a laminator, the lamination film into which the inner sheet is inserted is not ejected without performing laminate processing, and does not have a function as an inserter. Even if this were possible, a film would have to be ejected through a heating section, the film could only be ejected after the heating section had cooled to prevent films from sticking to each other, which would not be easy for the user to operate.

According to at least one embodiment of the present disclosure described below, there can be provided a laminator that has a plurality of post-processing functions, prevents sheets from sticking to each other, and is compact and easy to use.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic view illustrating a general arrangement of a sheet processing device according to one embodiment of the present disclosure. A sheet processing device 100 according to the present embodiment is to separate two sheets (plies) of a two-ply sheet (hereinafter referred to as a lamination sheet S) and to insert and sandwich a sheet-shaped medium (hereinafter referred to as an inner sheet P) between the separated sheets of the two-ply sheet.

The lamination sheet S is a two-ply sheet in which two sheets are overlapped and bonded together at a portion (or a side) of the two-ply sheet. For example, there is a two-ply sheet in which a first side is a transparent sheet such as a transparent polyester sheet and the opposite side is a transparent or opaque sheet and bonded to the other sheet on one side of the two-ply sheet. The two-ply sheet also includes a lamination film.

The inner sheet P is an example of the sheet medium that is inserted into the two-ply sheet. The sheet medium may be, for example, thick paper, postcards, envelopes, plain paper, thin paper, coated paper, art paper, tracing paper, and overhead projector (OHP) transparencies.

As illustrated in FIG. 1, a sheet processing device 100 includes a sheet tray 102, a pickup roller 105, a conveyance roller pair 107, and a path through an inner sheet P is reversed. The sheet tray 102 is a first sheet loader on which inner sheets P are placed. The pickup roller 105 feeds an inner sheet P from the sheet tray 102. The sheet processing device 100 further includes a sheet feed tray 103 and a pickup roller 106. The sheet feed tray 103 is a second sheet loader on which sheets S are placed. The pickup roller 106 feeds a lamination sheet S from the sheet feed tray 103.

The sheet processing device 100 has a sheet feed path and a conveyance path that are different from each other. In order to enhance productivity, the sheet processing device 100 conveys a lamination sheet S in the shortest distance through a straight path for conveying the lamination sheet S to be separated. Since it is necessary to wait until a lamination sheet separating operation is completed, the inner sheet P is separately fed in advance and is made to stand by in a reversible conveyance path in which a standby distance is ensured.

In order to achieve both miniaturization and productivity enhancement, the path from the pickup roller 106 for sheet transfer to an entrance roller pair 108 is shorter than the path from the pickup roller 105 for inner sheet conveyance to the entrance roller pair 108. The paths meet upstream of the entrance roller pair 108.

A lamination sheet S into which an inner sheet has been inserted is ejected and stacked on the sheet ejection tray 104 by an exit roller pair 113 or a roller disposed downstream from the exit roller pair 113. The path for reversing the inner sheet P allows the inner sheet P to be ejected and stacked in the sheet ejection tray 104 in the order of pages stacked in the sheet tray 102.

A conveyance sensor C1 is disposed downstream from the conveyance roller pair 107 in the sheet conveyance direction to detect the conveyance position of an inner sheet P. A conveyance sensor C2 is disposed downstream from the pickup roller 106 in the sheet conveyance direction to detect the conveyance position of a lamination sheet S.

The sheet processing device 100 includes an entrance roller pair 108 as a first conveyor, a winding roller 109 as a rotator, the exit roller pair 113 as a second conveyor, and the sheet ejection tray 104. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing device 100 further includes a separation claw 116 between the winding roller 109 and the exit roller pair 113. The separation claw 116 is movable in the width direction of the lamination sheet S. The separation claw 116 is an example of a separator that separates the lamination sheet S.

A conveyance sensor C3 that detects the positions of a lamination sheet S and an inner sheet P being conveyed is disposed downstream from the entrance roller pair 108 in the sheet conveyance direction. An abnormality detection sensor C4 that detects the state of the lamination sheet S is disposed downstream from the winding roller 109 in the sheet conveyance direction. A conveyance sensor C5 that detects the position of the lamination sheet S being conveyed is disposed downstream from the exit roller pair 113 in the sheet conveyance direction.

The pickup roller 105, the conveyance roller pair 107, the entrance roller pair 108, and the winding roller 109 are examples of a first feeder. The pickup roller 106, the entrance roller pair 108 and the winding roller 109 are examples of a second feeder.

An operation panel 10 is provided on the exterior of the sheet processing device 100. The operation panel 10 serves as a display-operation device to display information of the sheet processing device 100 and receives input of the operation of the sheet processing device 100. The operation panel 10 also serves as a notification device to output a perceptual signal to a user. As an alternative, a notification device other than the operation panel 10 may be separately provided in the sheet processing device 100.

The sheet processing device 100 according to the present embodiment loads lamination sheets S and inner sheets P on separate trays. As a lamination sheet S is conveyed in the sheet processing device 100, the sheet processing device 100 separates and opens the lamination sheet S into two sheets and inserts the inner sheet P into an opening of the lamination sheet S. The exit roller pair 113 ejects and stacks the lamination sheet S, in which the inner sheet P has been inserted, onto the sheet ejection tray 104.

Figure 2:
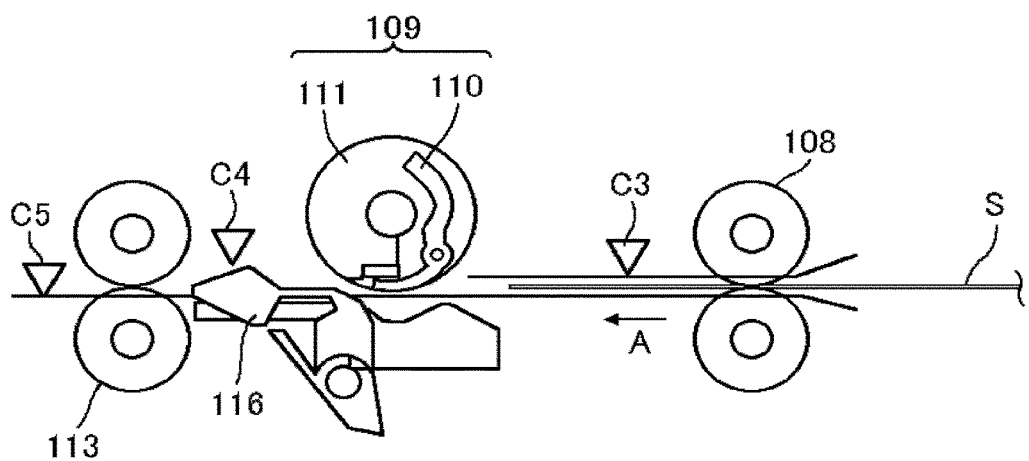
FIG. 2 is a schematic view illustrating a main part of the sheet processing device of FIG. 1.

FIG. 2 is a schematic view illustrating a main part of the sheet processing device of FIG. 1. As illustrated in FIG. 2, each of the entrance roller pair 108 and the exit roller pair 113 is, for example, two rollers paired with each other and driven by a driver such as a motor. The controller 800 controls the driver to control rotations of the entrance roller pair 108 and the exit roller pair 113. The entrance roller pair 108 is driven to rotate in one direction. The exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113. The sheet conveyance direction indicated by arrow A in FIG. 2 is referred to as a forward conveyance direction or a direction A.

The exit roller pair 113 can switch the direction of rotation between the forward direction and the reverse direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction toward the winding roller 109, which is indicated by arrow B in FIG. 4 and a direction opposite to the forward conveyance direction, is referred to as a reverse conveyance direction or a direction B.

The sheet processing device 100 is provided with the winding roller 109 as a rotator and the separation claw 116 that are disposed between the entrance roller pair 108 and the exit roller pair 113. The winding roller 109 is driven by a driver such as a motor to rotate in the forward and reverse directions. The direction of rotation of the winding roller 109 is switchable between the forward direction (clockwise direction) and the reverse direction (counterclockwise direction). The controller 800 controls the driver to control rotations of the winding roller 109 and operations of the separation claw 116.

The winding roller 109 includes a roller 111 and a movable gripper 110 disposed on the roller 111 to grip the lamination sheet S. The movable gripper 110 grips the leading end of the lamination sheet S together with the roller 111. The gripper 110 may be integrated with the outer circumference of the roller 111, or may be a separate component. The controller 800 controls a driver to move the gripper 110.

Next, a description is given of a series of operations performed in the sheet processing device 100, with reference to FIGS. 1 to 14. The series of operations performed by the sheet processing device 100 indicates the operations from separating the lamination sheet S to inserting the inner sheet P into the lamination sheet S. The controller 800 controls the series of operations performed by the sheet processing device 100. In FIGS. 3 to 14, elements identical to those illustrated in FIG. 1 or 2 are given identical reference numerals, and the descriptions thereof are omitted.

In FIG. 1, the lamination sheets S are stacked on the sheet feed tray 103 such that a part of the bonded side of the lamination sheet S is located downstream from the pickup roller 106 in the sheet feed direction (sheet conveyance direction). The sheet processing device 100 picks the lamination sheet S on the sheet feed tray 103 by the pickup roller 106 and conveys the lamination sheet S toward the entrance roller pair 108.

Next, as illustrated in FIG. 2, the entrance roller pair 108 conveys the lamination sheet S toward the winding roller 109. In the sheet processing device 100, the entrance roller pair 108 conveys the lamination sheet S with the bonded end, which is one of four sides of the lamination sheet S, as the downstream side in the forward conveyance direction A as indicated by arrow A in FIG. 2.

Figure 3:
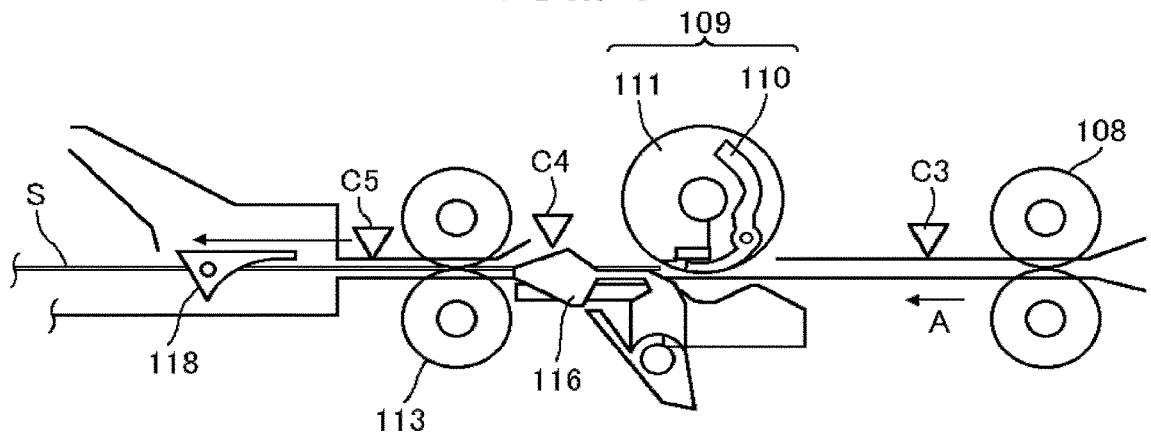
FIG. 3 is a schematic view illustrating the main part of the sheet processing device in a state subsequent to the state in FIG. 2.

Subsequently, as illustrated in FIG. 3, the controller 800 of the sheet processing device 100 temporarily stops conveyance of the lamination sheet S when the trailing end of the lamination sheet S in the forward conveyance direction has passed the winding roller 109. Note that these operations are performed by conveying the lamination sheet S from the conveyance sensor C3 by a specified amount in response to the timing at which the conveyance sensor C3 detected the leading end of the lamination sheet S.

Figure 4:
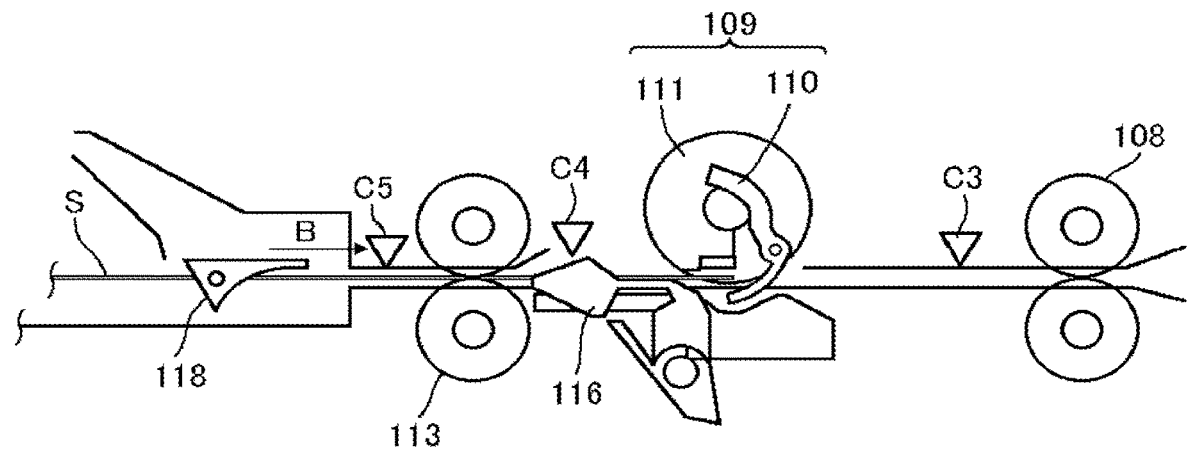
FIG. 4 is a schematic view illustrating the main part of the sheet processing device in a state subsequent to the state in FIG. 3.

Next, as illustrated in FIG. 4, the controller 800 of the sheet processing device 100 causes the gripper 110 to open and the exit roller pair 113 to rotate in the reverse direction to convey the lamination sheet S in the reverse conveyance direction (sheet conveyance direction B) toward the opened portion of the gripper 110.

Figure 5:
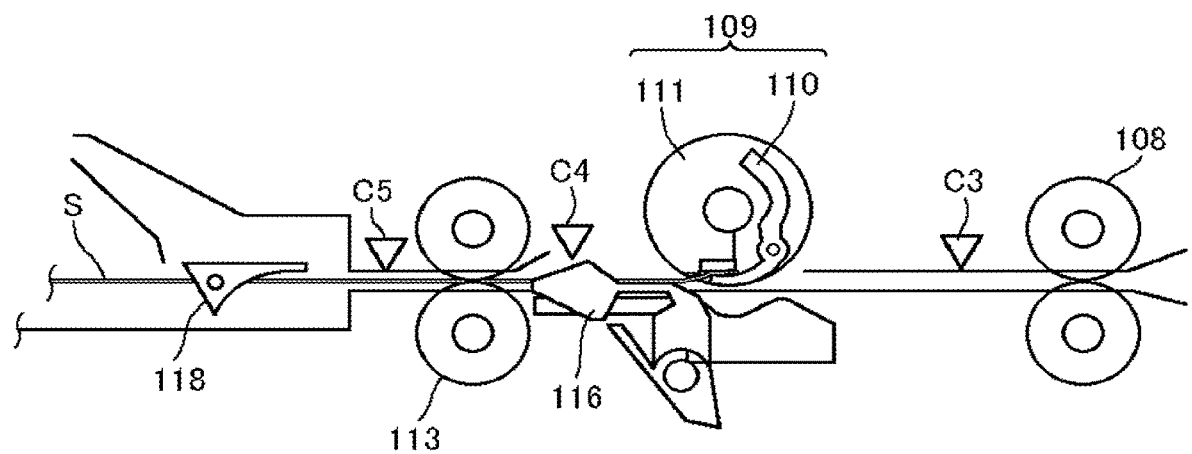
FIG. 5 is a schematic view illustrating the main part of the sheet processing device in a state subsequent to the state in FIG. 4.

Subsequently, as illustrated in FIG. 5, the controller 800 of the sheet processing device 100 causes the exit roller pair 113 to stop rotating to stop conveyance of the lamination sheet S when the end of the lamination sheet S is inserted into the opened portion of the gripper 110 and causes the driver to close the gripper 110 to grip the end of the lamination sheet S. Note that these operations are performed when the lamination sheet S is conveyed by the specified amount.

Figure 6:
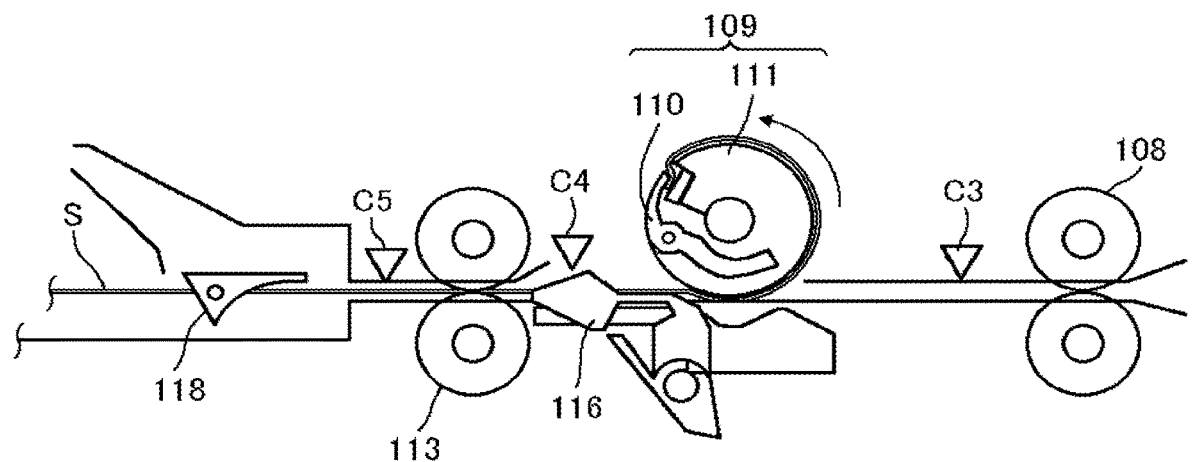
FIG. 6 is a schematic view illustrating the main part of the sheet processing device in a state subsequent to the state in FIG. 5.

Then, as illustrated in FIG. 6, the controller 800 of the sheet processing device 100 causes the driver to rotate the winding roller 109 in the counterclockwise direction in FIG. 6 to wind the lamination sheet S around the winding roller 109. Here, the lamination sheet S is wound around the winding roller 109 from the side where the two sheets of the lamination sheet S are overlapped but not bonded.

Figure 7:
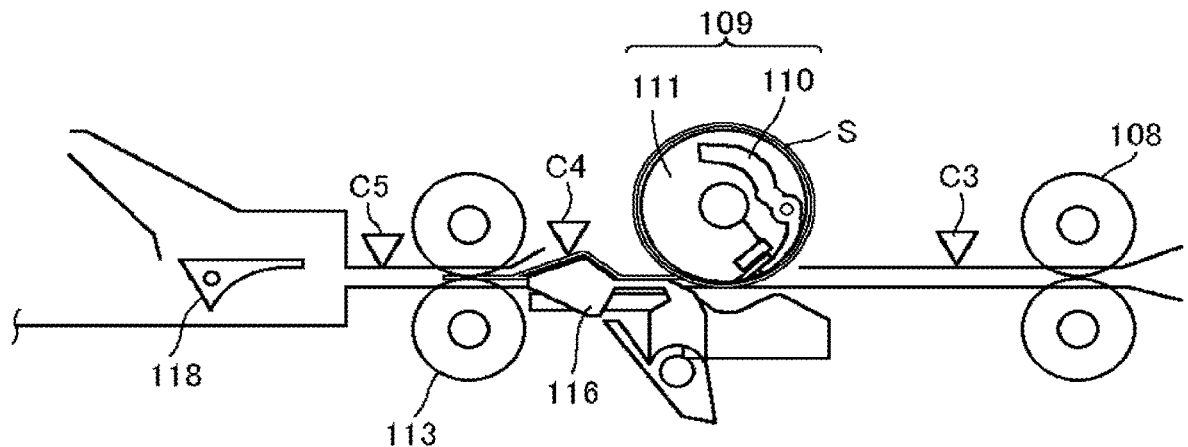
FIG. 7 is a schematic view illustrating the main part of the sheet processing device in a state subsequent to the state in FIG. 6.

As illustrated in FIG. 7, when the lamination sheet S that is the two-ply sheet is wound around the winding roller 109, a winding circumferential length difference is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets constructing the two-ply sheet. As the separation claws 116 are inserted into the space generated as described above, from both sides of the lamination sheet S, the space between the two sheets is reliably maintained. Note that these operations are performed by conveying the lamination sheet S from the conveyance sensor C5 by a specified amount in response to the timing at which the conveyance sensor C5 detected the leading end of the lamination sheet S.

Figure 8:
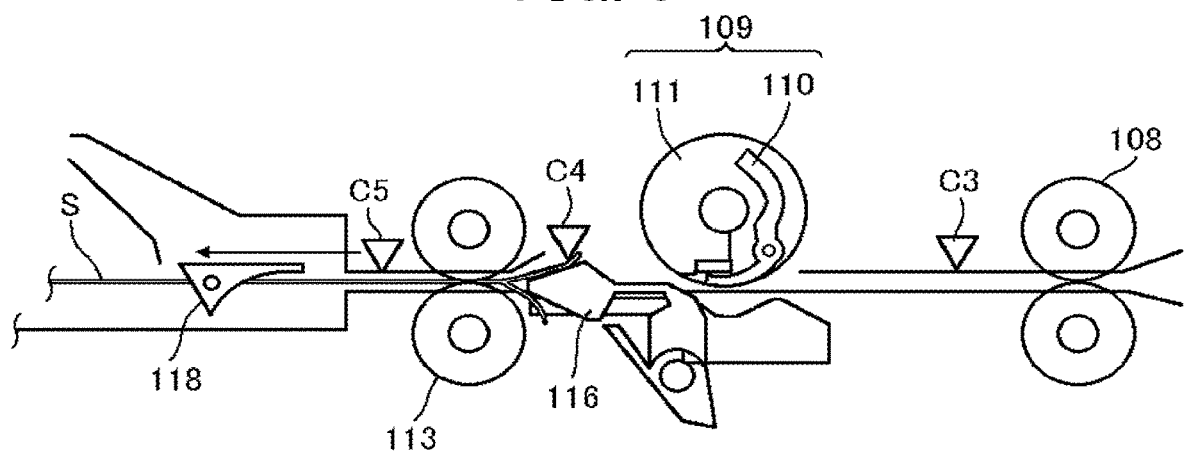
FIG. 8 is a schematic view illustrating the main part of the sheet processing device in a state subsequent to the state in FIG. 7.

With the separation claws 116 inserted in the space in the lamination sheet S, the controller 800 in the sheet processing device 100 causes the driver to rotate the winding roller 109 in the clockwise direction (see FIG. 7). The controller 800 then causes the space generated in the lamination sheet S to shift to the trailing end of the lamination sheet S in the forward conveyance direction (sheet conveyance direction A), as illustrated in FIG. 8. After the winding roller 109 has been rotated by a specified amount, the controller 800 causes the driver to open the gripper 110. As a result, the trailing end of the lamination sheet S is separated into the upper and lower sheets.

In this state, the controller 800 of the sheet processing device 100 causes the driver to temporarily stop the conveyance of the lamination sheet S and to further move the separation claws 116 in the width direction of the lamination sheet S to separate the whole area of the trailing end of the lamination sheet S. Note that these operations are performed by conveying the lamination sheet S from the conveyance sensor C5 by a specified amount in response to the timing at which the conveyance sensor C5 detected the leading end of the lamination sheet S.

Figure 9:
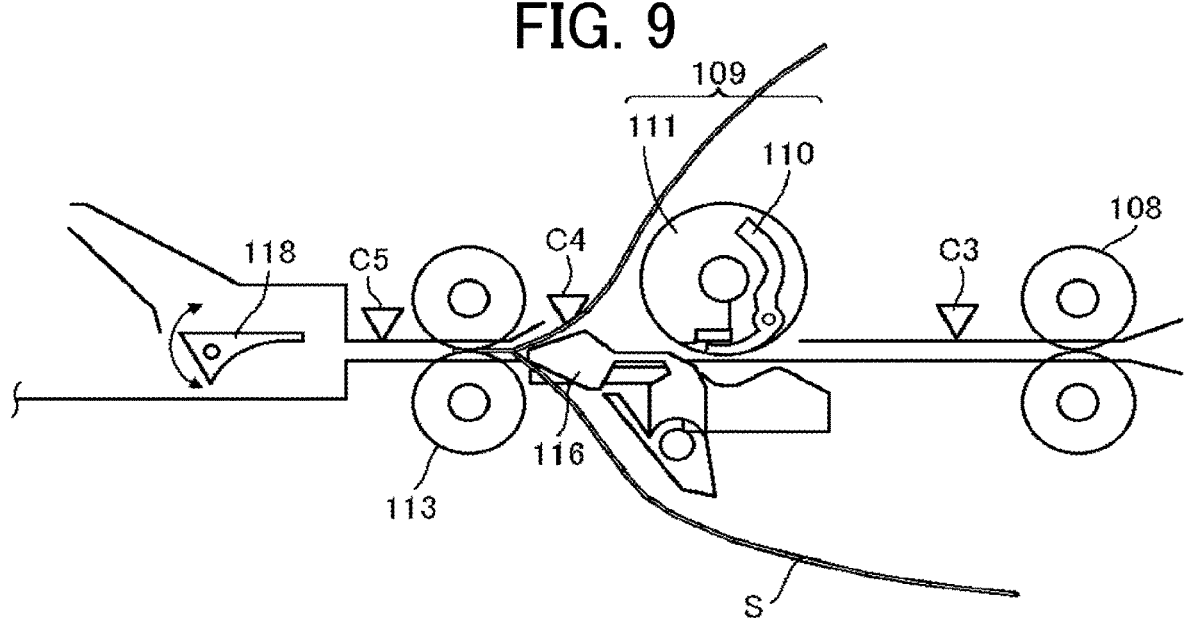
FIG. 9 is a schematic view illustrating the main part of the sheet processing device in a state subsequent to the state in FIG. 8.

In the state illustrated in FIG. 8, as illustrate in FIG. 9, the sheet processing device 100 rotates the exit roller pair 113 counterclockwise to convey the sheet S in the reverse conveyance direction (indicated by arrow B). The branch claw 118 can be switched at the timing at which the leading end of the sheet S passes through the conveyance sensor C5. When the lamination sheet S is conveyed to the non-fixing path, the branch claw 118 remains at the position illustrated in FIG. 8. However, when the lamination sheet S is conveyed to the fixing path 128, the branch claw 118 is switched to the fixing path side.

The switching of the branch claw 118 may be completed in a period from when the leading end of the sheet passes through the conveyance sensor C5 to when the leading end of the sheet reaches the branch claw 118 after insertion of the inner sheet. If the branch claw 118 is switched before this timing, the lamination sheet S before insertion of the inner sheet enters the fixing path and a part of the sheet is fixed.

If the position of the fixing unit is disposed further downstream in order to prevent such a failure, the size of the sheet processing device would be increased.

As illustrated in FIG. 9, the separation claws 116 guide the two sheets separated from the lamination sheet S in the upper and lower directions, respectively, and thus the two sheets are fully separated. Then, the controller 800 of the sheet processing device 100 causes the driver to temporarily stop the conveyance of the lamination sheet S, so that the bonded portion of the lamination sheet S is held (nipped) by the exit roller pair 113. Accordingly, one end of the lamination sheet S is bonded as the bonded side of the lamination sheet S and the other end of the lamination sheet S is opened largely.

Note that these operations are performed by conveying the lamination sheet S from the conveyance sensor C5 by a specified amount in response to the timing at which the conveyance sensor C5 detected the leading end of the lamination sheet S.

Figure 10:
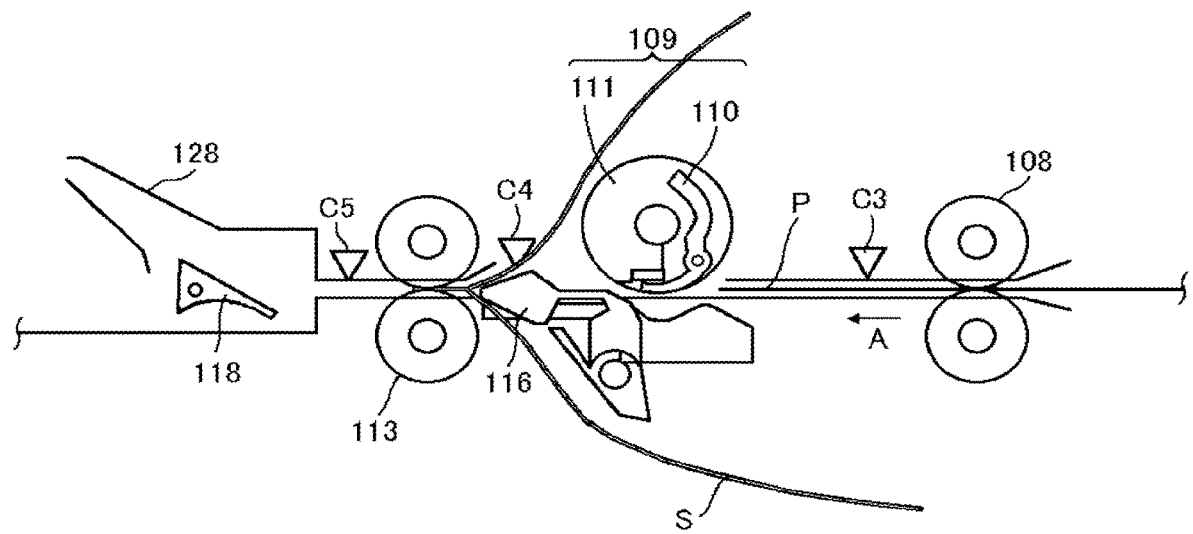
FIG. 10 is a schematic view illustrating the main part of the sheet processing device in a state subsequent to the state in FIG. 9.
Figure 11:
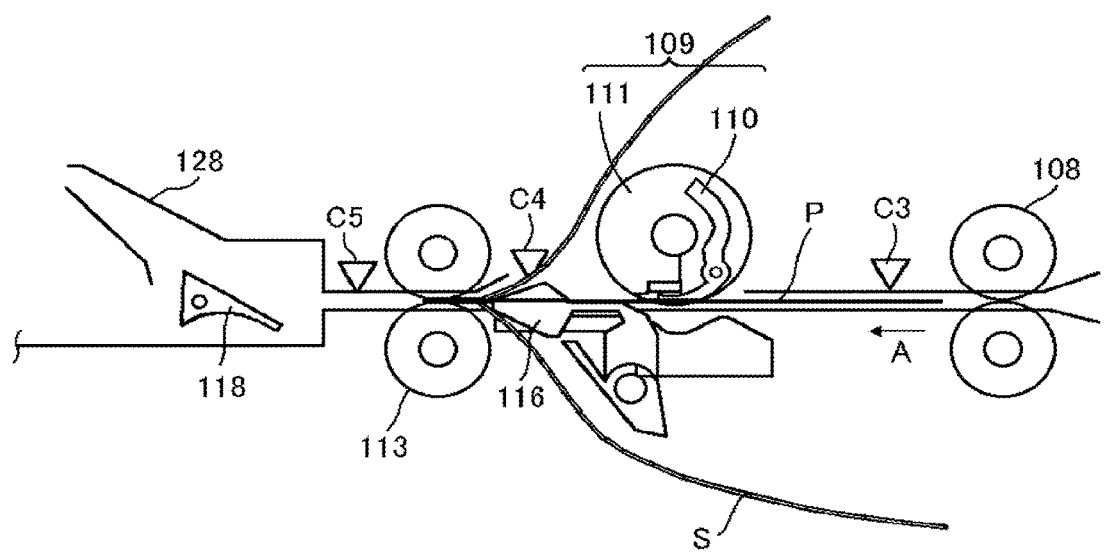
FIG. 11 is a schematic view illustrating the main part of the sheet processing device in a state subsequent to the state in FIG. 10.
Figure 12:
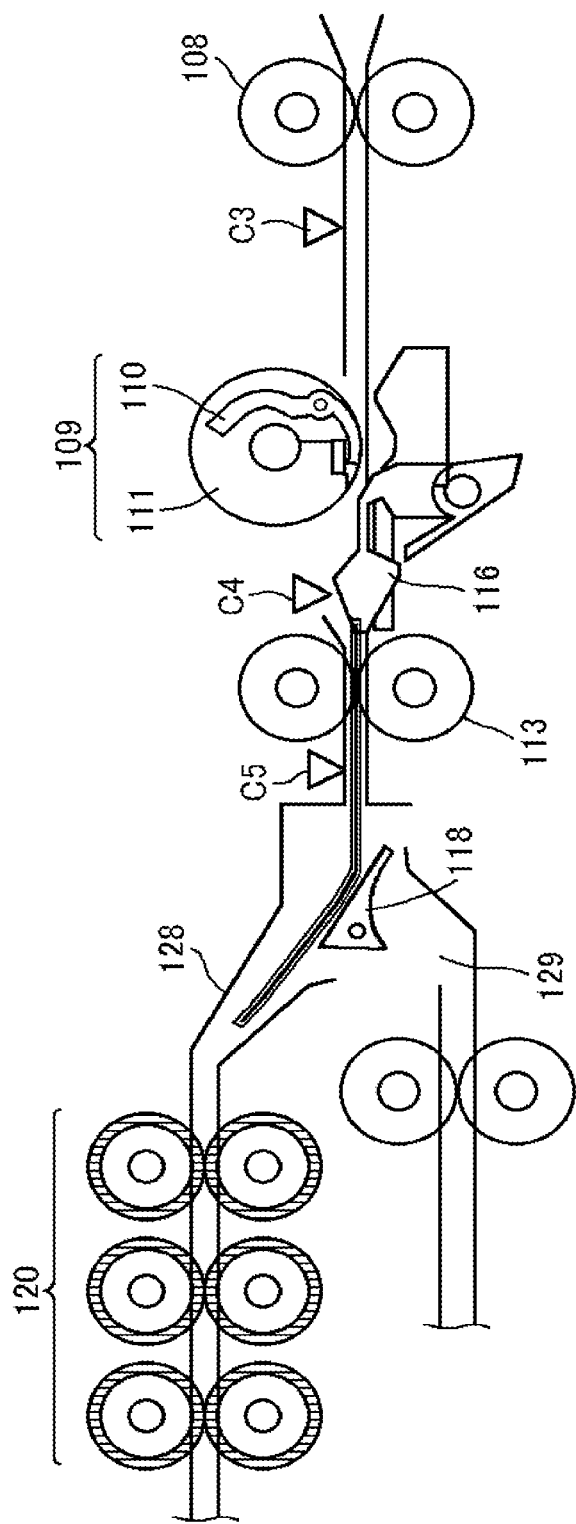
FIG. 12 is a schematic view illustrating the main part of the sheet processing device in a state subsequent to the state in FIG. 11.

FIGS. 10 to 12 illustrate the operation of the sheet processing device 100 when the lamination sheet S is conveyed to the fixing path 128 when the user selects the laminate processing mode on the operation panel 10. Next, as illustrated in FIG. 10, the sheet processing device 100 rotates the entrance roller pair 108 and ejects the inner sheet P conveyed from the sheet tray 102 (see FIG. 1) by the pickup roller 105 and the conveyance roller pair 107 toward the exit roller pair 113 in the forward conveyance direction (sheet conveyance direction A).

Subsequently, as illustrated in FIG. 11, the controller 800 of the sheet processing device 100 causes the exit roller pair 113 to rotate so that the lamination sheet S and the inner sheet P converge to insert the inner sheet PM into the lamination sheet S from the open portion (on the other end) of the lamination sheet S.

Then, as illustrated in FIG. 12, the exit roller pair 113 of the sheet processing device 100 conveys the lamination sheet S in which the inner sheet P is inserted, in the forward conveyance direction (sheet conveyance direction A). Thus, the two sheets of the lamination sheet S are overlapped one on another again so as to close the open portion of the lamination sheet S. The lamination sheet S in which the inner sheet P is sandwiched is conveyed to the fixing unit having heat-pressing rollers 120 by the exit roller pair 113 or a roller disposed downstream from the exit roller pair 113, and is ejected and stacked onto the sheet ejection tray 104 (see FIG. 1). FIGS. 2 to 12 illustrate a basic separate operation and a conveying operation to a fixing device Md (fixing unit) in the case of performing the laminate processing.

As described above, the controller 800 of the sheet processing device 100 according to the present embodiment causes the driver to open the lamination sheet S so as to insert and nip the inner sheet P into the lamination sheet S. Accordingly, since the configuration of the sheet processing device 100 is simpler than the configuration of a typical sheet laminator employing a vacuum device, the entire sheet processing device has a simpler and smaller configuration.

As illustrated in FIG. 1, the sheet processing device 100 according to the present embodiment loads the lamination sheet S and the inner sheet PM on separate trays and feeds and conveys the lamination sheet S and the inner sheet PM separately. Accordingly, the convenience is enhanced without loading the lamination sheet S and the inner sheet P in the predetermined order.

Figure 13:
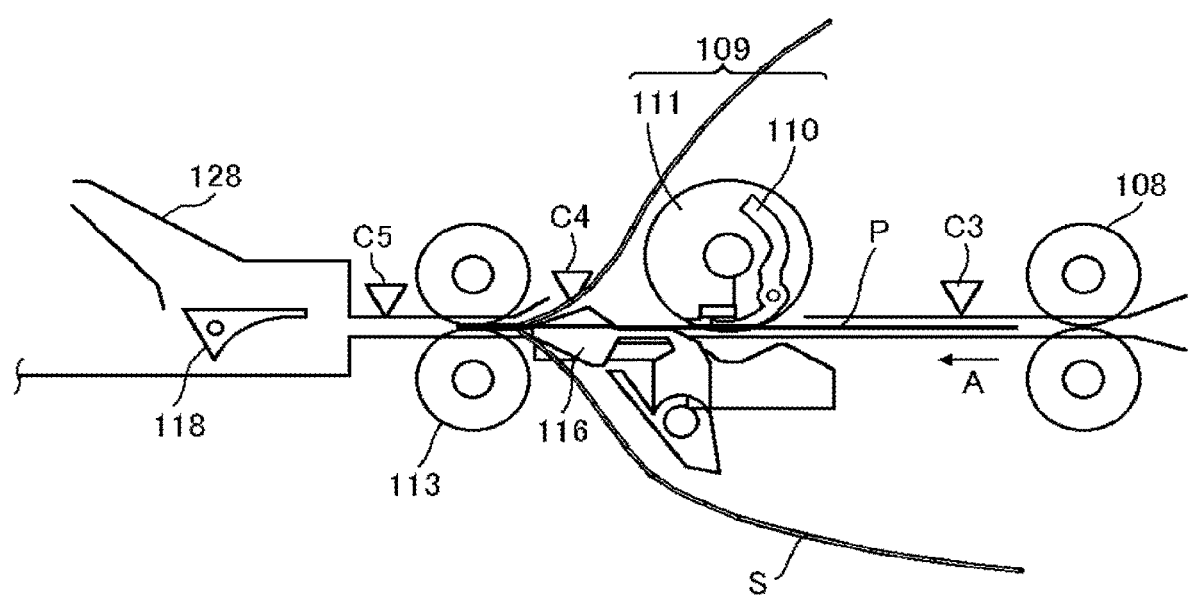
FIG. 13 is a schematic view illustrating the main part of the sheet processing device in a state subsequent to the state in FIG. 12.
Figure 14:
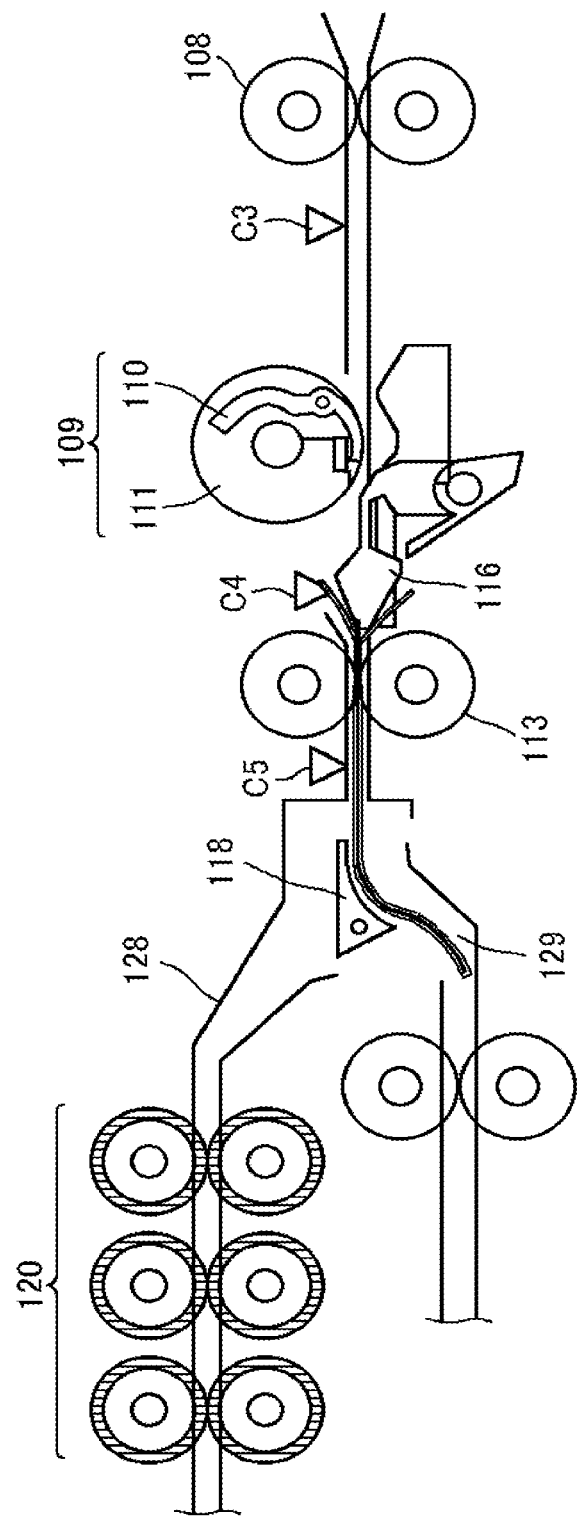
FIG. 14 is a schematic view illustrating the main part of the sheet processing device in a state subsequent to the state in FIG. 13.

On the other hand, when the user selects an inner-sheet insertion mode on the operation panel 10, the sheet processing device 100 operates as illustrated in FIGS. 13 to 14. From FIGS. 2 to 9, the sheet processing device 100 operates in the same manner. However, as illustrated in FIG. 13, in order to convey the inner sheet P to the non-fixing path 129, the inner sheet P is conveyed as it is without switching the branch claw 118.

Next, as illustrated in FIG. 14, in a state in which both the lamination sheet S and the inner sheet P are gripped (nipped), the lamination sheet S and the inner sheet P are conveyed by the exit roller pair 113, so that the inner sheet P is inserted into the two sheets S. Subsequently, the lamination sheet S is conveyed to the non-fixing path 129 that does not have the heat-pressing rollers 120, and is ejected and stacked on the sheet ejection tray 126 (see FIG. 15) to complete the sheet ejection. In this way, the user can obtain the sheet in the state where the inner sheet is inserted, and the sheet can be fixed on an offline machine.

Figure 15:
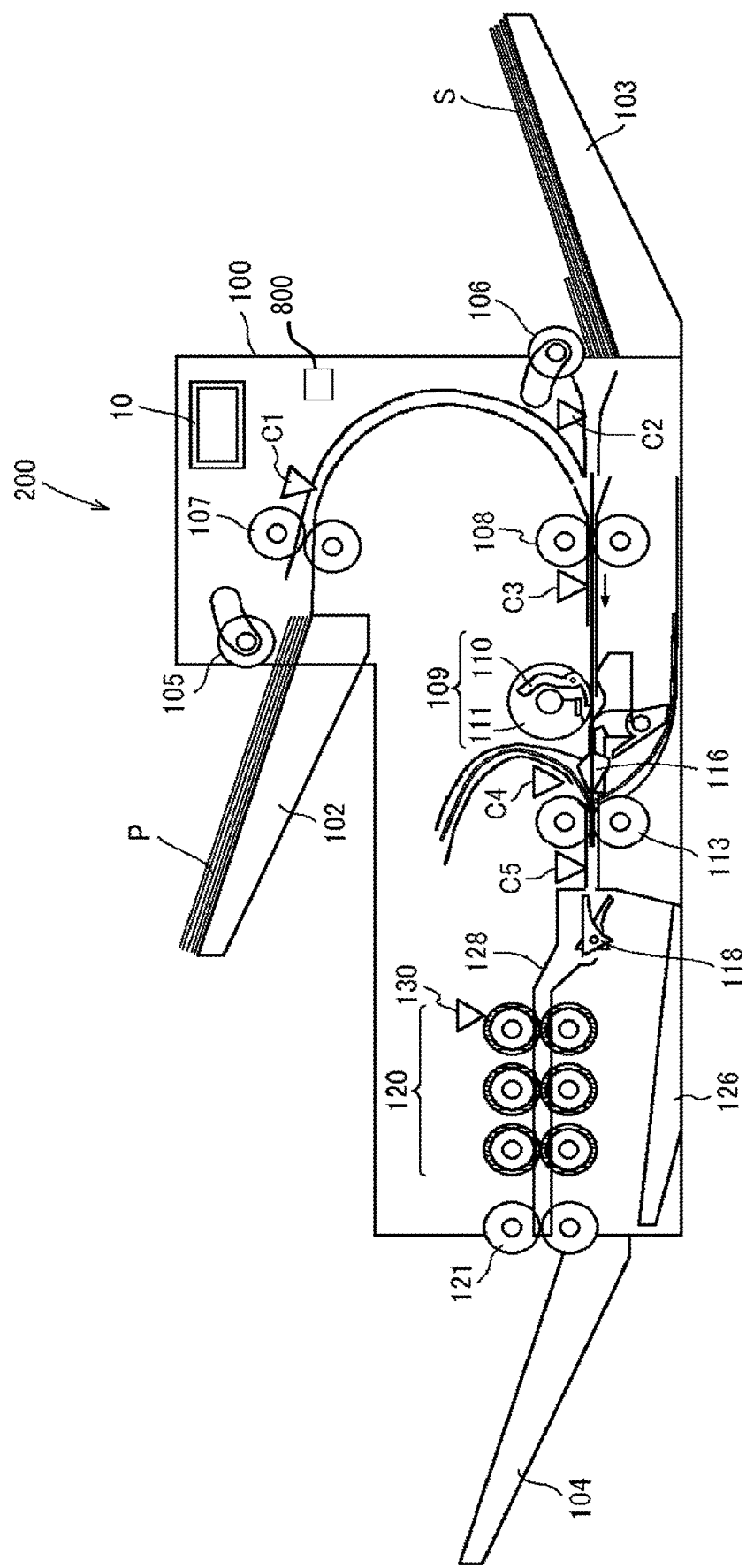
FIG. 15 is a schematic view illustrating the overall configuration of a sheet laminator including a sheet processing device according to an embodiment of the present disclosure.

FIG. 15 is a schematic view illustrating the overall configuration of an example of a sheet laminator according to an embodiment of the present disclosure, including the sheet processing device according to an embodiment of the present disclosure. The sheet laminator 200 includes the sheet processing device 100 described above. The sheet laminator 200 includes separation claws 116, an exit roller pair 113, and a branch claw 118. The separation claws 116 are separator that separates the lamination sheet S. The exit roller pair 113 is disposed downstream from the separation claws 116 and is a conveyor that conveys the lamination sheet S. The branch claw 118 is a switching member that switches the conveyance path of the lamination sheet S. The branch claw 118 causes the lamination sheet S to be conveyed to the fixing path 128 on which fixing is performed on the lamination sheet S or the non-fixing path 129 (see FIGS. 12 and 14) on which fixing is not performed on the lamination sheet S. Accordingly, when the user selects the non-fixing mode (inner-sheet insertion mode), the lamination sheet S can be ejected without being fixed using the non-fixing path 129 with the inner sheet P inserted in the lamination sheet S. Thus, the insertion of the inner sheet is performed by automation without any trouble, the user can perform the laminating work on another offline machine, thus allowing a parallel work and enhancing the productivity of work.

The sheet laminator 200 includes an ejection roller 121, a sheet ejection tray 104, and a sheet ejection tray 126. The ejection roller 121 is disposed downstream from heat-pressing rollers 120 in the sheet conveyance direction. The sheet ejection tray 104 stacks lamination sheets S conveyed through the fixing path 128. The sheet ejection tray 126 stacks sheets S conveyed through the non-fixing path 129 not having the heat-pressing rollers 120.

The sheet laminator 200 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations is carried out automatically without any aid of a user, and therefore the sheet laminator enhances and provides the convenience better than a know sheet laminator employing a known technique.

However, the laminate processing is an example of sheet processing, and the sheet laminator may be broadly referred to as a sheet processing device.

Figure 16:
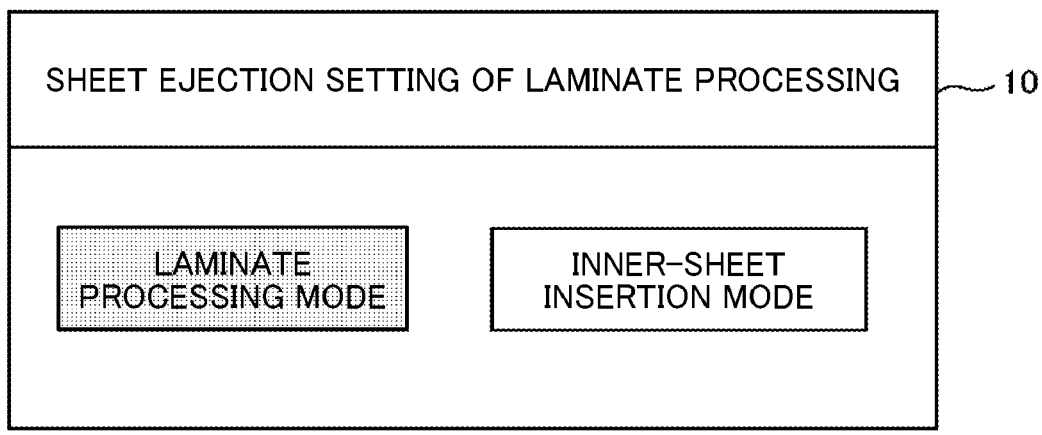
FIG. 16 is a diagram illustrating an operation panel provided in a sheet laminator according to an embodiment of the present disclosure.

FIG. 16 is a diagram illustrating an example of an operation panel 10 provided in the sheet laminator 200. The sheet laminator 200 has a laminate processing mode and an inner-sheet insertion mode (sheet-shaped medium insertion mode). In the laminate processing mode, an inner sheet P as a sheet-shaped medium is sandwiched between two sheets of a lamination sheet S, and the lamination sheet S is conveyed to the fixing path 128 for laminate processing. In the inner-sheet insertion mode, an inner sheet P as a sheet-shaped medium is sandwiched in the lamination sheet S, and the lamination sheet S is conveyed to the non-fixing path 129 and ejected.

The user can use the operation panel 10 to select the laminate processing mode in which laminate processing is performed on a lamination sheet S and the lamination sheet S is ejected or the inner-sheet insertion mode in which an inner sheet P is inserted into two sheets without performing laminate processing. Thus, the user can select whether to convey the lamination sheet S to the fixing path 128 or the non-fixing path 129. Providing such a user interface in the sheet laminator allows the user to select on the operation panel 10 whether to perform the fixing processing on the lamination sheet S or to eject the lamination sheet S in which the inner sheet P is inserted without fixing the lamination sheet S. Thus, the lamination sheet S is ejected in a desired state.

In the present embodiment, the operation panel is taken as an example. However, the sheet ejection setting may be switched by a command from a switch or a personal computer.

Figure 17:
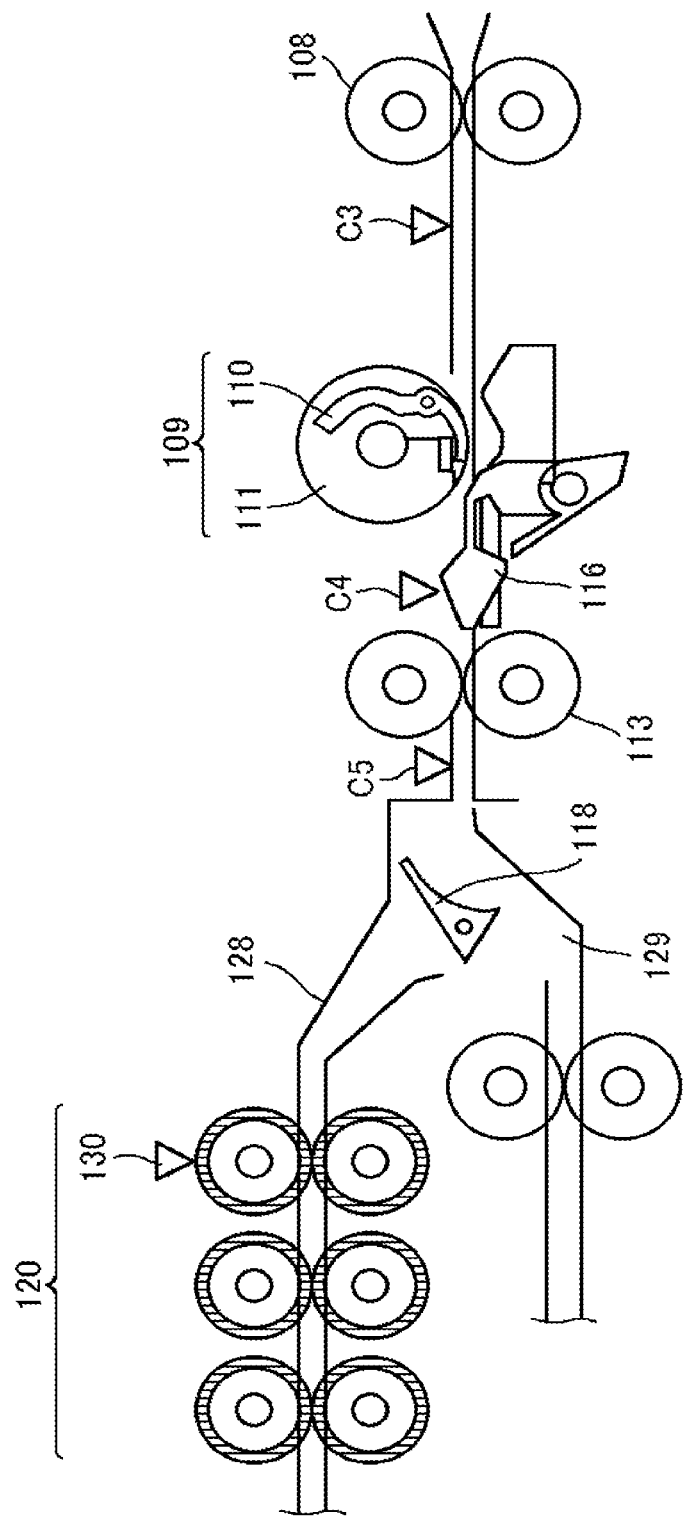
FIG. 17 is a schematic side view illustrating a sheet laminator provided with a detector that detects an abnormality of heat-pressing rollers, according to an embodiment of the present disclosure.

FIG. 17 is a schematic side view illustrating a sheet laminator provided with a detector that detects an abnormality of the heat-pressing rollers 120. As illustrated in FIG. 17, the sheet laminator 200 has a detector 130 that detects an abnormality of the heat-pressing rollers 120 that is a fixing unit disposed on the fixing path 128. The detector 130 is, for example, a thermistor or a non-contact temperature sensor capable of detecting the temperature of the heat-pressing rollers 120. If there is no abnormality in the fixing unit, the laminate processing or the inner-sheet insertion processing can be performed as it is. However, when an abnormality occurs in the fixing unit, jam occurs when the lamination sheet S is conveyed to the fixing path 128. As a result, the user needs to remove the jammed sheet. The abnormality at the fixing unit means that the heat-pressing rollers 120 are in a temperature abnormality state such as high temperature or low temperature. In such a case, even if the lamination sheet S is conveyed, the heat-pressing roller 120 may not normally perform the fixing processing, which may cause sheet jam. Hence, according to the abnormality detection result, for example, when an abnormality of the heat-pressing rollers 120 is detected, the conveyance of the lamination sheet S is stopped, or the position of the branch claw 118 is switched as illustrated in FIG. 17 to convey the lamination sheet S to the non-fixing path 129. Controlling the sheet processing as described above can prevent the user's trouble of jam removal processing.

Figure 18:
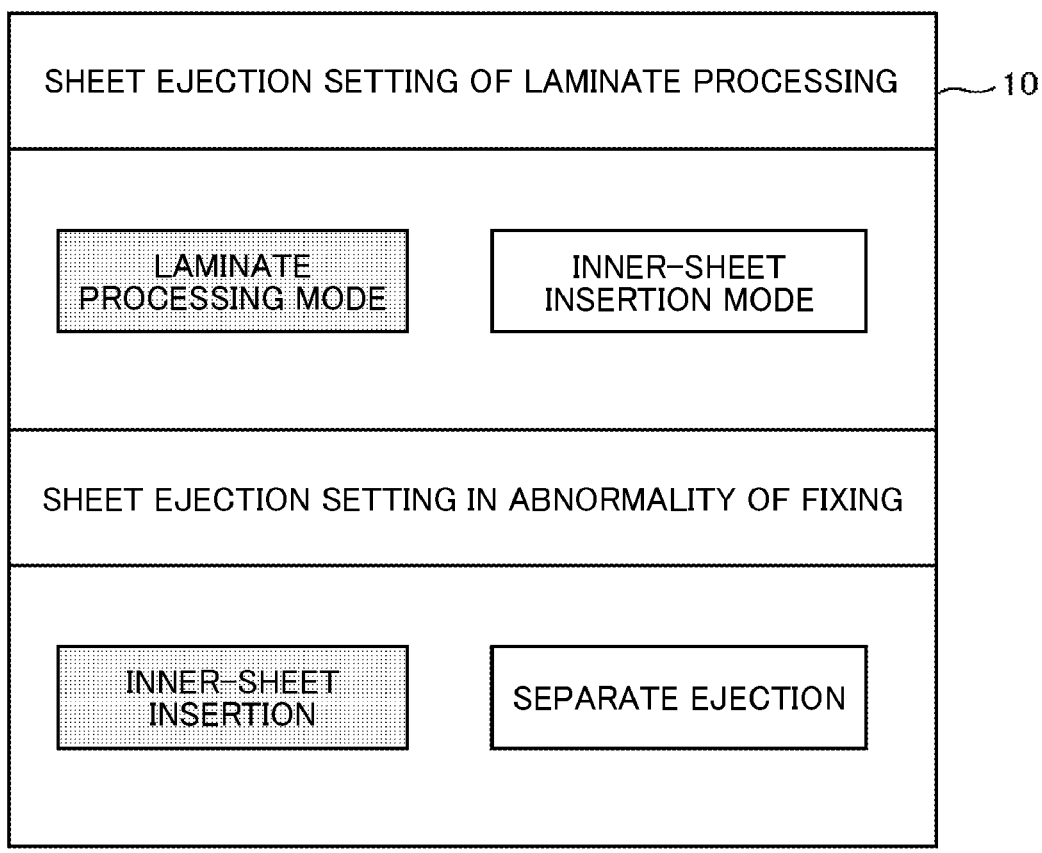
FIG. 18 is a diagram illustrating an operation panel provided in a sheet laminator according to an embodiment of the present disclosure.

FIG. 18 is a diagram illustrating another example of the operation panel 10 provided in the sheet laminator 200. According to the operation panel 10 of the present embodiment, the user can also set the sheet ejection setting at the time of abnormal fixing, in addition to the sheet ejection setting for the laminate processing illustrated in FIG. 16. For example, the user can select a sheet ejection setting method when the abnormality of the heat-pressing rollers 120 illustrated in FIG. 17 is detected, and can set whether to insert an inner sheet P to a lamination sheet S and eject the lamination sheet S when the abnormality is detected ("inner-sheet insertion") or whether to eject a lamination sheet S and an inner sheet P separately without inserting the inner sheet P into the lamination sheet S ("separate ejection").

In the "inner-sheet insertion", when an abnormality of the heat-pressing rollers 120, which are a fixing unit disposed on the fixing path 128, is detected, the lamination sheet S is conveyed to the non-fixing path 129 with the inner sheet P being inserted into the lamination sheet S. As a result, the laminate processing of the lamination sheet S into which the inner sheet P is inserted can be efficiently performed by another offline machine or the like until the failure of the heat-pressing roller 120 is recovered.

In the "separate ejection", when an abnormality of the heat-pressing roller 120, which is a fixing unit disposed on the fixing path 128, is detected, the lamination sheet S and the inner sheet P are separately conveyed to the non-fixing path 129. Thus, if the user owns two similar online sheet separation devices, the laminate processing can be performed as it is with another normal device without wasteful work of taking out the inserted inner sheet P.

Next, a description is given of a sheet laminator, an image forming apparatus, and an image forming system, each including the sheet processing device according to an embodiment of the present disclosure.

Figure 19:
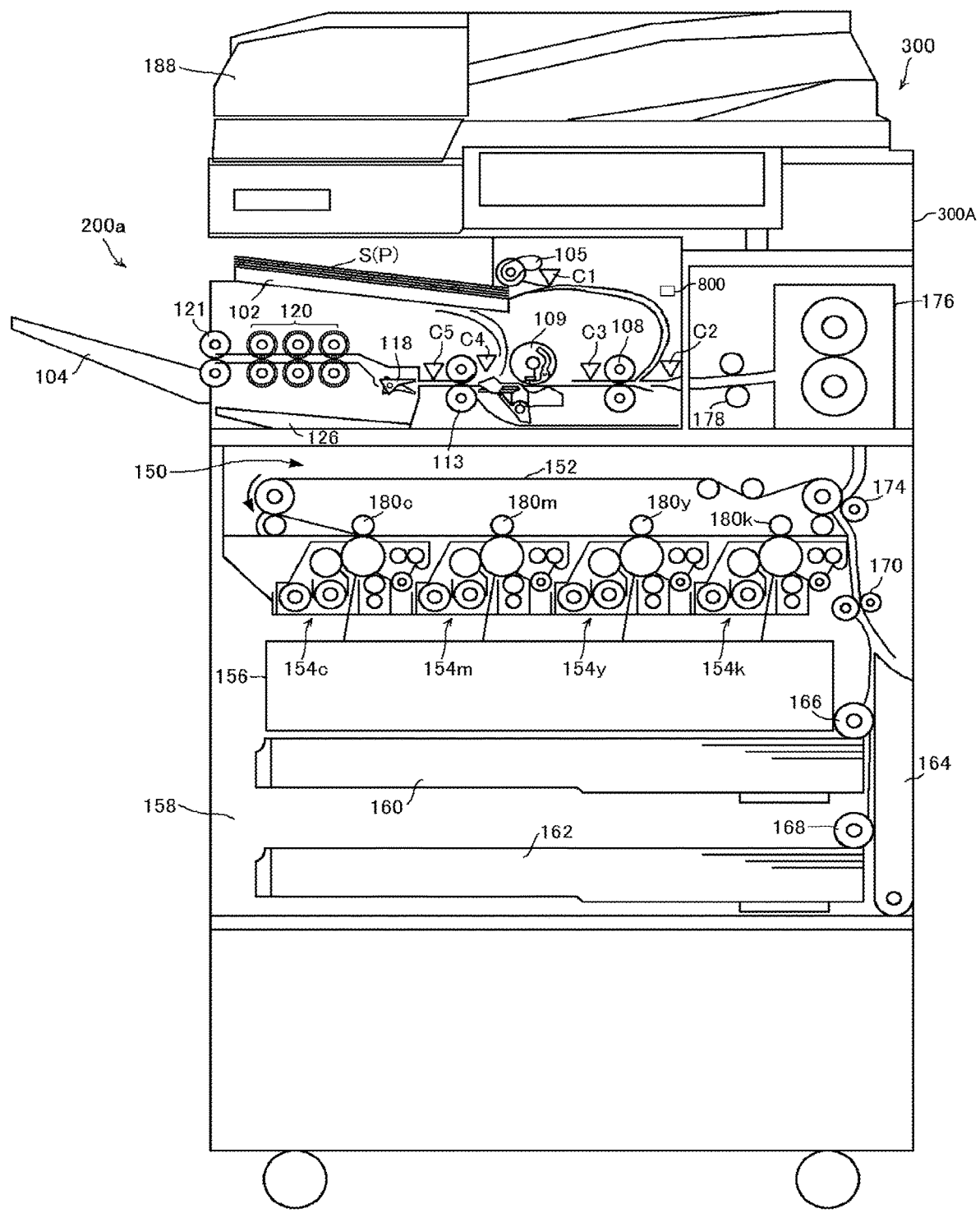
FIG. 19 is a schematic view illustrating the overall configuration of an image forming apparatus including a sheet laminator according to an embodiment of the present disclosure.

FIG. 19 is a schematic view illustrating the overall configuration of an example of an image forming apparatus according to an embodiment of the present disclosure, including the sheet laminator according to an embodiment of the present disclosure. An image forming apparatus 300 according to the present embodiment includes a sheet laminator 200*a* as a device that performs sheet lamination inside the image forming apparatus 300.

The sheet laminator 200*a* includes the sheet tray 102 on which the lamination sheet S or the inner sheet P are loaded. The sheet laminator 200*a* is capable of receiving the lamination sheet S, the inner sheet P, or both from the image forming apparatus 300. Accordingly, the image forming apparatus 300 (e.g., a printer or a copier) is capable of adding (forming) an image on the lamination sheet S or the inner sheet P by the in-line connection.

The configuration of the image forming apparatus 300 is described in detail. As illustrated in FIG. 19, an image forming apparatus 300 includes a housing 300A. The image forming apparatus 300 includes an intermediate transfer device 150 in the housing 300A.

The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 19.

The image forming apparatus 300 further includes image forming devices 154*c*, 154*m*, 154*y*, and 154*k* for yellow (Y), magenta (M), cyan (C), and black (K), respectively, are disposed below the intermediate transfer device 150 in the housing 300A. The image forming devices 154*c*, 154*m*, 154*y*, and 154*k* are arranged in a quadruple tandem manner along an extended direction of the intermediate transfer belt 152. Each of the image forming devices 154*c*, 154*m*, 154*y*, and 154*k* includes a drum-shaped image bearer that rotates in the clockwise direction in FIG. 19. Various image forming components, for example, a charging device, a developing device, a transfer device, and a cleaning device, are disposed around each of the image forming devices 154*c*, 154*m*, 154*y*, and 154*k*. An exposure device 156 is disposed below the image forming devices 154*c*, 154*m*, 154*y*, and 154*k* in the housing 300A of the image forming apparatus 300.

A sheet feeder 158 is disposed below the exposure device 156 in the housing 300A of the image forming apparatus 300. The sheet feeder 158 includes a first sheet tray 160 that stores lamination sheets S and a second sheet tray 162 that stores inner sheets P. Note that the first sheet feed tray 160 is an example of a third sheet loader on which a two-ply sheet such as the lamination sheet S is loaded. Similarly, the second sheet feed tray 162 is an example of a fourth sheet loader on which a sheet medium (e.g., the inner sheet P) is loaded.

A first feed roller 166 is disposed at a position upper right of the first sheet feed tray 160. The first feed roller 166 feeds out the lamination sheet S one by one from the first sheet feed tray 160 to a sheet conveyance passage 164. A second sheet feeding roller 168 is disposed at the upper right of the second sheet tray 162 and feeds the inner sheets P from the second sheet tray 162 one by one to the sheet conveyance path 164.

The sheet conveyance passage 164 extends upwardly on the right side in the housing 300A of the image forming apparatus 300 and communicates with the sheet laminator 200a provided in the housing 300A of the image forming apparatus 300. The sheet conveyance passage 164 is provided with, e.g., a conveyance roller 170, a secondary transfer device 174 disposed facing the intermediate transfer belt 152, a fixing device 176, and a sheet ejection device 178 including an ejection roller pair, serially.

Note that the first feed roller 166, the conveyance roller 170, and the sheet conveyance passage 164 are examples of a third sheet feeder to feed the two-ply sheet from the first sheet feed tray 160 (third sheet loader). Further, the second feed roller 168, the conveyance roller 170, and the sheet conveyance passage 164 are examples of a fourth sheet feeder to feed a sheet medium from the second sheet feed tray 162 (fourth sheet loader). Further, the intermediate transfer device 150 and the fixing device 176 are examples of an image forming device that forms an image on a two-ply sheet or a sheet medium.

Next, a description is given of operations of the image forming apparatus 300 according to the present embodiment, to form an image on the lamination sheet S and then perform a sheet laminating operation on the lamination sheet S.

When forming an image on the lamination sheet S, firstly, an image reading device 188 reads the image on an original document, and the exposure device 156 then performs image writing. Thereafter, the image forming devices 154c, 154m, 154y, and 154k form respective color toner images on the respective image bearers. Then, primary transfer devices 180c, 180m, 180y, and 180k sequentially transfer the respective toner images onto the intermediate transfer belt 152, thereby forming a color image on the intermediate transfer belt 152.

By contrast, the image forming apparatus 300 rotates the first feed roller 166 to feed and convey the lamination sheet S to the sheet conveyance passage 164. Then, the lamination sheet S is conveyed by the conveyance roller 170 through the sheet conveyance passage 164 and is sent to a secondary transfer position in synchrony with movement of the color image on the intermediate transfer belt 152. Then, the secondary transfer device 174 transfers the color image formed on the intermediate transfer belt 152 as described above, onto the lamination sheet S.

After the image has been transferred onto the lamination sheet S, the fixing device 176 fixes the image on the lamination sheet S to the lamination sheet S, and the sheet ejection device 178 ejects to convey the lamination sheet S to the sheet laminator 200a.

Further, the image forming apparatus 300 rotates the second feed roller 168 to feed the inner sheet P to the sheet conveyance passage 164, and the sheet ejection device 178 ejects to convey the inner sheet P to the sheet laminator 200a.

As described above, the lamination sheet S on which the image has been formed and the inner sheet P are conveyed to the sheet laminator 200a, so that the sheet laminating operation is performed by the sheet laminator 200a. Since the details of the sheet laminating operation have been described above, the redundant descriptions are omitted.

According to the above-described configuration of the image forming apparatus 300 according to the present embodiment, the sheet laminator 200a may perform the sheet laminating operation after an image is formed on the inner sheet P. In addition, the sheet laminator 200a may perform the sheet laminating operation after the image forming operation has been performed on the inner sheet P and the lamination sheet S.

Next, a description is given of a sheet laminator, an image forming apparatus, and an image forming system, each including the sheet processing device according to another example of the present disclosure.

Figure 20:
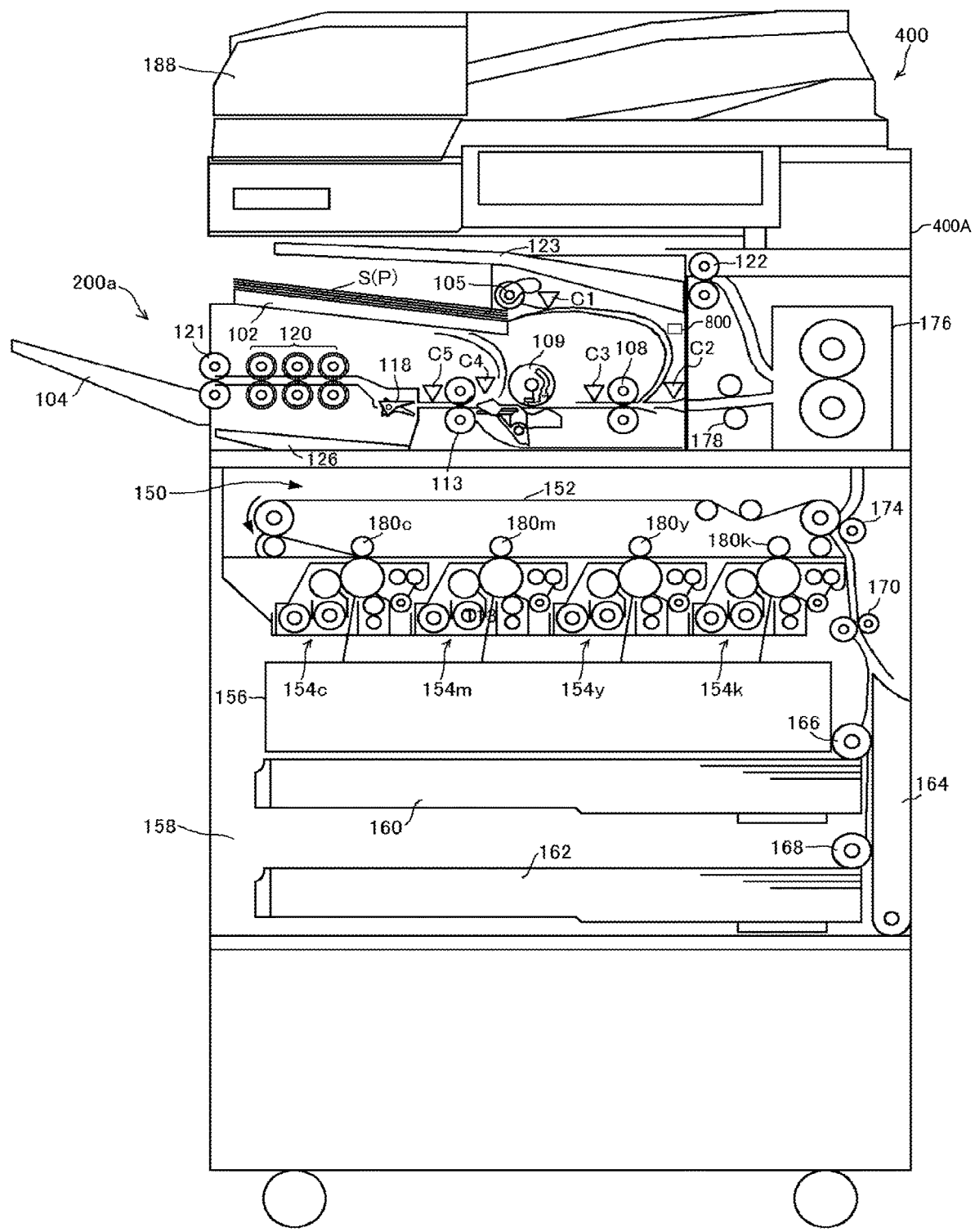
FIG. 20 is a schematic view illustrating the overall configuration of an image forming apparatus including a sheet laminator according to a variation of the present disclosure.

FIG. 20 is a schematic view illustrating the overall configuration of an image forming apparatus according to another example of the present disclosure, including the sheet laminator according to an embodiment of the present disclosure. An image forming apparatus 400 illustrated in FIG. 20 is basically same as the image forming apparatus 300 illustrated in FIG. 19. However, different from the image forming apparatus 300 illustrated in FIG. 19, the image forming apparatus 400 includes a main ejection roller pair 122 and a main ejection tray 123, each of which is provided in a housing 400A of the image forming apparatus 400.

When the sheet laminating operation is not performed, the image forming apparatus 400 may eject the recording medium on which the image is formed, by a main ejection roller pair 122 to a main ejection tray 123. Accordingly, the image forming apparatus 400 does not decrease the image output speed when the sheet laminating operation is not performed.

Note that the image forming apparatus 400 may include the sheet laminator 200a in the housing 400A to be detachably attached to the housing 400A. That is, when the sheet laminating operation is not required, the sheet laminator 200a may be detached from the image forming apparatus 400.

In addition, in the sheet laminator 200a thus removed, the sheet feed tray 103 on which the inner sheet P is loaded and the pickup roller 106 to feed the inner sheet P from the sheet feed tray 103 may be attached to the sheet laminator 200a, so that the sheet laminator 200a is used as a stand-alone machine similar to the sheet laminator 200a illustrated in FIG. 15.

The image forming apparatus 300 illustrated in FIG. 19 and the image forming apparatus 400 illustrated in FIG. 20 may include a sheet processing device instead of the sheet laminator 200a. The image forming apparatus 400 illustrated in FIG. 20 may include a sheet processing device that is removably attached to the image forming apparatus 400.

Further, an image forming system may include the image forming apparatus 300 or 400, the sheet processing device 100 detachably attached to the image forming apparatus 300 or 400 or the sheet laminator 200 detachably attached to the image forming apparatus 300 or 400. Furthermore, aspects of this disclosure can be embodied as a system including at least one of a sheet feeder (a stacker) and a case binding device or the like. Note that, in a case in which a lamination sheet S passes through a fixing device 176, the lamination sheet S is not bonded at the fixing temperature but is bonded by application of heat higher than the fixing temperature.

Although the image forming apparatuses 300 and 400 employ electrophotography for image formation on the lamination sheet S and the insertion sheet in the description above, the image formation method is not limited thereto, and inkjet, stencil printing, or other printing method can be used.

Further, the sheet laminator 200 according to an embodiment of the present disclosure includes the above-mentioned sheet processing device 100 and heat-pressing rollers 120 capable of heating and pressing the lamination sheet S.

Further, the image forming apparatus 300 according to an embodiment of the present disclosure includes the above-mentioned sheet processing device 100. The sheet processing device 100 may be built in the image forming apparatus.

Further, the image forming system according to an embodiment of the present disclosure has the sheet processing device 100 inside the image forming apparatus 300. The image forming system according to an embodiment of the present disclosure may include the sheet processing device 100 inside the image forming apparatus 300 and a post-processing device disposed downstream from the sheet processing device 100 in the sheet conveyance direction. The post-processing device can staple, for example, printed sheets.

Figure 21:
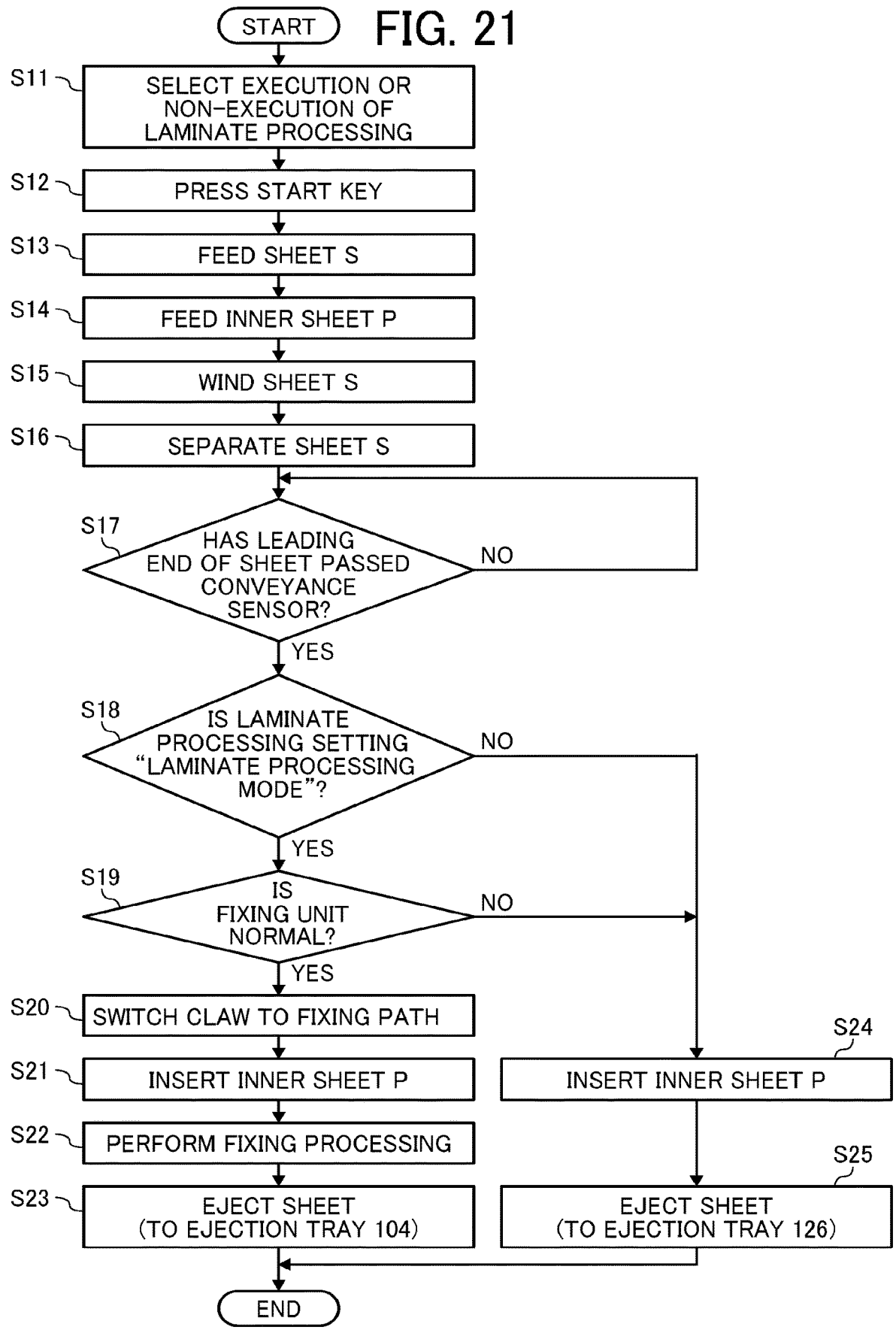
FIG. 21 is a flowchart illustrating a series of operations in a sheet laminator according to an embodiment of the present disclosure.

FIG. 21 is a flowchart illustrating a series of operations in the sheet laminator according to an embodiment of the present disclosure. In step S11, the user selects, for example, whether to perform the laminate processing from the operation panel 10 of the sheet laminator 200, and presses down the start key in step S12. Next, in step S13, the sheet laminator 200 performs a feeding operation of a lamination sheet S, and subsequently, in step S14, performs a feeding operation of an inner sheet P. Next, the sheet laminator 200 performs a winding operation of the lamination sheet S in step S15 and a separating operation of the lamination sheet S in step S16.

Next, when the leading end of the lamination sheet S passes through the conveyance sensor C5 (YES in S17), the sheet laminator 200 determines whether the "laminate processing mode" is selected by the user (S18). When the "laminate processing mode" is selected (YES in S18), the sheet laminator 200 confirms that there is no abnormality in the heat-pressing rollers 120 by the detector 130 (YES in S19), and switches the position of the branch claw 118 to the fixing path side (S20), inserts the inner sheet P into the lamination sheet S (S21), performs the fixing processing (S22), and ejects the lamination sheet S onto the sheet ejection tray 104 for the laminate processing (S23).

Alternatively, when the "inner-sheet insertion mode" is selected instead of the "laminate processing mode" (NO in S18), the sheet laminator 200 does not switch the branch claw 118, inserts the inner sheet P into the lamination sheet S (S24), ejects the lamination sheet S onto the sheet ejection tray 126 for the non-fixing path 129 (S25). Similarly, when an abnormality is detected in the heat-pressing rollers 120 as the fixing unit by the detector 130 (NO in S19), the sheet laminator 200 does not switch the branch claw 118, inserts the inner sheet P to the lamination sheet S (S24), and ejects the lamination sheet S onto the sheet ejection tray 126 for the non-fixing path 129 (S25).

Figure 22:
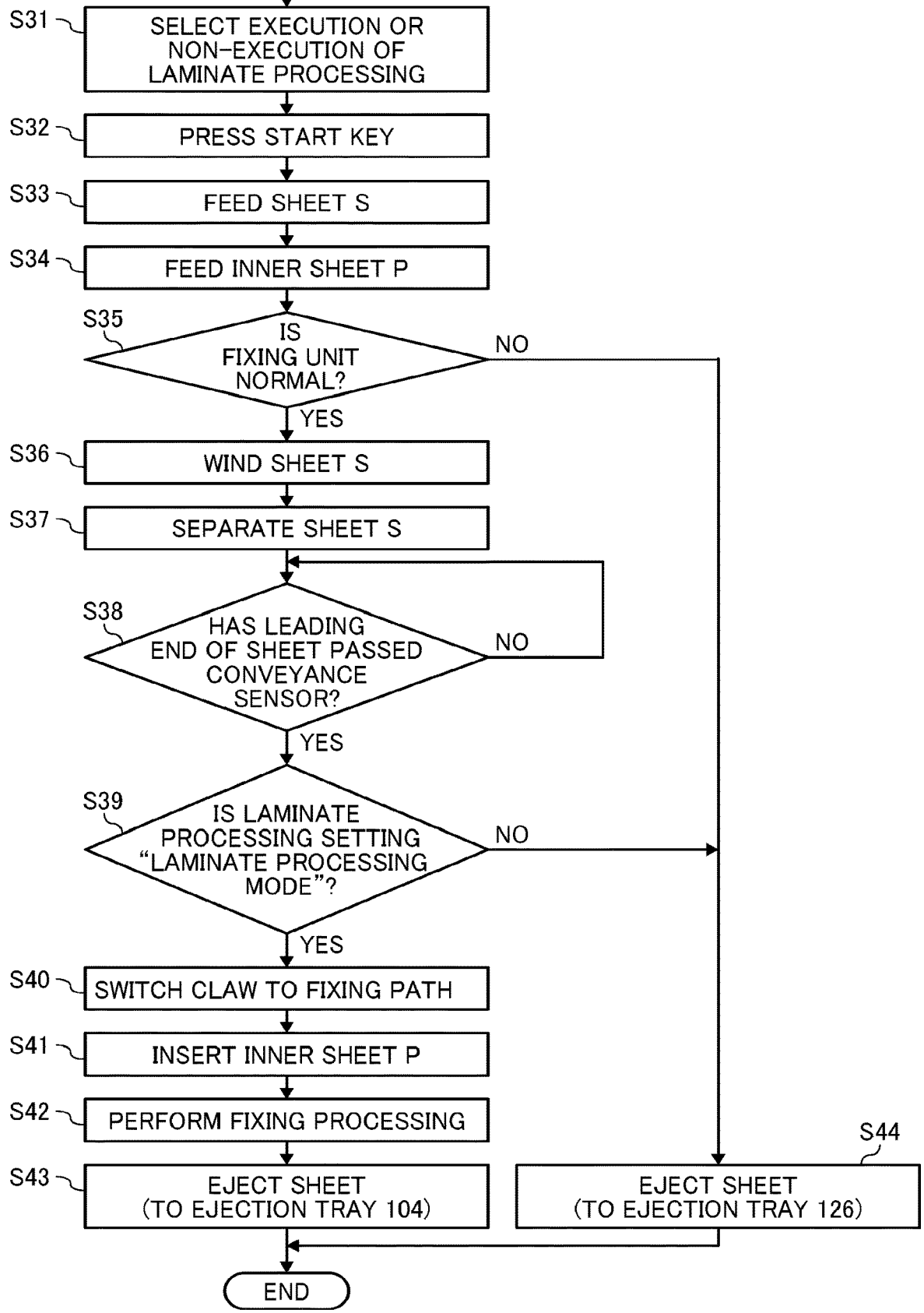
FIG. 22 is a flowchart illustrating a series of operations in a sheet laminator according to an embodiment of the present disclosure.

FIG. 22 is a flowchart illustrating a series of operations in the sheet laminator according to another embodiment of the present disclosure. In step S31, the user selects, for example, whether to perform the laminate processing from the operation panel 10 of the sheet laminator 200, and presses down the start key in step S32. Next, in step S33, the sheet laminator 200 performs a feeding operation of a lamination sheet S, and subsequently, in step S34, performs a feeding operation of an inner sheet P. Next, in this flowchart, unlike the process of FIG. 21, when an abnormality is detected in the heat-pressing rollers 120 as the fixing unit by the detector 130 (NO in S35), the sheet laminator 200 ejects the lamination sheet S and the inner sheet P separately to the sheet ejection tray 126 for the non-fixing path 129 without inserting the inner sheet P to the lamination sheet P (S44).

Alternatively, when no abnormality is detected (YES in S35), the sheet laminator 200 performs a winding operation of the lamination sheet S in step S36 and a separating operation of the lamination sheet S in step S37.

Next, when the leading end of the lamination sheet S passes through the conveyance sensor C5 (YES in S38), the controller 800 of the sheet laminator 200 determines whether the "laminate processing mode" is selected by the user (S39). When the "laminate processing mode" is selected (YES in S39), the sheet laminator 200 switches the position of the branch claw 118 to the fixing path side (S40). After inserting the inner sheet P (S41), the sheet laminator 200 performs the fixing processing (S42) and ejects the lamination sheet S to the sheet ejection tray 104 for laminate processing (S43).

Figure 23:
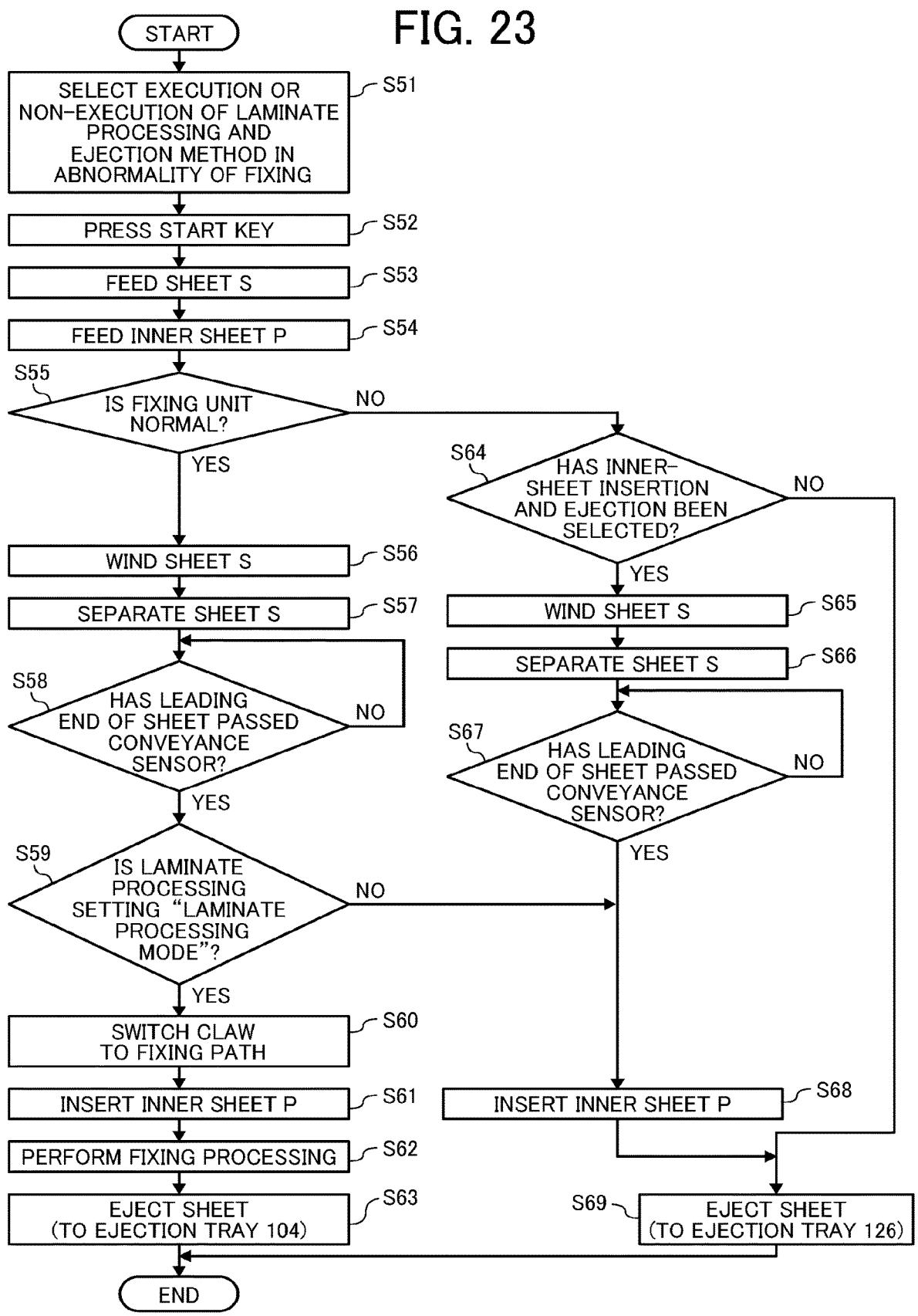
FIG. 23 is a flowchart illustrating a series of operations in a sheet laminator according to an embodiment of the present disclosure.

FIG. 23 is a flowchart illustrating a series of operations in the sheet laminator according to still another embodiment of the present disclosure. This flowchart is configured as a combination of the processes of FIGS. 21 and 22. In other words, the user can select whether to insert an inner sheet P to a lamination sheet S and eject the lamination sheet or to eject the lamination sheet S and the inner sheet P separately, as a sheet ejection method to be performed when an abnormality of the fixing unit is detected.

In step S31, the user selects execution or non-execution of the laminate processing and a sheet ejection method on detection of an abnormality of the fixing unit from the operation panel 10 of the sheet laminator 200, and presses down the start key in step S32. Next, in step S53, the sheet laminator 200 performs a feeding operation of a lamination sheet S, and subsequently, in step S54, performs a feeding operation of an inner sheet P. Next, when an abnormality is detected in the heat-pressing rollers 120 as the fixing unit by the detector 130 (NO in S55) and the "inner-sheet insertion and ejection" is selected (YES in S64), the sheet laminator 200 performs the winding operation of the lamination sheet S in step S65 and the separating operation of the lamination sheet S in step S66. Next, when the leading end of the lamination sheet S passes through the conveyance sensor C5 (YES in S67), the sheet laminator 200 performs the insertion operation of the inner sheet P (S68), and then ejects the lamination sheet S, in which the inner sheet P has been inserted, to the sheet ejection tray 126 for the non-fixing path 129 without performing the fixing processing (S69). When the "inner-sheet insertion and ejection" is not selected (NO in S64), the sheet laminator 200 separately ejects the lamination sheet S and the inner sheet P to the sheet ejection tray 126 for the non-fixing path 129 (S69).

Alternatively, when no abnormality is detected (YES in S55), the sheet laminator 200 performs the winding operation of the lamination sheet S in step S56 and the separating operation of the lamination sheet S in step S57.

Next, when the leading end of the lamination sheet S passes through the conveyance sensor C5 (YES in S58), the controller 800 of the sheet laminator 200 determines whether the "laminate processing mode" is selected by the user (S59). When the "laminate processing mode" is selected (YES in S59), the sheet laminator 200 switches the position of the branch claw 118 to the fixing path side (S60). After inserting the inner sheet P (S61), the sheet laminator 200 ejects the fixing processing (S62) and ejects the lamination sheet S to the sheet ejection tray 104 for laminate processing (S63). When the "laminate processing mode" is not selected (NO in S59), the sheet laminator 200 performs the insertion operation of the inner sheet P (S68), and then ejects the lamination sheet S, in which the inner sheet P has been inserted, to the sheet ejection tray 126 for the non-fixing path 129 without performing the fixing processing (S69).

As described above, the sheet processing device according to an embodiment of the present disclosure can perform the laminate processing mode in which the laminate processing is performed and the inner-sheet insertion mode in which only an inner sheet is inserted into a lamination film (lamination sheet) without performing the fixing processing. Accordingly, in addition to the normal laminate processing, only the troublesome pinching work can be performed by automation, and the subsequent laminate processing can be performed by another offline machine to enhance the productivity of the work.

Figure 24:
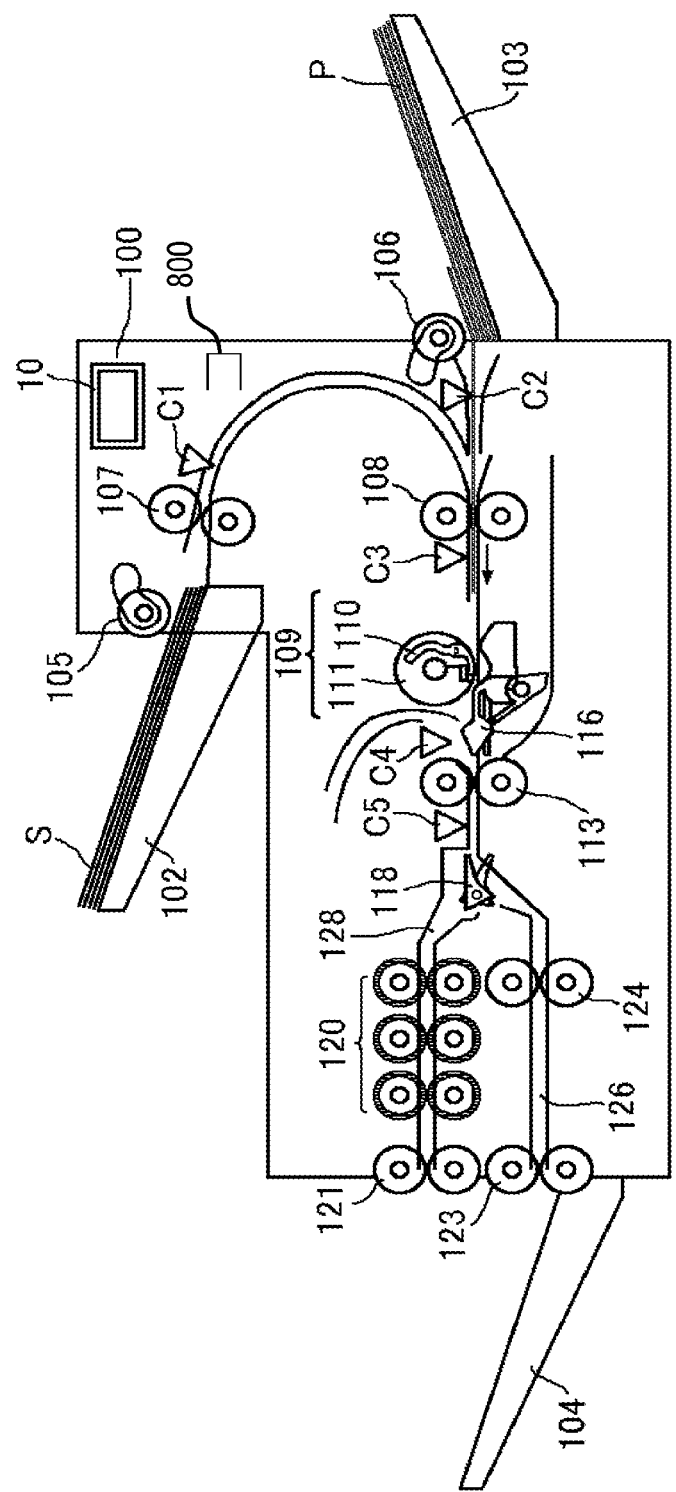
FIG. 24 is a schematic view illustrating the overall configuration of a sheet processing device according to an embodiment of the present disclosure.

Next, a description is given of a sheet processing device according to according to an embodiment of the present disclosure, with reference to FIG. 24. FIG. 24 is a schematic view illustrating the overall configuration of a sheet processing device according to an embodiment of the present disclosure. A sheet processing device 100 according to the present embodiment is to separate two sheets (plies) of a two-ply sheet (hereinafter referred to as a lamination sheet S) and to insert and sandwich a sheet-shaped medium (hereinafter referred to as an inner sheet P) between the separated sheets of the two-ply sheet.

The lamination sheet S is a two-ply sheet in which two sheets are overlapped and bonded together at a portion (or a side) of the two-ply sheet. For example, there is a two-ply sheet in which a first side is a transparent sheet such as a transparent polyester sheet and the opposite side is a transparent or opaque sheet and bonded to the other sheet on one side of the two-ply sheet. The two-ply sheet also includes a lamination film.

The inner sheet P is an example of the sheet medium that is inserted into the two-ply sheet. The sheet medium may be, for example, thick paper, postcards, envelopes, plain paper, thin paper, coated paper, art paper, tracing paper, and overhead projector (OHP) transparencies.

As illustrated in FIG. 24, a sheet processing device 100 includes a sheet tray 102, a pickup roller 105, and a conveyance roller pair 107. The sheet tray 102 functions as a first sheet loader on which the lamination sheets S are placed. The pickup roller 105 feeds the lamination sheet S from the sheet tray 102. The sheet processing device 100 further includes a sheet feed tray 103 as a second loader on which the inner sheet P is loaded, and a pickup roller 106 that feeds the inner sheet P from the sheet feed tray 103.

A conveyance sensor C1 is disposed downstream from the conveyance roller pair 107 in the sheet conveyance direction to detect the sheet conveyance position of the lamination sheet S. A conveyance sensor C2 is disposed downstream from the pickup roller 106 in the sheet conveyance direction to detect the sheet conveyance position of the inner sheet P.

The sheet processing device 100 includes an entrance roller pair 108 as a first conveyor, a winding roller 109 as a rotator, the exit roller pair 113 as a second conveyor, and the sheet ejection tray 104 as a sheet stacker to stack ejected lamination sheets S. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing device 100 further includes a separation claw 116 between the winding roller 109 and the exit roller pair 113. The separation claw 116 is movable in the width direction of the lamination sheet S.

A conveyance sensor C3 that detects the positions of a lamination sheet S and an inner sheet P being conveyed is disposed downstream from the entrance roller pair 108 in the sheet conveyance direction. An abnormality detection sensor C4 that detects the state of the lamination sheet S is disposed downstream from the winding roller 109 in the sheet conveyance direction. A conveyance sensor C5 that detects the position of the lamination sheet S being conveyed is disposed downstream from the exit roller pair 113 in the sheet conveyance direction.

The pickup roller 105, the conveyance roller pair 107, the entrance roller pair 108, and the winding roller 109 are examples of a first feeder. The pickup roller 106, the entrance roller pair 108 and the winding roller 109 are examples of a second feeder.

The sheet processing device 100 includes heat-pressing rollers 120, a heat-pressing conveyance path 128, a non-heat-pressing conveyance path 126, a branch claw 118, and a sheet ejection tray 104. The heat-pressing roller 120 is a heat pressing member that heats and presses a lamination sheet S in which an inner sheet P as a sheet-shaped medium is sandwiched. The heat-pressing rollers 120 are disposed on the heat-pressing conveyance path 128 and are not disposed on the non-heat-pressing conveyance path 126. The branch claw 118 is a branching member that branches the lamination sheet S into the heat-pressing conveyance path 128 or the non-heat-pressing conveyance path 126. The sheet ejection tray 104 is a stacker that stacks the ejected sheet S.

Both the lamination sheet S (hereinafter, appropriately referred to as a "heat-pressed sheet") that is conveyed through and ejected from the heat-pressing conveyance path 128 provided with the heat-pressing rollers 120 and the lamination sheet S (hereinafter, appropriately referred to as "non-heat-pressed sheet") that is conveyed through and ejected from the non-heat-pressing conveyance path 126 are ejected and stacked on the common sheet ejection tray 104. As a result, since only one sheet ejection tray 104 needs to be installed, the cost of the sheet processing device 100 can be reduced and the size of the sheet processing device 100 can be reduced.

The branch claw 118 that switches the conveyance path of the lamination sheet S is disposed downstream in the conveyance direction of the conveyance sensor C5. The heat-pressing conveyance path 128 and the non-heat-pressing conveyance path 126 are formed downstream of the branch claw 118. The heat-pressing rollers 120 and the ejection roller 121 disposed downstream from the heat-pressing rollers 120 and in the vicinity of a sheet ejection port are disposed on the heat-pressing conveyance path 128. A conveyance roller 124 and an ejection roller 123 are disposed on the non-heat-pressing conveyance path 126. The conveyance roller 124 conveys the lamination sheet S. The ejection roller 123 is disposed downstream of the conveyance roller 124 and in the vicinity of the sheet ejection port.

An operation panel 10 is provided on the exterior of the sheet processing device 100. The operation panel 10 serves as a display-operation device to display information of the sheet processing device 100 and receives input of the operation of the sheet processing device 100. The operation panel 10 also serves as a notification device to output a perceptual signal to a user. As an alternative, a notification device other than the operation panel 10 may be separately provided in the sheet processing device 100.

The sheet processing device 100 according to the present embodiment loads lamination sheets S and inner sheets P on separate trays. As a lamination sheet S is conveyed in the sheet processing device 100, the sheet processing device 100 separates and opens the lamination sheet S into two sheets and inserts the inner sheet P into an opening of the lamination sheet S. The lamination sheet S into which the inner sheet P is inserted is conveyed to the heat-pressing conveyance path 128 or the non-heat-pressing conveyance path 126, and is ejected and stacked on the sheet ejection tray 104.

Thus, the sheet processing device 100 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations is carried out automatically without any aid of a user, and therefore the sheet laminator enhances and provides the convenience better than a know sheet laminator employing a known technique.

Figure 25:
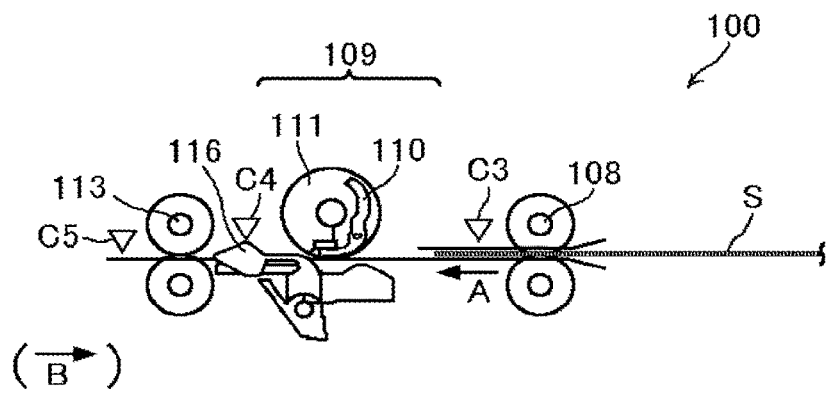
FIG. 25 is a schematic view illustrating a main part of the sheet processing device of FIG. 24.

FIG. 25 is a schematic view illustrating the main part of the sheet processing device of FIG. 24. As illustrated in FIG. 25, each of the entrance roller pair 108 and the exit roller pair 113 is, for example, two rollers paired with each other and driven by a driver such as a motor. The controller 800 causes the driver to control rotations of the entrance roller pair 108 and the exit roller pair 113. The entrance roller pair 108 is driven to rotate in one direction. The exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113. The sheet conveyance direction indicated by arrow A in FIG. 25 is referred to as a forward conveyance direction or a direction A.

The exit roller pair 113 can switch the direction of rotation between the forward direction and the reverse direction. The exit roller pair 113 conveys the lamination sheet S nipped by the rollers of the exit roller pair 113 toward the sheet ejection tray 104 (see FIG. 24) in the forward conveyance direction and also conveys the lamination sheet S toward the winding roller 109 in the direction opposite the forward conveyance direction (to convey the lamination sheet S in reverse). The sheet conveyance direction toward the winding roller 109, which is indicated by arrow B in FIG. 4 and a direction opposite to the forward conveyance direction, is referred to as a reverse conveyance direction or a direction B.

The sheet processing device 100 is provided with the winding roller 109 as a rotator and the separation claw 116 that are disposed between the entrance roller pair 108 and the exit roller pair 113. The winding roller 109 is driven by a driver such as a motor to rotate in the forward and reverse directions. The direction of rotation of the winding roller 109 is switchable between the forward direction (clockwise direction) and the reverse direction (counterclockwise direction). The controller 800 controls the driver to control rotations of the winding roller 109 and operations of the separation claw 116.

The winding roller 109 includes a roller 111 and a movable gripper 110 disposed on the roller 111 to grip the lamination sheet S. The movable gripper 110 grips the leading end of the lamination sheet S together with the roller 111. The gripper 110 may be integrated with the outer circumference of the roller 111, or may be a separate component. The controller 800 controls a driver to move the gripper 110.

Next, a description is given of a series of operations performed in the sheet processing device 100, with reference to FIGS. 24 to 35B. The series of operations performed by the sheet processing device 100 indicates the operations from separating the lamination sheet S to inserting the inner sheet P into the lamination sheet S. The controller 800 controls the series of operations performed by the sheet processing device 100. Note that, in FIGS. 26 to 35B, elements identical to the elements illustrated in FIGS. 24 and 25 are given identical reference numerals, and the descriptions these elements are omitted.

In FIG. 24, the lamination sheet S is loaded on the sheet tray 102 such that a part of the bonded side of the lamination sheet S is located downstream from the pickup roller 105 in the sheet feed direction (sheet conveyance direction). In the sheet processing device 100, the pickup roller 105 picks up the lamination sheet S from the sheet tray 102, and the conveyance roller pair 107 conveys the lamination sheet S toward the entrance roller pair 108.

Next, as illustrated in FIG. 25, the entrance roller pair 108 conveys the lamination sheet S toward the winding roller 109. In the sheet processing device 100, the entrance roller pair 108 conveys the lamination sheet S with the bonded end, which is one of four sides of the lamination sheet S, as the downstream side in the forward conveyance direction A as indicated by arrow A in FIG. 2.

Figure 26:
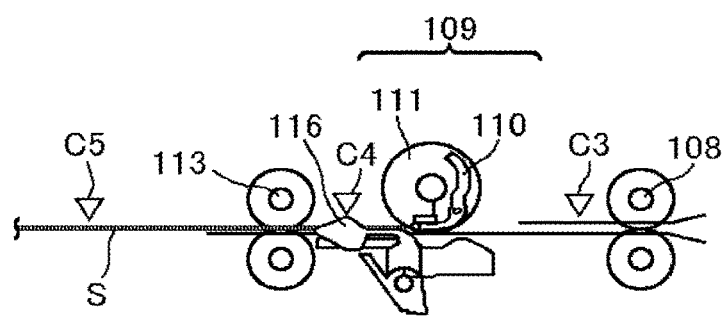
FIG. 26 is a schematic view illustrating the main part of the sheet processing device in a state subsequent to the state in FIG. 25.

Subsequently, as illustrated in FIG. 26, the controller 800 of the sheet processing device 100 temporarily stops conveyance of the lamination sheet S when the trailing end of the lamination sheet S in the forward conveyance direction has passed the winding roller 109. Note that these operations are performed by conveying the lamination sheet S from the conveyance sensor C3 by a specified amount in response to the timing at which the conveyance sensor C3 detected the leading end of the lamination sheet S.

Figure 27:
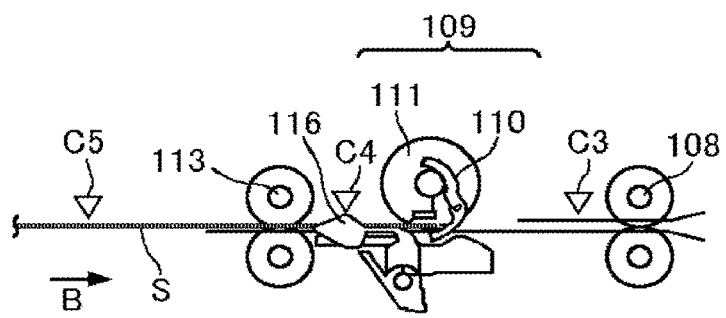
FIG. 27 is a schematic view illustrating the main part of the sheet processing device in a state subsequent to the state in FIG. 26.

Next, as illustrated in FIG. 27, the controller 800 of the sheet processing device 100 causes the gripper 110 to open and the exit roller pair 113 to rotate in the reverse direction to convey the lamination sheet S in the reverse conveyance direction (sheet conveyance direction B) toward the opened portion of the gripper 110.

Figure 28:
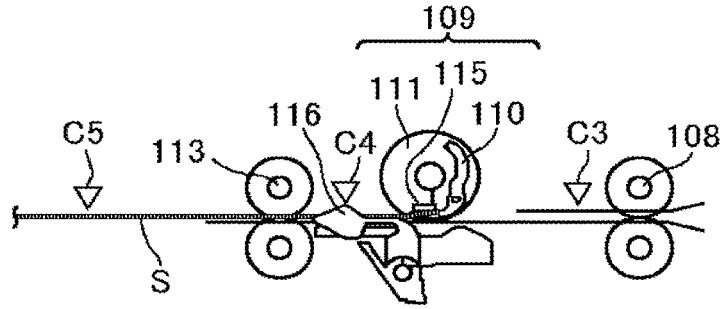
FIG. 28 is a schematic view illustrating the main part of the sheet processing device in a state subsequent to the state in FIG. 27.

Subsequently, as illustrated in FIG. 28, the controller 800 of the sheet processing device 100 causes the exit roller pair 113 to stop rotating to stop conveyance of the lamination sheet S when the end of the lamination sheet S is inserted into the opened portion of the gripper 110 and causes the driver to close the gripper 110 to grip the end of the lamination sheet S. Specifically, the gripper 110 is configured to sandwich and grip the lamination sheet S with a receiving portion 115 of the winding roller 109 from a direction perpendicular to the end portion of the lamination sheet S. The receiving portion 115 is formed so as to face the gripper 110. Note that these operations are performed when the lamination sheet S is conveyed by the specified amount.

Here, in the present embodiment, at least one of the gripper 110 and the receiving portion 115 is formed of an elastic material such as rubber, a spring, or a leaf spring. As compared with a configuration in which the gripper 110 and the receiving portion 115 have rigid bodies made of metal or resin, such a configuration can enhance the gripping force to grip the lamination sheet S and prevent the surfaces of the lamination sheet S from being damaged. In particular, when both the gripper 110 and the receiving portion 115 are made of an elastic material, such an effect is likely to be exhibited.

Figure 29:
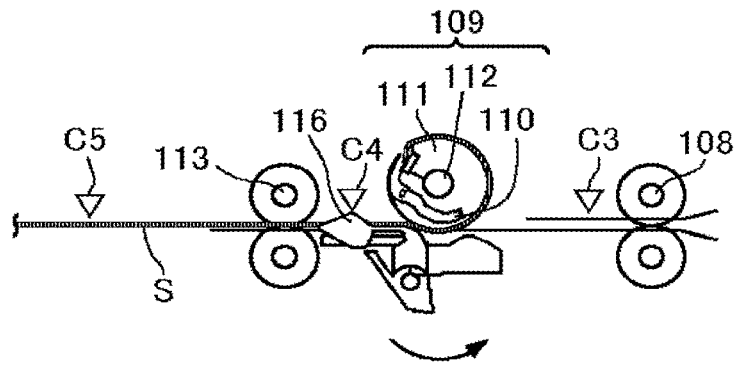
FIG. 29 is a schematic view illustrating the main part of the sheet processing device in a state subsequent to the state in FIG. 28.

Then, as illustrated in FIG. 29, the controller 800 of the sheet processing device 100 causes the driver to rotate the winding roller 109 in the counterclockwise direction in FIG. 6 to wind the lamination sheet S around the winding roller 109. Here, the lamination sheet S is wound around the winding roller 109 from the side where the two sheets of the lamination sheet S are overlapped but not bonded.

The winding roller 109 is rotatable about a rotary shaft 112 in the forward direction and in the reverse direction. The controller 800 controls a drive motor that drives the winding roller 109.

Figure 30:
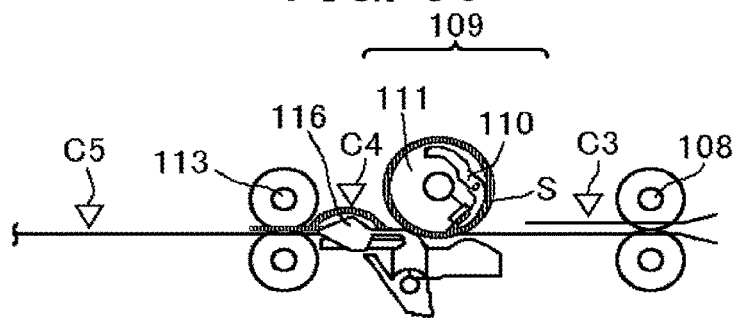
FIG. 30 is a schematic view illustrating the main part of the sheet processing device in a state subsequent to the state in FIG. 29.

As illustrated in FIG. 30, when the lamination sheet S that is the two-ply sheet is wound around the winding roller 109, a winding circumferential length difference is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets constructing the two-ply sheet. As the separation claws 116 are inserted into the space generated as described above, from both sides of the lamination sheet S, the space between the two sheets is reliably maintained. Note that these operations are performed by conveying the lamination sheet S from the conveyance sensor C5 by a specified amount in response to the timing at which the conveyance sensor C5 detected the leading end of the lamination sheet S.

Here, a description is given of the separation claw 116.

Figure 36:
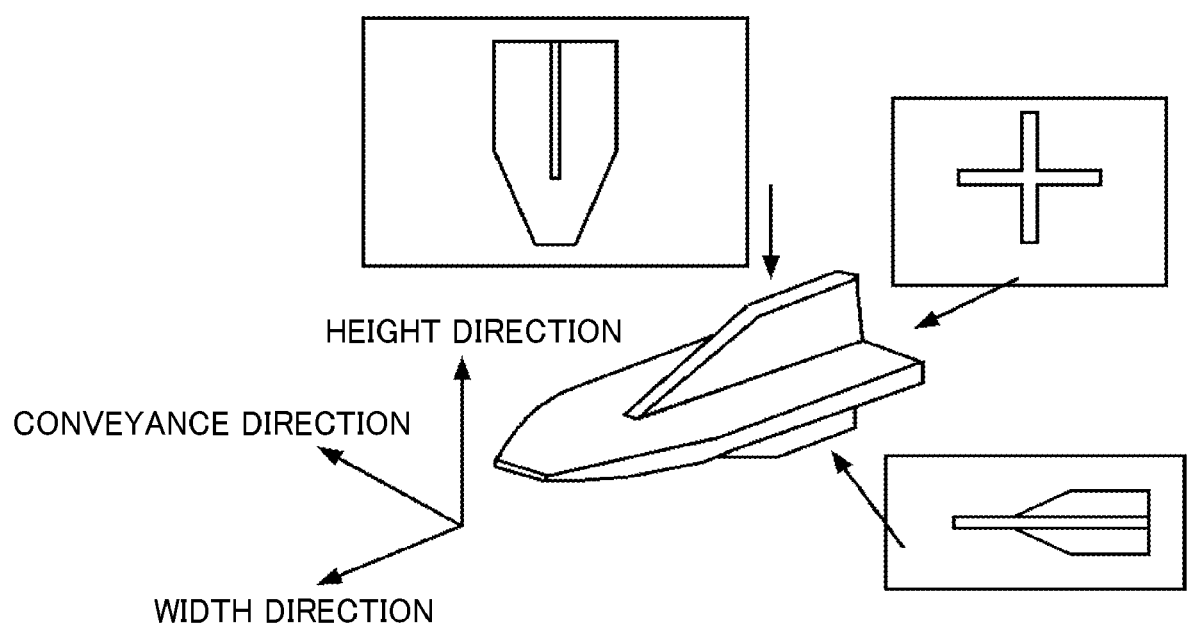
FIG. 36 is a schematic view illustrating one of separation claws provided in the sheet processing device.
Figure 38:
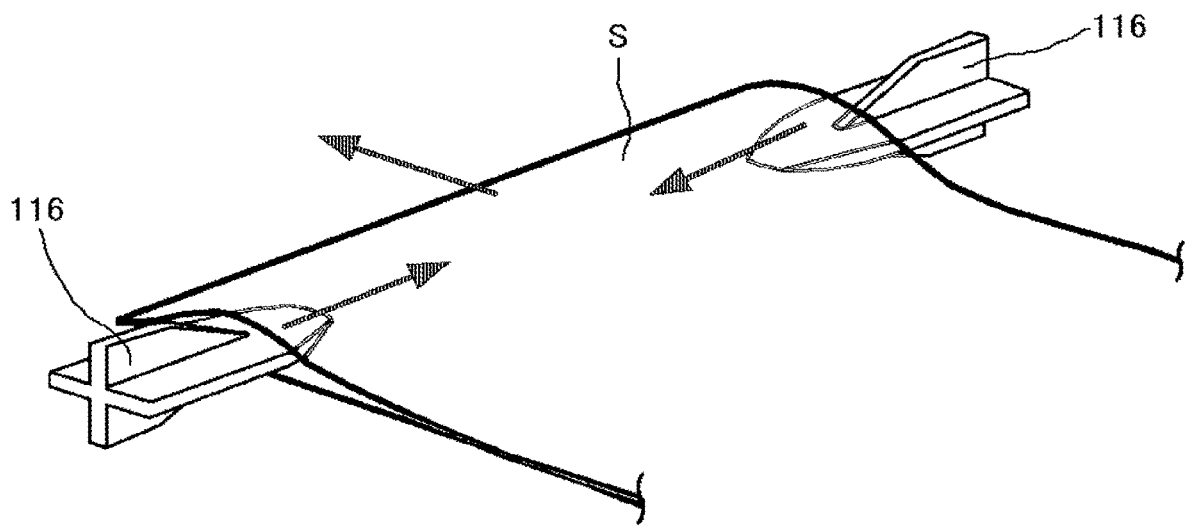
FIG. 38 is a perspective view illustrating a state in which the separation claws are inserted into a lamination sheet.

FIG. 36 is a schematic view illustrating the separation claw 116 of the sheet processing device 100. FIGS. 37A and 37B are schematic views illustrating an example of a drive configuration of the separation claw 116. FIG. 38 is a perspective view illustrating a state in which the separation claws 116 are inserted in the lamination sheet S.

As illustrated in FIG. 36, when viewed from the upstream side in the sheet conveyance direction, the size in the height (vertical direction) of the separation claw 116 gradually increases from the center in the width direction to the trailing end (right end in FIG. 36). Further, when viewed from the vertical direction, the size of the separation claw 116 in the sheet conveyance direction gradually increases from the leading end to the center. When viewed from the width direction, the separation claw 116 has a cross shape.

Further, in the present embodiment, referring to FIGS. 37A and 37B, the two separation claws 116 are disposed facing each other and moved in the approaching direction and the separating direction, for example, by a belt drive mechanism as illustrated in FIG. 37A and by a rack and pinion mechanism illustrated in FIG. 37B.

As described above, in the present embodiment, each of the separation claws 116 having the above-mentioned shape is movable in the width direction of the lamination sheet S. Accordingly, the separation claws 116 are smoothly inserted into the gap created in the lamination sheet S as illustrated in FIG. 38.

Figure 31:
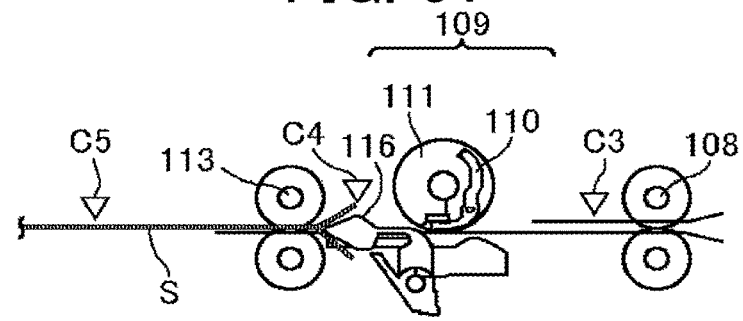
FIG. 31 is a schematic view illustrating the main part of the sheet processing device in a state subsequent to the state in FIG. 30.

A description of a series of operations of the sheet processing device 100 is continued below. With the separation claws 116 inserted in the space in the lamination sheet S, the controller 800 in the sheet processing device 100 causes the driver to rotate the winding roller 109 in the clockwise direction (see FIG. 30). The controller 800 then causes the space generated in the lamination sheet S to shift to the trailing end of the lamination sheet S in the forward conveyance direction (sheet conveyance direction A), as illustrated in FIG. 31. After the winding roller 109 has been rotated by a specified amount, the controller 800 causes the driver to open the gripper 110. As a result, the trailing end of the lamination sheet S is separated into the upper and lower sheets.

In this state, the controller 800 of the sheet processing device 100 causes the driver to temporarily stop the conveyance of the lamination sheet S and to further move the separation claws 116 in the width direction of the lamination sheet S to separate the whole area of the trailing end of the lamination sheet S. Note that these operations are performed by conveying the lamination sheet S from the conveyance sensor C5 by a specified amount in response to the timing at which the conveyance sensor C5 detected the leading end of the lamination sheet S.

Figure 39:
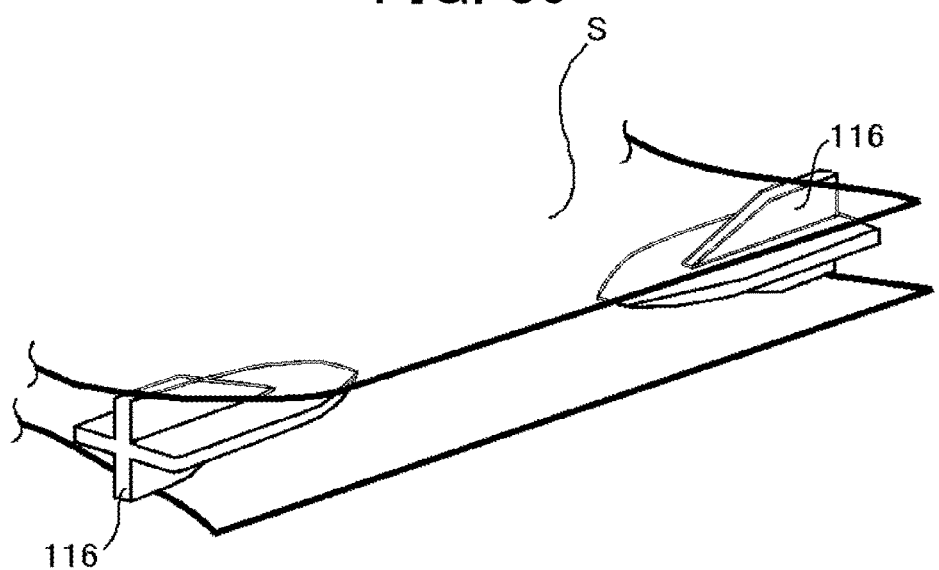
FIG. 39 is a perspective view illustrating the separation claws and the lamination sheet in a state illustrated in FIG. 31.

FIG. 39 is a perspective view illustrating the separation claws 116 and the lamination sheet S in the state illustrated in FIG. 31. Since each separation claw 116 further has a branching guide that functions as a guide to guide the two sheets separated from the lamination sheet S in different directions due to the above-described shape (see FIG. 36), the two sheets separated from the lamination sheet S may be kept in postures to be conveyed to different sheet conveyance passages.

Figure 40:
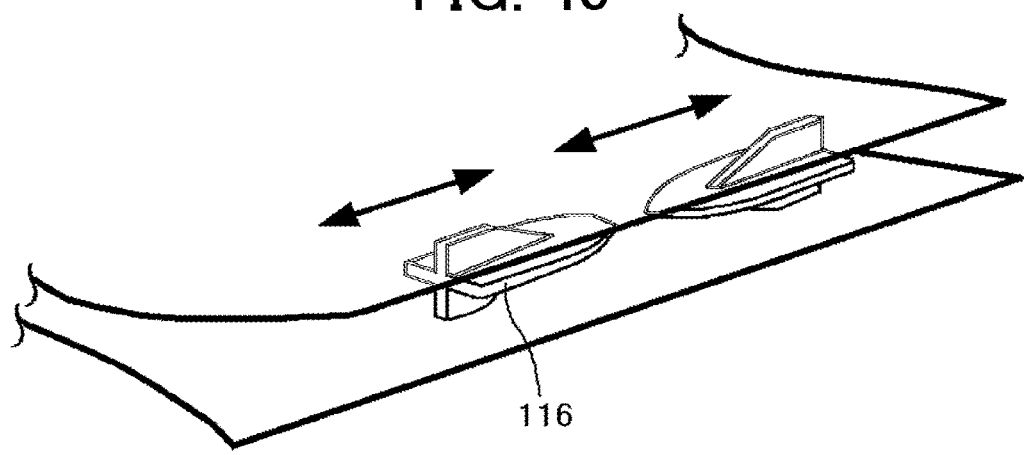
FIG. 40 is a perspective view illustrating the separation claws and the lamination sheet in another state illustrated in FIG. 31.

Further, since the separation claws 116 are movable in the width direction (see FIGS. 37A and 37B), the separation claws 116 are positioned suitably to support the postures of the two sheets of the lamination sheet S as illustrated in FIG. 40. Therefore, even when the size of the lamination sheet S and the rigidity (or retentivity corresponding to the propensity to retain a particular shape once applied, such as curvature of paper) of the lamination sheet S change, the two sheets separated from the lamination sheet S are guided in desired branching directions. This configuration eliminates the need for a lamination sheet separating member over the whole area in the width direction of the sheet conveyance passage and a driver to drive the lamination sheet separating member, thereby reducing the cost when compared with the configuration of a known sheet processing device.

Figure 32:
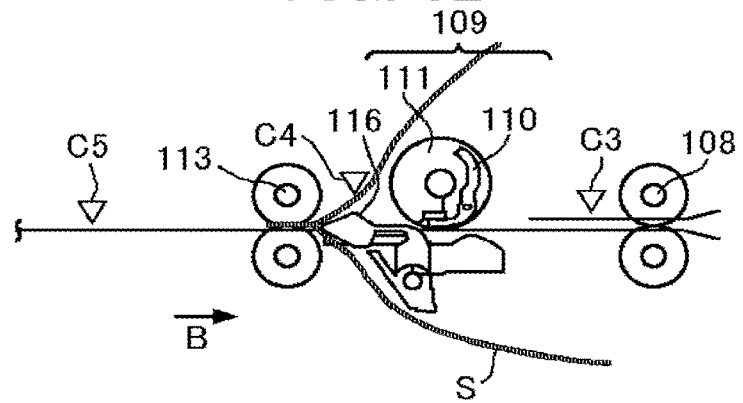
FIG. 32 is a schematic view illustrating the main part of the sheet processing device in a state subsequent to the state in FIG. 31.

Next, as illustrated in FIG. 32, after the separation claws 116 have separated the whole area of the trailing end of the lamination sheet S, the controller 800 of the sheet processing device 100 causes the driver to rotate the exit roller pair 113 in the counterclockwise direction in FIG. 32 to convey the lamination sheet S in the reverse conveyance direction (sheet conveyance direction B). That is, the separation claws 116 guide the two sheets separated from the lamination sheet S in the upper and lower directions, respectively, and therefore the two sheets are fully separated.

Then, the controller 800 of the sheet processing device 100 causes the driver to temporarily stop the conveyance of the lamination sheet S, so that the bonded portion of the lamination sheet S is held (nipped) by the exit roller pair 113. Accordingly, one end of the lamination sheet S is bonded as the bonded side of the lamination sheet S and the other end of the lamination sheet S is opened largely.

Note that these operations are performed by conveying the lamination sheet S from the conveyance sensor C5 by a specified amount in response to the timing at which the conveyance sensor C5 detected the leading end of the lamination sheet S.

Figure 41A:
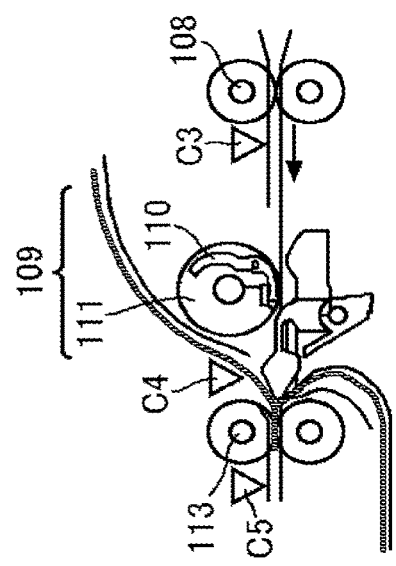
FIGS. 41A, 41B, and 41C are schematic views, each illustrating a sheet guide passage of two sheets separated from a lamination sheet, according to a variation of the present disclosure.
Figure 41B:
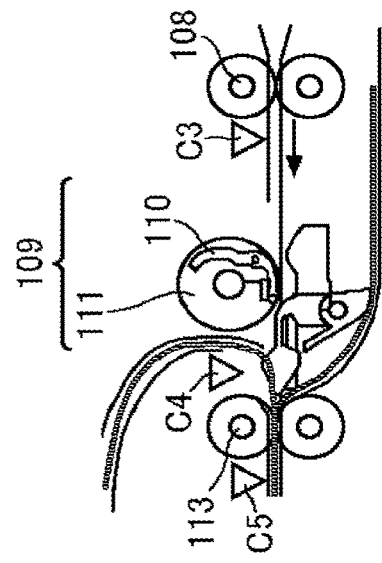
Figure 41C:
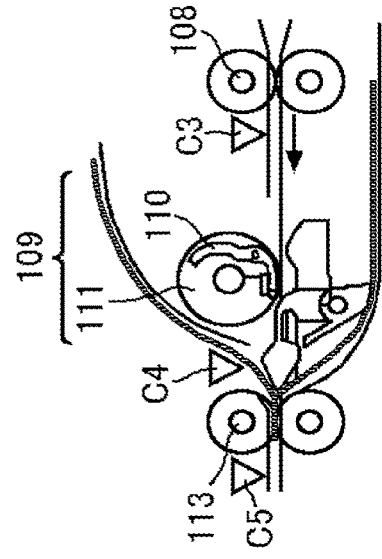

Variation A description is given of the sheet processing device having another example of a sheet guide passage of two sheets separated from a lamination sheet S, with reference to FIGS. 41A, 41B, and 41C. FIGS. 41A, 41B, and 41C are schematic views, each illustrating another example of a sheet guide passage of two sheets separated from a lamination sheet S. The sheet processing device 100 illustrated in FIG. 41A has the same sheet guide passages as the sheet processing device 100 illustrated in FIG. 32 to guide the upper and lower sheets in the same direction from the bonded portion of the lamination sheet S. Alternatively, as illustrated in FIG. 41B, the sheet processing device 100 may have sheet guide passages extending in different directions in an inverted S shape to guide the upper and lower sheets in different directions. Further, as illustrated in FIG. 41C, the sheet processing device 100 may have sheet guide passages extending in different directions in an S shape to guide the upper and lower sheets in different directions which are opposite the directions of the sheet guide passages in the sheet processing device 100 illustrated in FIG. 41B.

Figure 33:
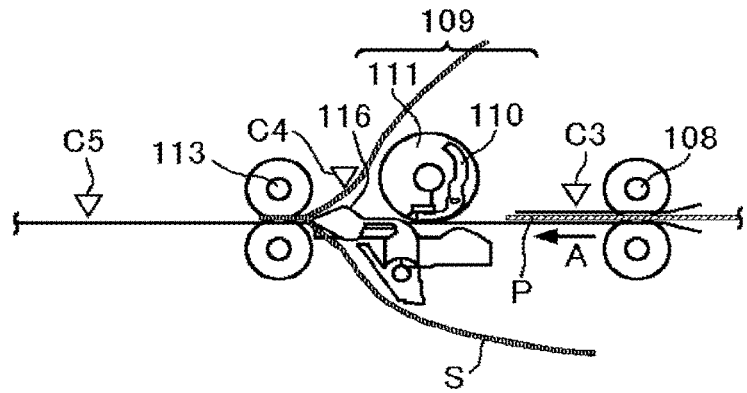
FIG. 33 is a schematic view illustrating the main part of the sheet processing device in a state subsequent to the state in FIG. 32.

Then, as illustrated in FIG. 33, the controller 800 of the sheet processing device 100 causes the entrance roller pair 108 to rotate to convey the inner sheet PM conveyed from the sheet feed tray 103 (see FIG. 24) toward the exit roller pair 113 in the forward conveyance direction (sheet conveyance direction A).

Figure 34:
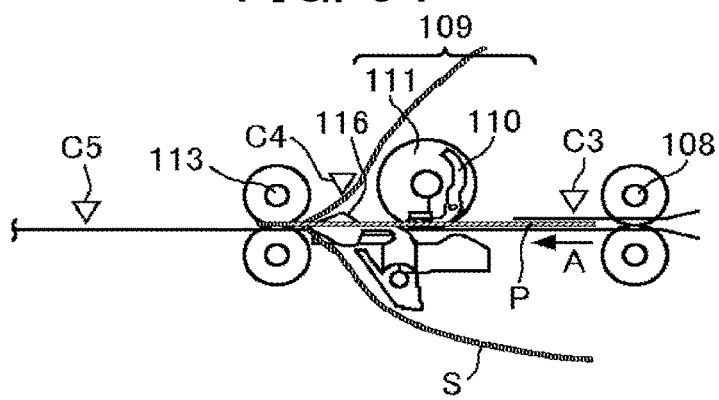
FIG. 34 is a schematic view illustrating the main part of the sheet processing device in a state subsequent to the state in FIG. 33.

Subsequently, as illustrated in FIG. 34, the controller 800 of the sheet processing device 100 causes the exit roller pair 113 to rotate so that the lamination sheet S and the inner sheet P converge to insert the inner sheet PM into the lamination sheet S from the open portion (on the other end) of the lamination sheet S.

Figure 35A:
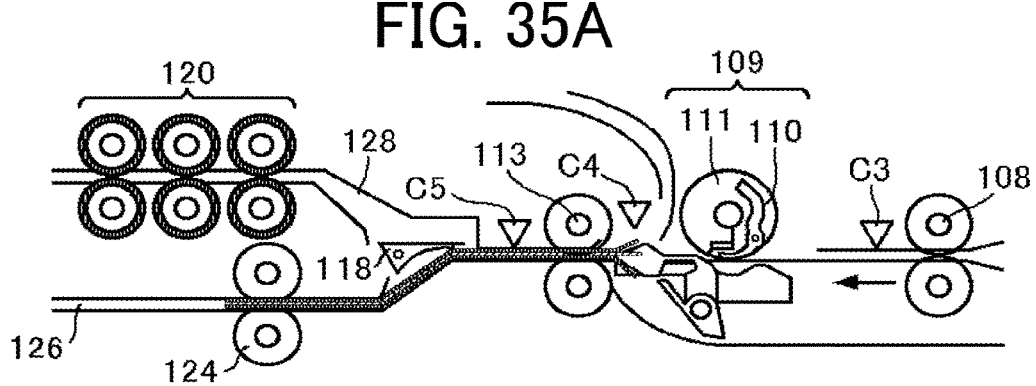
FIGS. 35A and 35B are schematic views, each illustrating the main part of the sheet processing device, subsequent to the state in FIG. 34.

Then, as illustrated in FIG. 35A, the exit roller pair 113 of the sheet processing device 100 conveys the lamination sheet S in which the inner sheet P is inserted, in the forward conveyance direction (sheet conveyance direction A). Thus, the two sheets of the lamination sheet S are overlapped one on another again so as to close the open portion of the lamination sheet S. When the fixing processing is not performed, as illustrated in FIG. 35A, the branch claw 118 is driven so that the exit roller pair 113 or a roller disposed downstream from the exit roller pair 113 in the sheet conveyance direction conveys the lamination sheet S, in which the inner sheet P is sandwiched, to the non-heat-pressing conveyance path 126, and is ejected and stacked on the sheet ejection tray 104 (see FIG. 24).

Figure 35B:
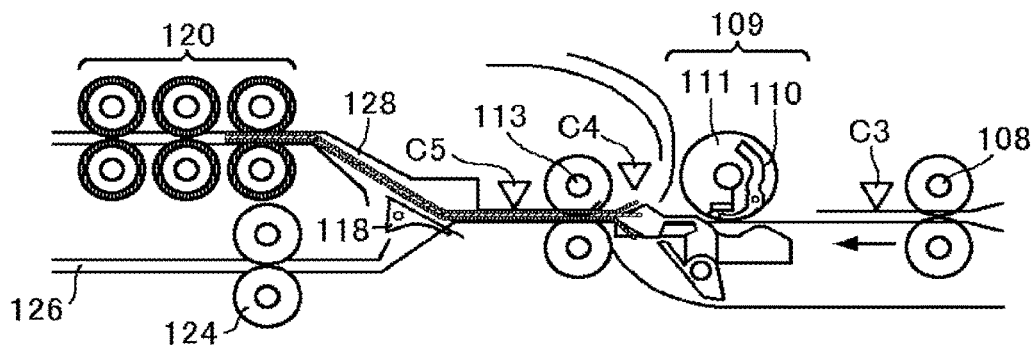

When the fixing processing is performed, as illustrated in FIG. 35B, the branch claw 118 is driven to switch the conveyance path, and the lamination sheet S in which the inner sheet P is sandwiched is conveyed to the heat-pressing conveyance path 128 leading to the heat-pressing device.

As described above, the controller 800 of the sheet processing device 100 according to the present embodiment causes the driver to open the lamination sheet S so as to insert and nip the inner sheet P into the lamination sheet S. Accordingly, since the configuration of the sheet processing device 100 is simpler than the configuration of a known sheet laminator employing a vacuum device, the entire sheet processing device has a simpler and smaller configuration.

As illustrated in FIG. 24, the sheet processing device 100 according to the present embodiment loads the lamination sheet S and the inner sheet P on separate trays and feeds and conveys the lamination sheet S and the inner sheet P separately. Accordingly, the convenience is enhanced without loading the lamination sheet S and the inner sheet P in the predetermined order. Note that, in the present embodiment, the lamination sheet S is loaded on the sheet tray 102 and the inner sheet P is loaded on the sheet feed tray 103. However, the tray on which the lamination sheet S is loaded and the tray on which the inner sheet P is loaded are not limited to the above-described trays. For example, the inner sheet P may be loaded on the sheet tray 102 and the lamination sheet S may be loaded on the sheet feed tray 103.

Figure 42A:
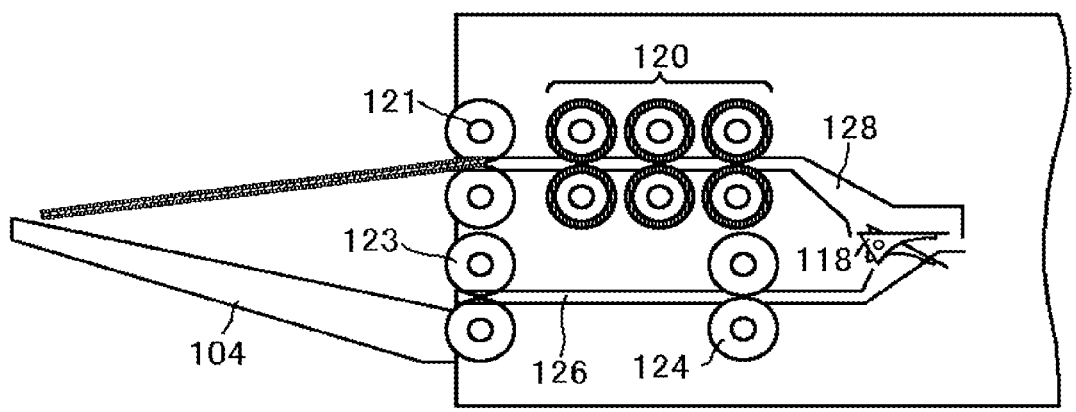
FIGS. 42A and 42B are schematic side views illustrating sheets conveyed to a heat-pressing conveyance path and a non-heat-pressing conveyance path 126.
Figure 42B:
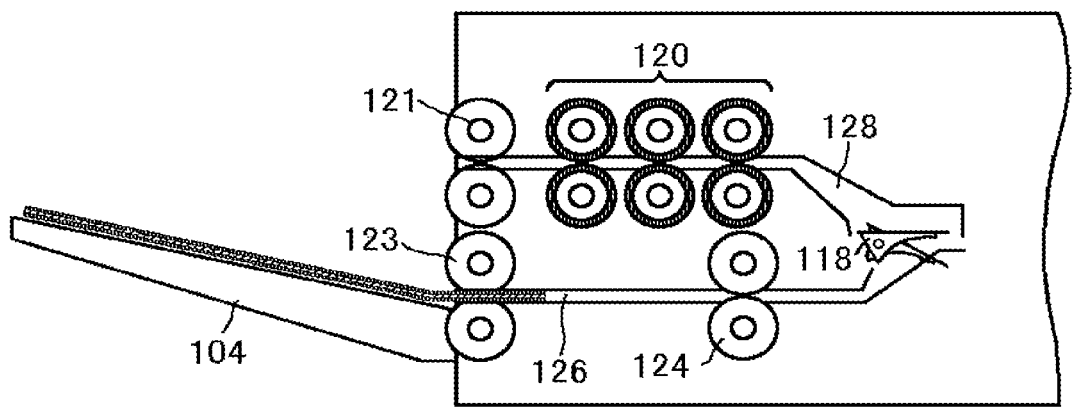

FIGS. 42A and 42B are schematic side views illustrating the sheets transported to the heat-pressing conveyance path 128 and the non-heat-pressing conveyance path 126. As illustrated in FIGS. 42A and 42B, the heat-pressing conveyance path 128 is formed above the non-heat-pressing conveyance path 126. As a result, the non-heat-pressing conveyance path 126 and the sheet ejection tray 104 are disposed close to each other, and the stack quality of the non-heat-pressed sheet, which may be disturbed during stacking, is stabilized (see FIG. 42B). Since the heat stored in the heat-pressing rollers 120 are dissipated upward, the arrangement of the heat-pressing conveyance path 128 at an upper position can restrain a non-heat-pressed sheet conveyed through the non-heat-pressing conveyance path 126 from being affected by heat.

The heat-pressed sheet conveyed to the heat-pressing conveyance path 128 is conveyed by the ejection roller 121 near the sheet ejection port and ejected to the sheet ejection tray 104 (see FIG. 42A). On the other hand, the non-heat-pressed sheet conveyed to the non-heat-pressed conveyance path 126 is conveyed by the ejection roller 123 near the sheet ejection port, and is ejected to the same sheet ejection tray 104 as the lamination sheet S conveyed to the heat-pressed conveyance path 128 (see FIG. 42B).

Whether the fixing processing is to be performed may be specified by selecting "laminate all" or "laminate odd-numbered sheets" from the operation panel 10 or a printer driver for printing settings from a personal computer.

Figure 43:
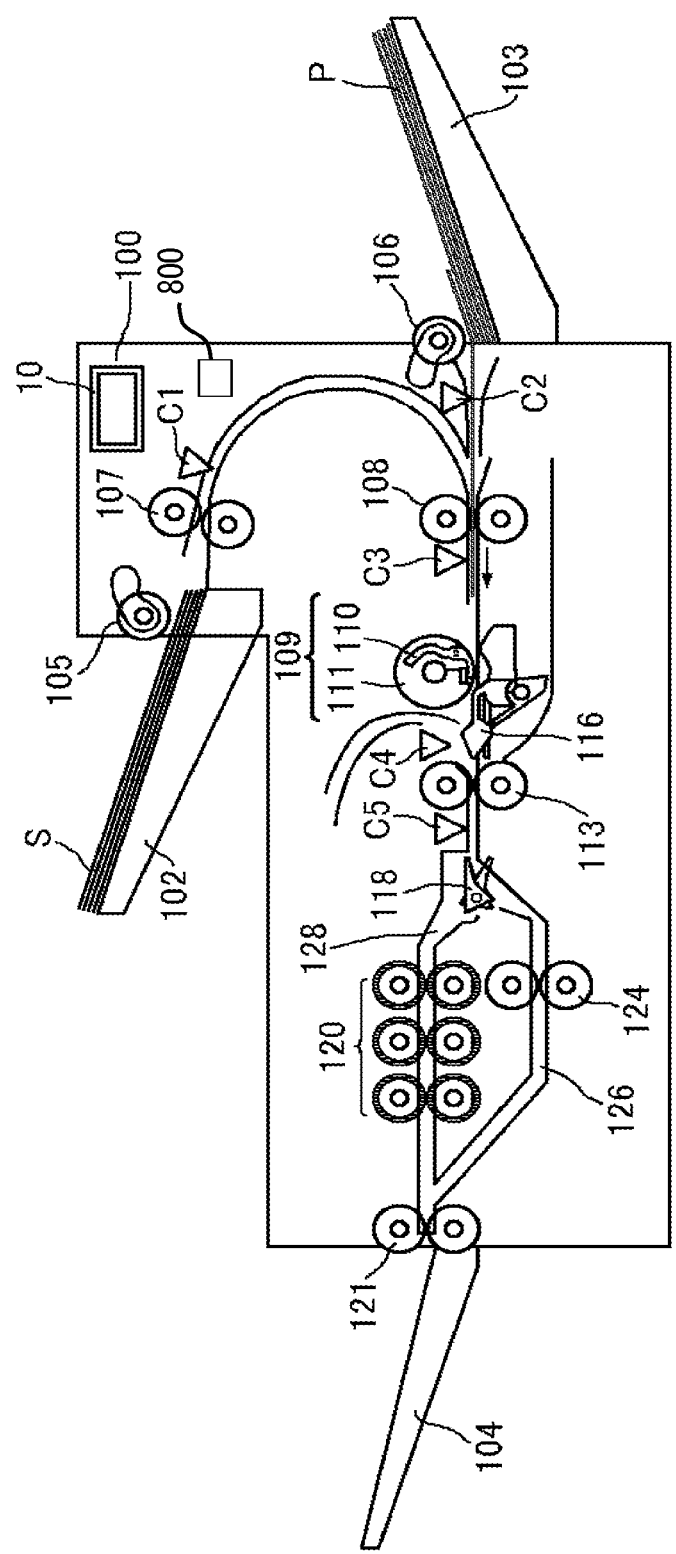
FIG. 43 is a schematic view illustrating the overall configuration of a sheet processing device according to an embodiment of the present disclosure.

Next, a description is given of a sheet processing device according to according to an embodiment of the present disclosure, with reference to FIG. 43. FIG. 43 is a schematic view illustrating the overall configuration of a sheet processing device according to an embodiment of the present disclosure. Compared with the sheet processing device of FIG. 24, the sheet processing device 100 according to the present embodiment does not have the ejection roller 123, and the non-heat-pressing conveyance path 126 and the heat-pressing conveyance path 128 merge at a position downstream from the heat-pressing roller 120 and upstream from the ejection roller 121 in the conveyance direction. Accordingly, the sheet conveyance path is branched into the non-heat-pressing conveyance path 126 and the heat-pressing conveyance path 128 at the location at which the branch claw 118 is disposed, and then rejoins upstream from the ejection roller 121 in the sheet conveyance direction. Thus, after the inner sheet P is inserted into the lamination sheet S, the lamination sheet S is ejected onto the same sheet ejection tray 104 directly below the sheet ejection port. Since the sheets ejected from the non-heat-pressing conveyance path 126 and the heat-pressing conveyance path 128 are stacked in the same way, the stack quality is stabilized.

The ejection roller 121 as an ejector that ejects the heat-pressed sheet to the sheet ejection tray 104 is disposed downstream from the heat-pressing conveyance path 128. The sheet conveyance path from the heat-pressing rollers 120 to the ejection roller 121 is constructed in a substantially straight line. Accordingly, if the sheet is curved before the heat of the sheet cools down, the sheet may be solidified in a curved shape. However, in the present embodiment, the sheet conveyance path downstream from the heat-pressing rollers 120 is formed in a straight line, thus restraining the sheet from being solidified in a curved shape.

In the sheet processing device of FIG. 24, when a lamination sheet S is ejected from the heat-pressing conveyance path 128 located above, the distance to the sheet ejection tray 104 is large, and the stacked sheets might be disturbed. For the sheet processing device 100 according to the above, stable stackability can be ensured regardless of which conveyance path the lamination sheet S is ejected from.

Figure 46:
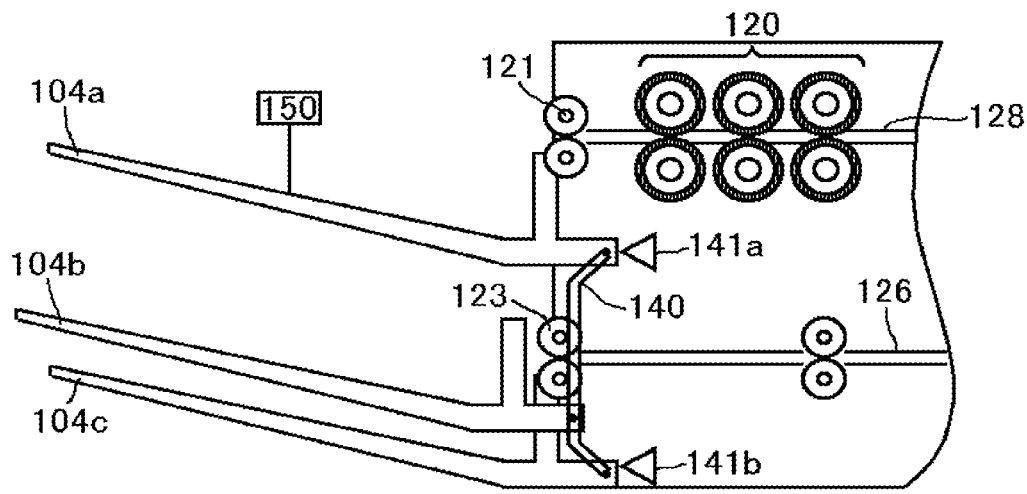
FIG. 46 is a schematic side view illustrating a lift that raises and lowers a sheet ejection tray.

Next, a description is given of a sheet processing device according to according to an embodiment of the present disclosure, with reference to FIG. 46. FIG. 46 is a schematic view illustrating the overall configuration of a sheet processing device according to an embodiment of the present disclosure. In the sheet processing device 100 according to the present embodiment, similarly to the sheet processing device of FIG. 24, the sheet conveyance path is divided into the non-heat-pressing conveyance path 126 and the heat-pressing conveyance path 128 at the location where the branch claw 118 is arranged. Since the sheet conveyance path is branched, a lamination sheet S is ejected to the sheet ejection tray 104 as it is. The sheet ejection tray 104 is configured to be movable up and down. With such a configuration, the distance to the sheet ejection tray 104 does not increase regardless of which conveyance path the lamination sheet S is ejected from. Thus, stable stackability can be ensured.

Figure 44:
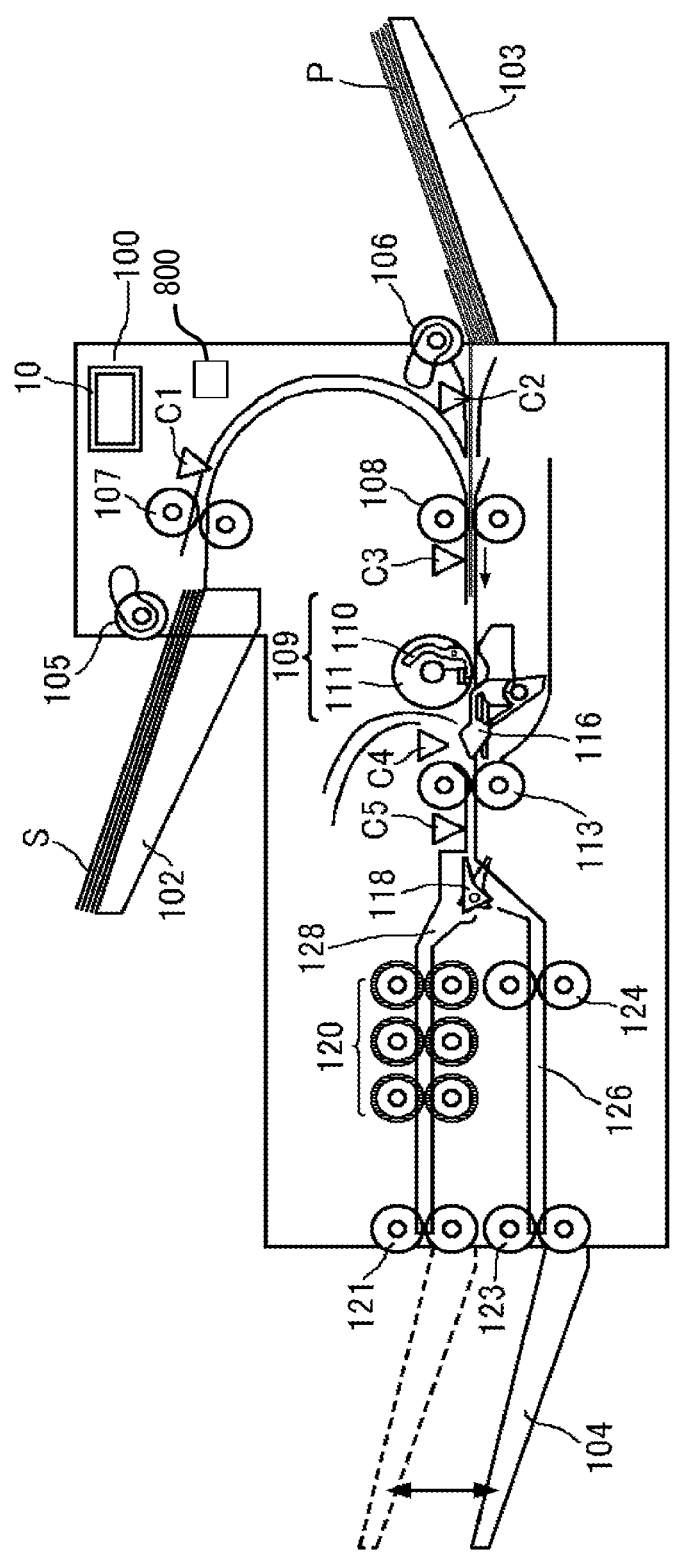
FIG. 44 is a schematic view illustrating the overall configuration of a sheet processing device according to an embodiment of the present disclosure.
Figure 45A:
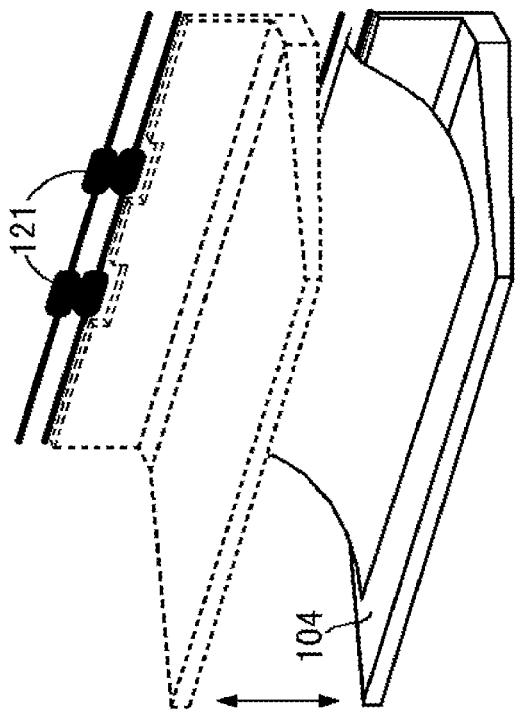
FIGS. 45A and 45B are perspective views of a sheet ejection portion of the sheet processing device illustrated in FIG. 44.
Figure 45B:
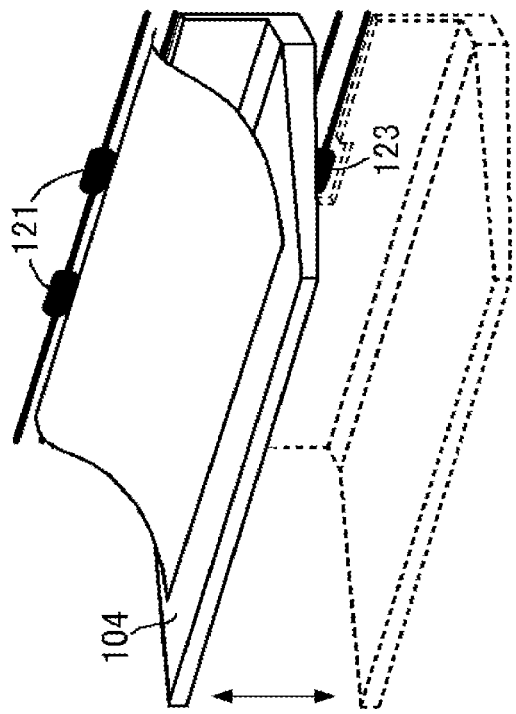

FIGS. 45A and 45B are perspective views of a sheet ejection portion of the sheet processing device 100 illustrated in FIG. 44. As illustrated in FIG. 45A, when a lamination sheet S is conveyed in the non-heat-pressing conveyance path 126, the sheet ejection tray 104 moves to a lower position to receive the non-heat-pressed sheet. As illustrated in FIG. 45B, when the lamination sheet S is conveyed through the heat-pressed conveyance path 128, the sheet ejection tray 104 moves upward to receive the heat-pressed sheet.

FIG. 46 is a schematic side view illustrating a lift that raises and lowers the sheet ejection tray 104. When the sheet ejection tray 104 moves up and down as illustrated in FIGS. 45A and 45B, the sheet ejection tray 104 might interfere with the ejection rollers 121 and 123. Therefore, the sheet processing device 100 has a lift that raises and lowers the sheet ejection tray 104, and the sheet ejection tray 104 is raised and lowered by the lift according to the conveyance path through which the lamination sheet S is conveyed. Thus, the lamination sheets S ejected from the non-heat-pressing conveyance path 126 and the heat-pressing conveyance path 128 are stacked in the same manner, and the stack quality is stabilized.

As illustrated in FIG. 46, the lift that raises and lowers the sheet ejection tray 104 includes a guide rail 140 and a traction member 150. The guide rail 140 guides the sheet ejection tray 104 up, down, left, and right. The traction member 150 made of a belt, a wire, or the like connected to the sheet ejection tray 104 to pull the sheet ejection tray 104. The guide rail 140 has a body extending in the vertical direction and a leading end portion extending obliquely from the body. Since the sheet ejection tray 104 can be moved not only in the vertical direction but also in the sheet conveyance direction by the guide rail 140, the sheet ejection tray 104 can avoid the ejection rollers 121 and 123 when the sheet ejection tray 104 moves up and down. In FIG. 46, the sheet ejection tray 104a is engaged with an upper leading-end portion of the guide rail 140 and is at an upper position, and the sheet ejection tray 104c is engaged with a lower leading-end portion of the guide rail 140 and is at the lower position. The ejection tray 104b is within the main body of the guide rail 140 and is between the upper position and the lower position. The upper position of the sheet ejection tray 104a is detected by a sensor 141a, and the lower position of the sheet ejection tray 104c is detected by a sensor 141b.

Figure 47A:
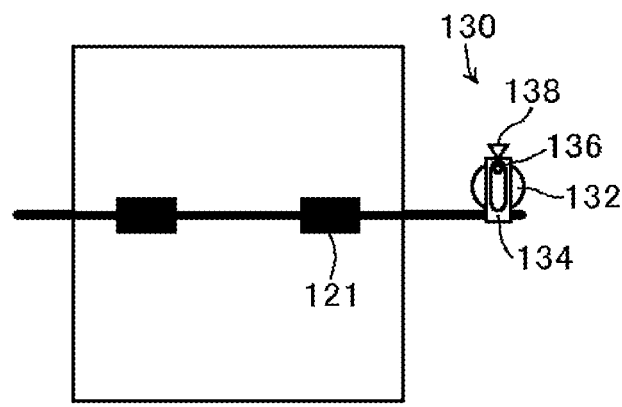
FIGS. 47A, 47B, and 47C are schematic plan views illustrating a sheet sorting mechanism that sorts sheets when the sheets are ejected to a sheet ejection tray.
Figure 47B:
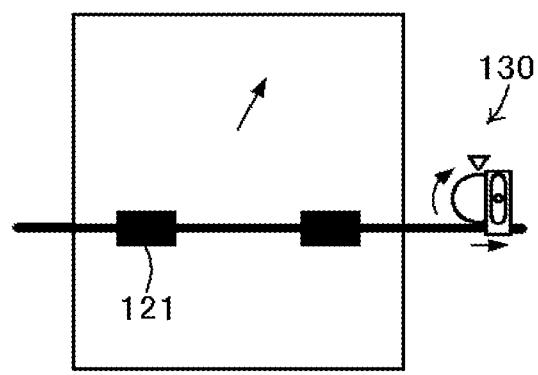
Figure 47C:
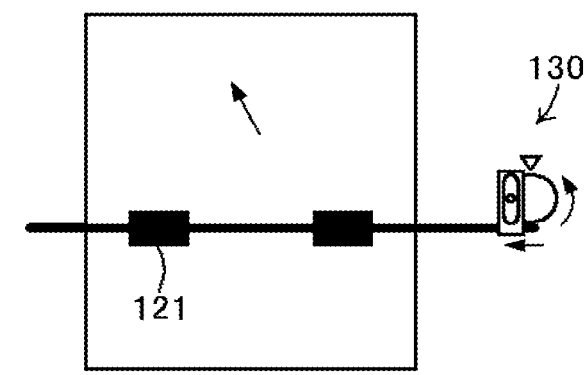

FIGS. 47A, 47B, and 47C are schematic plan views illustrating a sheet sorting mechanism that sorts sheets when the sheets are ejected to the sheet ejection tray 104. The sheet processing device 100 includes a sheet sorting mechanism 130 capable of changing the stack position of a lamination sheet S on the sheet ejection tray 104 in a direction orthogonal to the sheet conveyance direction. A heat-pressed sheet and a non-heat-pressed sheet to be ejected to the sheet ejection tray 104 are sorted on the sheet ejection tray 104 by the sheet sorting mechanism 130. Separating the heat-pressed sheet and the non-heat-pressed sheet in this way can facilitate handling of sheets when only non-heat-pressed sheets are processed by another processing device.

For example, the sheet sorting mechanism 130 as illustrated in FIGS. 47A, 47B, and 47C is installed on, for example, the ejection roller 121. The seat sorting mechanism 130 includes a shift cam 132, a shift link 134, a shift cam stud 136, and a shift home-position (HP) sensor 138. As the shift cam 132 rotates, the shift link 134 follows the movement of the shift cam stud 136. Accordingly, the ejection roller 121 moves in the direction perpendicular to the sheet conveyance direction, to shift a lamination sheet S. Thus, sheets can be sorted on the sheet ejection tray 104. Seen from the home position of the sheet sorting mechanism 130 illustrated in FIG. 47A, in FIG. 47B, the ejection roller 121 moves to the right and the lamination sheet S is ejected to the right side, and in FIG. 47C, the ejection roller 121 moves to the left and the lamination sheet S is ejected to the left side.

Figure 48:
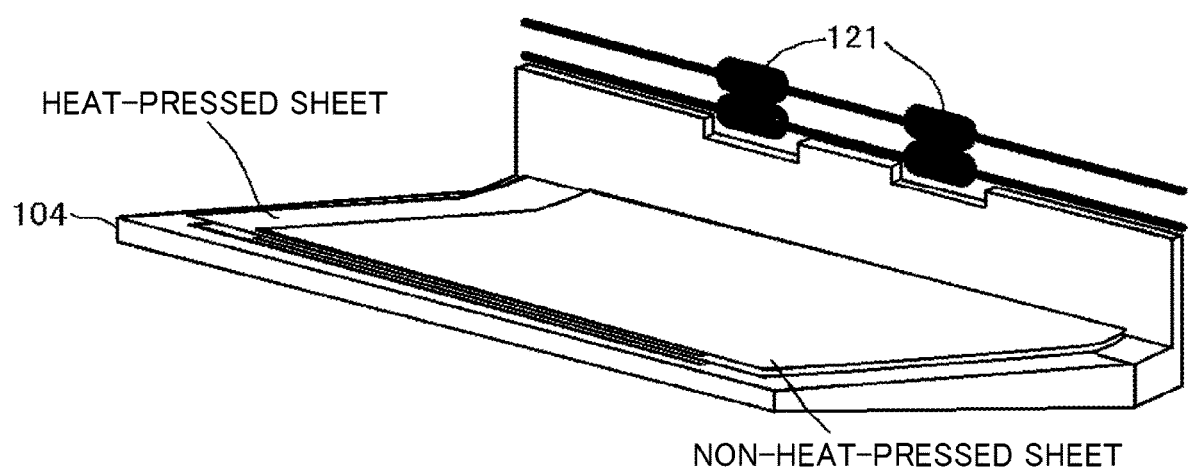
FIG. 48 is a schematic perspective view of lamination sheets sorted by the sheet sorting mechanism of FIGS. 47A, 47B, and 47C.

FIG. 48 is a schematic perspective view of lamination sheets sorted by the sheet sorting mechanism of FIGS. 47A, 47B, and 47C. As illustrated in FIG. 48, lamination sheets S ejected while being shifted by the sheet sorting mechanism 130 illustrated in FIGS. 47A, 47B, and 47C are separately stacked on the sheet ejection tray 104. Thus, the heat-pressed sheet and the non-heat-pressed sheet can be easily distinguished. The sheet sorting mechanism may be, for example, a device that moves the sheet ejection tray 104 in the direction perpendicular to the sheet conveyance direction or a mechanism for pulling a lamination sheet S toward the sheet ejection port.

Figure 49:
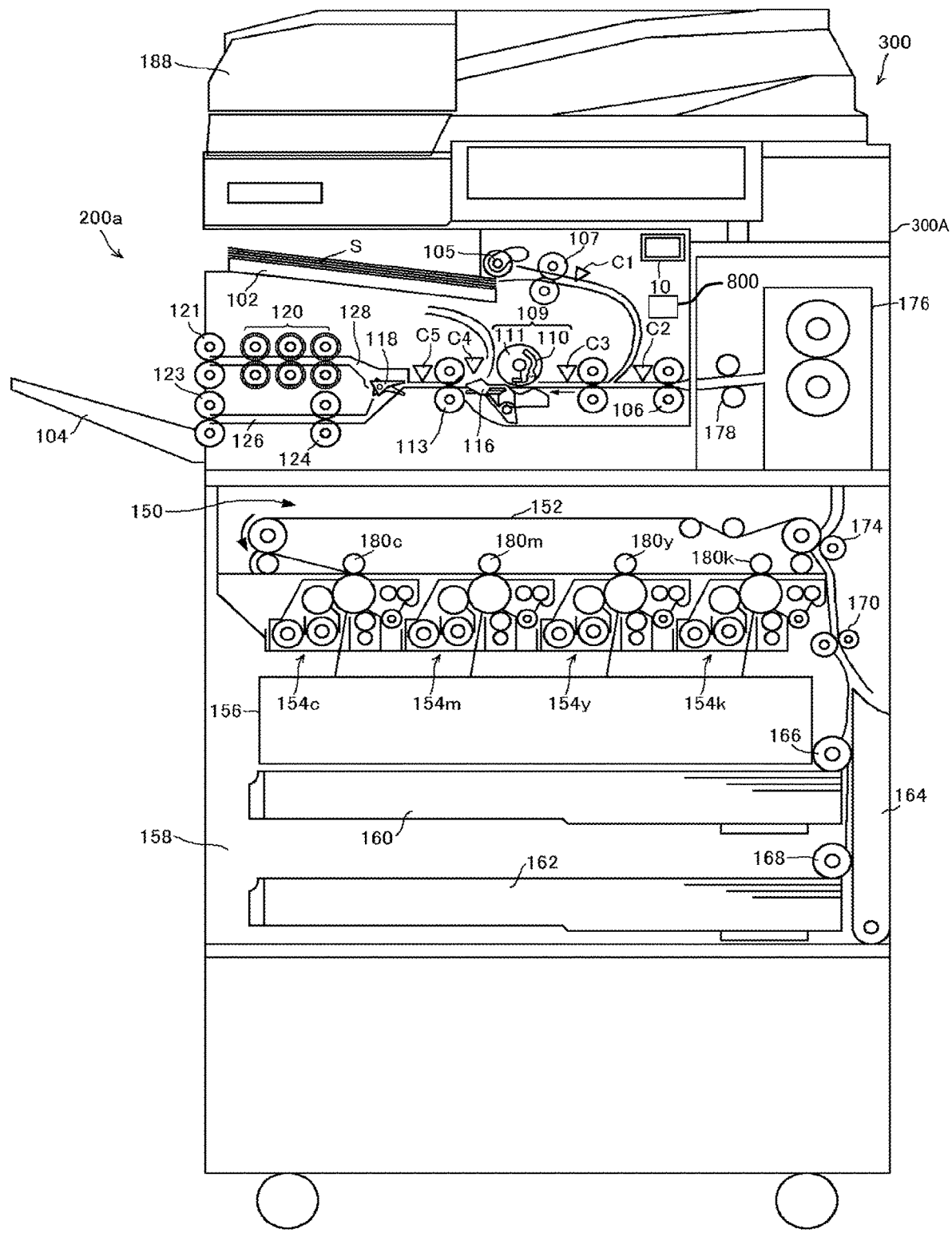
FIG. 49 is a schematic view illustrating the overall configuration of an image forming apparatus including a sheet laminator according to an embodiment of the present disclosure.

FIG. 49 is a schematic view illustrating the overall configuration of an example of an image forming apparatus including a sheet laminator according to an embodiment of the present disclosure. An image forming apparatus 300 according to the present embodiment includes a sheet processing device 200a and an image forming device that forms an image on a sheet or a sheet-shaped medium as a sheet laminator unit.

Here, the sheet laminator 200a includes the sheet tray 102 on which lamination sheets S or inner sheets P are loaded. The sheet laminator 200a is capable of receiving the lamination sheets S, the inner sheets P, or both from the image forming apparatus 300. Accordingly, the image forming apparatus 300 (e.g., a printer or a copier) is capable of adding (forming) an image on the lamination sheet S or the inner sheet P by the in-line connection.

Note that, when the sheet laminating operation is not required, the sheet laminator 200a may be detached from the image forming apparatus 300. In addition, in the sheet laminator 200a thus removed, the sheet feed tray 103 on which the inner sheet P is loaded and the pickup roller 106 to feed the inner sheet P from the sheet feed tray 103 may be attached to the sheet laminator 200a, so that the sheet laminator 200a is used as a stand-alone machine similar to the sheet laminator 200a illustrated in FIG. 24.

The configuration of the image forming apparatus 300 is described in detail. As illustrated in FIG. 49, an image forming apparatus 300 includes a housing 300A. The image forming apparatus 300 includes an intermediate transfer device 150 in the housing 300A. The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 49.

The image forming apparatus 300 further includes image forming devices 154c, 154m, 154y, and 154k for yellow (Y), magenta (M), cyan (C), and black (K), respectively, are disposed below the intermediate transfer device 150 in the housing 300A. The image forming devices 154c, 154m, 154y, and 154k are arranged in a quadruple tandem manner along an extended direction of the intermediate transfer belt 152. Each of the image forming devices 154c, 154m, 154y, and 154k includes a drum-shaped image bearer that rotates in the clockwise direction in FIG. 49. Various image forming components, for example, a charging device, a developing device, a transfer device, and a cleaning device, are disposed around each of the image forming devices 154c, 154m, 154y, and 154k. An exposure device 156 is disposed below the image forming devices 154c, 154m, 154y, and 154k in the housing 300A of the image forming apparatus 300.

A sheet feeder 158 is disposed below the exposure device 156 in the housing 300A of the image forming apparatus 300. The sheet feeder 158 includes a first sheet tray 160 that stores lamination sheets S and a second sheet tray 162 that stores inner sheets P. Note that the first sheet feed tray 160 is an example of a third sheet loader on which a two-ply sheet such as the lamination sheet S is loaded. Similarly, the second sheet feed tray 162 is an example of a fourth sheet loader on which a sheet medium (e.g., the inner sheet P) is loaded.

A first feed roller 166 is disposed at a position upper right of the first sheet feed tray 160. The first feed roller 166 feeds out the lamination sheet S one by one from the first sheet feed tray 160 to a sheet conveyance passage 164. A second sheet feeding roller 168 is disposed at the upper right of the second sheet tray 162 and feeds the inner sheets P from the second sheet tray 162 one by one to the sheet conveyance path 164.

The sheet conveyance passage 164 extends upwardly on the right side in the housing 300A of the image forming apparatus 300 and communicates with the sheet laminator 200a provided in the housing 300A of the image forming apparatus 300. The sheet conveyance passage 164 is provided with, e.g., a conveyance roller 170, a secondary transfer device 174 disposed facing the intermediate transfer belt 152, a fixing device 176, and a sheet ejection device 178 including an ejection roller pair, serially.

Note that the first feed roller 166, the conveyance roller 170, and the sheet conveyance passage 164 are examples of a third sheet feeder to feed the two-ply sheet from the first sheet feed tray 160 (third sheet loader). Further, the second feed roller 168, the conveyance roller 170, and the sheet conveyance passage 164 are examples of a fourth sheet feeder to feed a sheet medium from the second sheet feed tray 162 (fourth sheet loader). Further, the intermediate transfer device 150 and the fixing device 176 are examples of an image forming device that forms an image on a two-ply sheet or a sheet medium.

Next, a description is given of operations of the image forming apparatus 300 according to the present embodiment, to form an image on the lamination sheet S and then perform a sheet laminating operation on the lamination sheet S.

When forming an image on the lamination sheet S, firstly, an image reading device 188 reads the image on an original document, and the exposure device 156 then performs image writing. Thereafter, the image forming devices 154c, 154m, 154y, and 154k form respective color toner images on the respective image bearers. Then, primary transfer devices 180c, 180m, 180y, and 180k sequentially transfer the respective toner images onto the intermediate transfer belt 152, thereby forming a color image on the intermediate transfer belt 152.

By contrast, the image forming apparatus 300 rotates the first feed roller 166 to feed and convey the lamination sheet S to the sheet conveyance passage 164. Then, the lamination sheet S is conveyed by the conveyance roller 170 through the sheet conveyance passage 164 and is sent to a secondary transfer position in synchrony with movement of the color image on the intermediate transfer belt 152. Then, the secondary transfer device 174 transfers the color image formed on the intermediate transfer belt 152 as described above, onto the lamination sheet S.

After the image has been transferred onto the lamination sheet S, the fixing device 176 fixes the image on the lamination sheet S to the lamination sheet S, and the sheet ejection device 178 ejects to convey the lamination sheet S to the sheet laminator 200a.

Further, the image forming apparatus 300 rotates the second feed roller 168 to feed the inner sheet P to the sheet conveyance passage 164, and the sheet ejection device 178 ejects to convey the inner sheet P to the sheet laminator 200a.

As described above, the lamination sheet S on which the image has been formed and the inner sheet P are conveyed to the sheet laminator 200a, so that the sheet laminating operation is performed by the sheet laminator 200a. Since the details of the sheet laminating operation have been described above, the redundant descriptions are omitted.

According to the above-described configuration of the image forming apparatus 300 according to the present embodiment, the sheet laminator 200a may perform the sheet laminating operation after an image is formed on the inner sheet P. In addition, the sheet laminator 200a may perform the sheet laminating operation after the image forming operation has been performed on the inner sheet P and the lamination sheet S.

The image forming apparatus 300 illustrated in FIG. 49 may include a sheet processing device 100 that is removably attached to the image forming apparatus 300. The configuration in which the sheet processing device 100 is detachably attachable can enhance convenience.

Further, an image forming system may include the image forming apparatus 300, the sheet processing device 100 detachably attached to the image forming apparatus 300 or the sheet laminator 200 detachably attached to the image forming apparatus 300. The configuration in which the sheet processing device 100 is detachably attachable can enhance convenience. Furthermore, aspects of this disclosure can be embodied as a system including at least one of a sheet feeder (a stacker) and a case binding device or the like. Note that, in a case in which a lamination sheet S passes through a fixing device 176, the lamination sheet S is not bonded at the fixing temperature but is bonded by application of heat higher than the fixing temperature.

Although the image forming apparatus 300 illustrated in FIG. 49 employs electrophotography for image formation on the lamination sheet S and the inner sheet P in the description above, the image formation method is not limited to the above-described configuration. For example, inkjet, stencil printing, or other printing method may be employed in an image forming apparatus according to an embodiment.

Figure 50A:
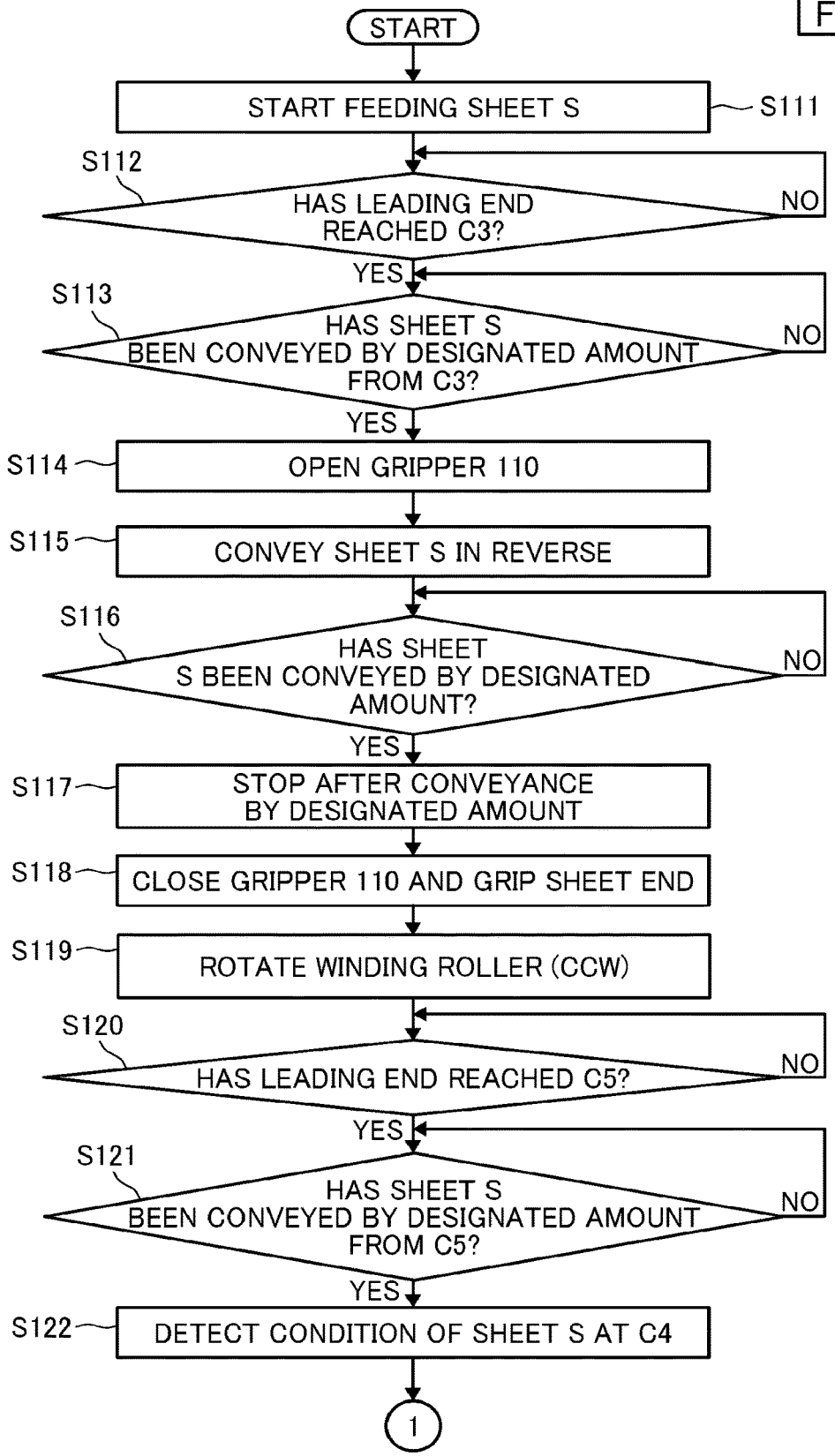
FIGS. 50A, 50B, and 50C is a flowchart illustrating a series of operations from feeding a sheet, inserting an inner sheet, and laminating the sheet with the inner sheet being inserted.
Figure 50B:
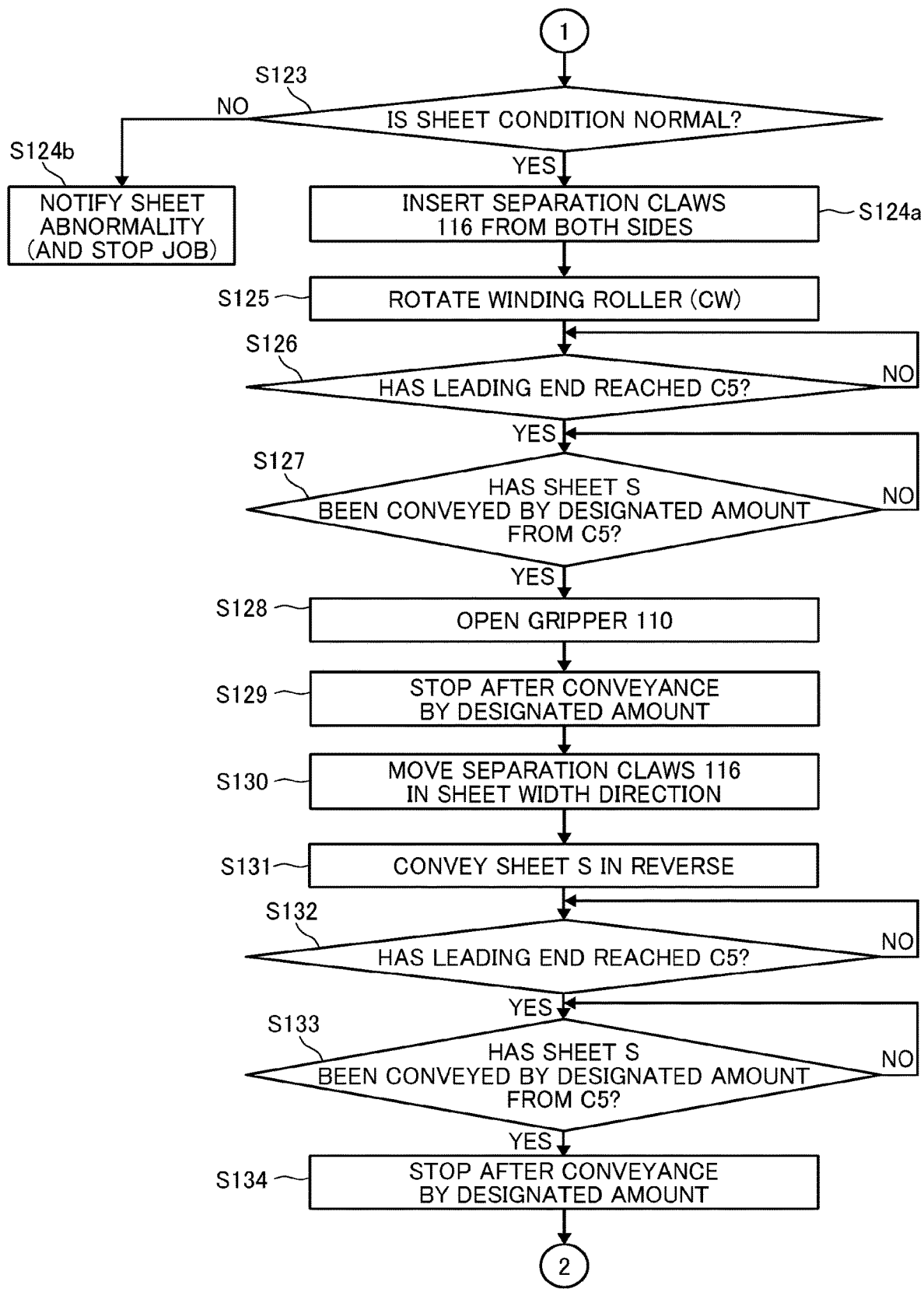
Figure 50C:
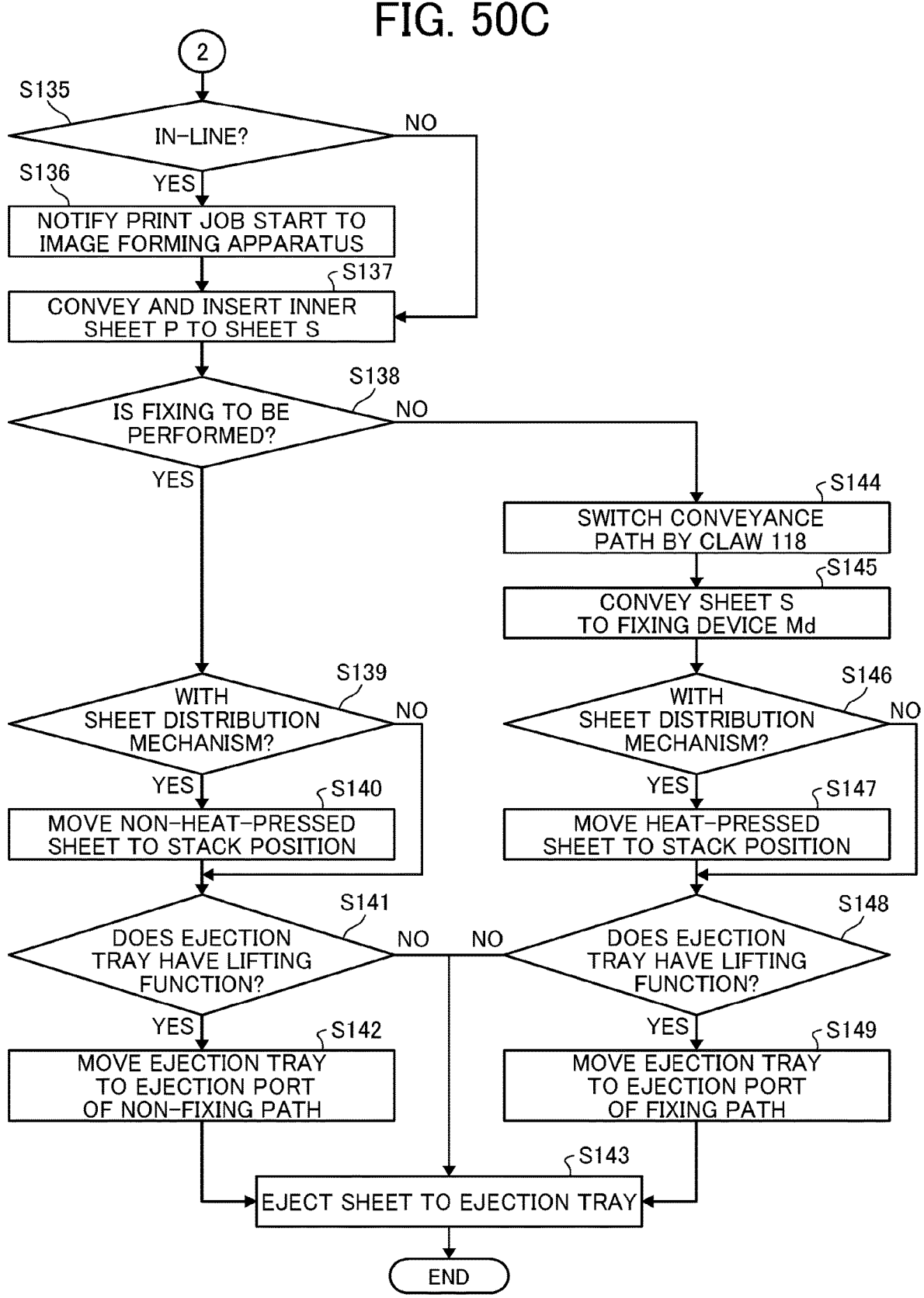

FIG. 50 including FIGS. 50A, 50B, and 50C is a flowchart illustrating a series of operations of feeding a lamination sheet, inserting an inner sheet, performing or skipping laminate processing on the lamination sheet, and ejecting the lamination sheet. A description is given of the series of operations, with reference to the reference numerals indicated in the flowchart of FIG. 50 including FIGS. 50A, 50B, and 50C.

First, in step S111 of FIG. 50A, the controller 800 of the sheet processing device 100 causes the driver to start feeding a lamination sheet S (see FIG. 24). In step S112 of FIG. 50A, the controller 800 of the sheet processing device 100 determines whether the leading end of the lamination sheet S has reached the conveyance sensor C3 based on the detection result of the conveyance sensor C3 (see FIG. 25). When the leading end of the lamination sheet S has not reached the conveyance sensor C3 (NO in step S112 of FIG. 50A), step S12 is repeated until the leading end of the lamination sheet S reaches the conveyance sensor C3. By contrast, when the leading end of lamination sheet S has reached the conveyance sensor C3 (YES in step S112 of FIG. 50A), the series of operations in the flowchart of FIG. 50 including FIGS. 50A, 50B, and 50C proceeds to step S113. In step S113 of FIG. 50A, the controller 800 determines whether the lamination sheet S has been conveyed by the specified amount from the conveyance sensor C3, that is, whether a specified time has passed since the conveyance sensor C3 detects the leading end of the lamination sheet S. When the lamination sheet S has not been conveyed by the specified amount from the conveyance sensor C3 (NO in step S113 of FIG. 50A), step S113 is repeated until the lamination sheet S is conveyed by the specified amount from the conveyance sensor C3. By contrast, when the lamination sheet S has been conveyed by the specified amount from the conveyance sensor C3 (YES in step S113 of FIG. 50A), the controller 800 of the sheet processing device 100 causes the driver to temporarily stop conveying the lamination sheet S (see FIG. 26). For example, the "specified amount" used here and those in subsequent steps are stored in a memory by a manufacturer based on empirical data. Subsequently, the controller 800 of the sheet processing device 100 causes the driver to open the gripper 110 in step S114 of FIG. 50A. Then, the controller 800 causes the driver to convey the lamination sheet S in the reverse conveyance direction in step S115 of FIG. 50A (see FIG. 27).

In step S116 of FIG. 50A, the controller 800 of the sheet processing device 100 determines whether the lamination sheet S has been conveyed by a specified amount. When the lamination sheet S has not been conveyed by the specified amount (NO in step S116 of FIG. 50A), step S116 is repeated until the lamination sheet S is conveyed by the specified amount. By contrast, when the lamination sheet S has been conveyed by the specified amount (YES in step S116 of FIG. 50A), the controller 800 causes the driver to temporarily stop conveying the lamination sheet S in step S117 of FIG. 50A. In step S118 of FIG. 50A, the controller 800 causes the driver to close the gripper 110 to grip the end of the lamination sheet S (see FIG. 28).

In step S119 of FIG. 50A, the controller 800 of the sheet processing device 100 causes the driver to rotate the winding roller 109 in the counterclockwise direction (i.e., in the reverse direction) and wind the lamination sheet S around the winding roller 109 (see FIG. 29). In step S120 of FIG. 50A, the controller 800 determines whether the leading end of the lamination sheet S has reached at the conveyance sensor C5. When the leading end of the lamination sheet S has not reached the conveyance sensor C5 (NO in step S120 of FIG. 50A), step S120 is repeated until the leading end of the lamination sheet S reaches the conveyance sensor C5. By contrast, when the leading end of sheet S has reached the conveyance sensor C5 (YES in step S120 of FIG. 50A), the series of operations in the flowchart of FIG. 50 including FIGS. 50A, 50B, and 50C goes on to step S121. In step S121 of FIG. 50A, the controller 800 of the sheet processing device 100 determines whether the lamination sheet S has been conveyed by the specified amount from the conveyance sensor C5. When the lamination sheet S has not been conveyed by the specified amount from the conveyance sensor C5 (NO in step S121 of FIG. 50A), step S121 is repeated until the lamination sheet S is conveyed by the specified amount from the conveyance sensor C5. By contrast, when the lamination sheet S has been conveyed by the specified amount from the conveyance sensor C5 (YES in step S121 of FIG. 50A), the controller 800 causes the abnormality state detector C4 to detect the state of the lamination sheet S in step S122 of FIG. 50A. Then, the controller 800 determines whether the state of the lamination sheet S is normal based on the detection results of the abnormality state detector C4 in step S123 of FIG. 50A.

The abnormality state detector C4 is an abnormality detector to detect the size of the gap between the two sheets of the lamination sheet S for the sheet processing device 100 to determine whether the size of the gap exceeds the predetermined threshold. In step S123 of FIG. 50A, the controller 800 of the sheet processing device 100 determines whether the state of the lamination sheet S is normal, that is, whether the size of the gap between the two sheets of the lamination sheet S is equal to or greater than the predetermined threshold based on the detection result of the abnormality state detector C4. When the state of the lamination sheet S is normal (YES in step S123 of FIG. 50A), the series of operations in the flowchart of FIG. 50 including FIGS. 50A, 50B, and 50C goes on to step S124a.

By contrast, when it is determined that the state of the lamination sheet S is abnormal, in other words, when the size of the gap is smaller than the predetermined threshold (NO in step S123 of FIG. 50B), the controller 800 of the sheet processing device 100 causes the operation panel 10 to display the abnormality (e.g., displays an error message) and stops the series of operations of sheet processing job in step S124b of FIG. 50B.

In step S124a of FIG. 50B, the controller 800 of the sheet processing device 100 causes the driver to insert the separation claws 116 from both sides of the lamination sheet S into the gap between the sheets of the lamination sheet S (see FIG. 30). In step S125 of FIG. 50B, the controller 800 of the sheet processing device 100 causes the driver to rotate the winding roller 109 in the clockwise direction (i.e., in the forward direction) with the separation claws 116 inserted from both sides of the lamination sheet S, and convey the lamination sheet S in the forward conveyance direction.

Then, in step S126 of FIG. 50B, the controller 800 determines whether the leading end of the lamination sheet S has reached the conveyance sensor C5. When the leading end of the lamination sheet S has not reached the conveyance sensor C5 (NO in step S126 of FIG. 50B), step S126 is repeated until the leading end of the lamination sheet S reaches the conveyance sensor C5. By contrast, when the leading end of sheet S has reached the conveyance sensor C5

(YES in step S126 of FIG. 50B), the series of operations in the flowchart of FIG. 50 including FIGS. 50A, 50B, and 50C goes on to step S127. In response to a determination that the lamination sheet S has been conveyed by the specified amount from the conveyance sensor C5 ("Yes" in S127), the controller 800 in the sheet processing device 100 controls the driver to open the gripper 110 in step S128.

Then, the controller 800 of the sheet processing device 100 causes the driver to temporarily stop conveying the lamination sheet S after the lamination sheet S has been conveyed by the specified amount in step S129 of FIG. 50B. Then, in step S130 of FIG. 50B, the controller 800 causes the separation claws 116 to move further in the sheet width direction of the lamination sheet S (see FIG. 31). As a result, the trailing end of the lamination sheet S in the forward conveyance direction is separated into the upper and lower sheets.

In step S131, the controller 800 in the sheet processing device 100 controls the driver to convey the lamination sheet S in the reverse conveyance direction. Then, in step S132 of FIG. 50B, the controller 800 determines whether the leading end of the lamination sheet S in the forward conveyance direction has reached the conveyance sensor C5. When the leading end of the lamination sheet S has not reached the conveyance sensor C5 (NO in step S132 of FIG. 50B), step S132 is repeated until the leading end of the lamination sheet S reaches the conveyance sensor C5. By contrast, when the leading end of sheet S has reached the conveyance sensor C5 (YES in step S132 of FIG. 50B), the series of operations in the flowchart of FIG. 50 including FIGS. 50A, 50B, and 50C goes on to step S133. In step S133 of FIG. 50B, the controller 800 of the sheet processing device 100 determines whether the lamination sheet S has been conveyed by a specified amount from the conveyance sensor C5. When the lamination sheet S has not been conveyed by the specified amount from the conveyance sensor C5 (NO in step S133 of FIG. 50B), step S133 is repeated until the lamination sheet S is conveyed by the specified amount from the conveyance sensor C5. By contrast, when the lamination sheet S has been conveyed by the specified amount from the conveyance sensor C5 (YES in step S133 of FIG. 50B), the controller 800 causes the driver to temporarily stop conveying the lamination sheet S in step S134 of FIG. 50B (see FIG. 32). As a result, the separation of the lamination sheet S is completed.

Subsequently, in step S135 of FIG. 50C, the controller 800 of the sheet processing device 100 determines whether to perform the image forming operation (with an inline image forming apparatus) on the inner sheet P to be inserted into the lamination sheet S. When the image forming operation is performed with an inline image forming apparatus (YES in step S135 of FIG. 50C), the controller 800 of the sheet processing device 100 sends a signal to notify the inline image forming apparatus to start the print job (printing operation) to form an image on the inner sheet Pin step S136 of FIG. 50C. Then, the series of operations moves on to step S137 of FIG. 50C.

By contrast, when the image forming operation is not performed with an inline image forming apparatus (NO in step S135 of FIG. 50C), the series of operations moves on to step S137 of FIG. 50C.

In step S137 of FIG. 50C, the controller 800 of the sheet processing device 100 causes the driver to convey the inner sheet P in the forward conveyance direction to be inserted into the opened portion of the lamination sheet S (see FIGS. 33 and 34).

Next, in step S138, the sheet processing device 100 determines whether to perform the fixing processing, and divides the subsequent processing according to the presence or absence of the fixing processing specified for each sheet S by the operation panel 10 or the printer driver.

When the fixing processing is not performed, the process proceeds to step S139, and the sheet processing device 100 determines whether the sheet processing device 100 has the sheet sorting mechanism 130. When the sheet processing device 100 has the sheet sorting mechanism 130, the process proceeds to step S140. The sheet processing device 100 moves the sheet sorting mechanism 130 to the stack position of non-heat-pressed sheet (see FIGS. 47A, 47B, 47C). Next, the process proceeds to step S141, and the sheet processing device 100 determines whether the sheet ejection tray 104 has a lifting function. Even if the sheet processing device 100 does not have the sheet sorting mechanism 130 in step S139, the process proceeds to step S141. When the sheet ejection tray 104 has a lifting function, the process proceeds to step S142. The sheet processing device 100 moves the sheet ejection tray 104 to the sheet ejection port of the non-heat-pressing conveyance path 126, which is a non-fixing path. In step S143, a lamination sheet S is ejected to the sheet ejection tray 104. Even when the sheet ejection tray 104 does not have the lifting function in step S141, the sheet processing device 100 proceeds to step S143 and ejects the lamination sheet S to the sheet ejection tray 104.

Next, in step S144, the sheet processing device 100 switches the route at the branch claw 118. In step S145, the lamination sheet S sandwiching the inner sheet P is conveyed to the heat pressing device (fixing device Md), and heat and pressure are applied to complete the laminate processing (see FIG. 35B).

Next, in step S146, the sheet processing device 100 determines whether the sheet processing device 100 has the sheet sorting mechanism 130. When the sheet processing device 100 has the sheet sorting mechanism 130, the process proceeds to step S147. The sheet processing device 100 moves the sheet sorting mechanism 130 to the stack position of heat-pressed sheet (see FIGS. 47A, 47B, 47C). Next, the process proceeds to step S148, and the sheet processing device 100 determines whether the sheet ejection tray 104 has a lifting function. Even if the sheet processing device 100 des no have the sheet sorting mechanism 130 (NO in step S146), the process proceeds to step S148. When the sheet ejection tray 104 has a lifting function, the process proceeds to step S149. The sheet processing device 100 moves the sheet ejection tray 104 to the sheet ejection port of the heat-pressing conveyance path 128, which is a non-fixing path. In step S143, a lamination sheet S is ejected to the sheet ejection tray 104. Even when the sheet ejection tray 104 does not have the lifting function (NO in step S148), the sheet processing device 100 proceeds to step S143 and ejects the lamination sheet S to the sheet ejection tray 104.

As described above, according to an embodiment of the present disclosure, in the sheet processing device 100, a sheet-shaped medium P is sandwiched between a two-ply sheet S in which two sheets are overlaid and a part of the two sheets is bonded. The common sheet ejection tray 104 is shaped as a plurality of ejection destinations of sheets, thus reducing the cost and size of the sheet processing device.

Figure 51:
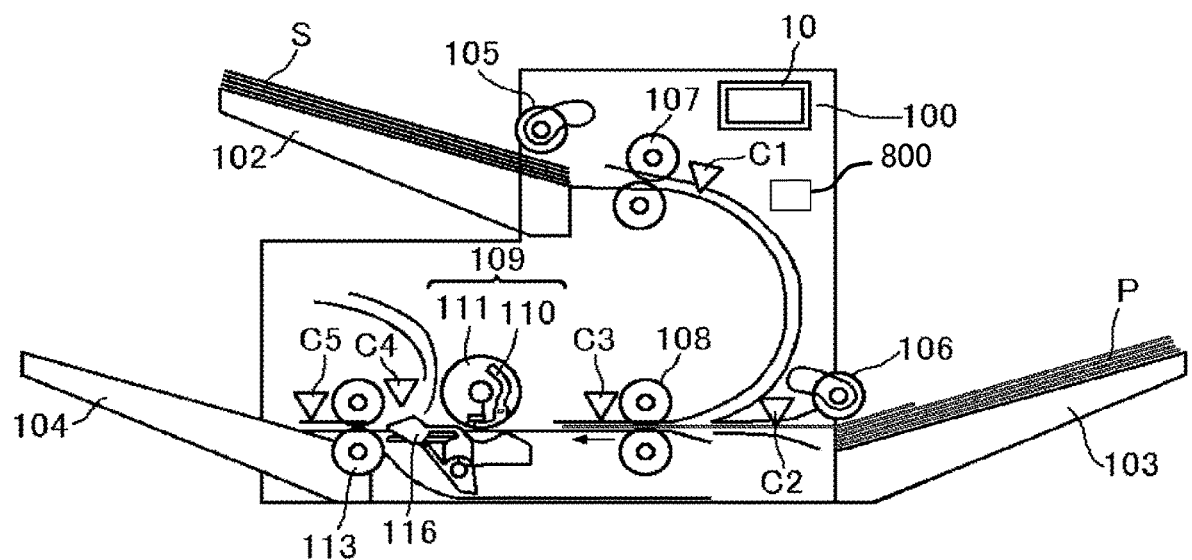
FIG. 51 is a schematic view illustrating the overall configuration of a sheet processing device according to an embodiment of the present disclosure.

Next, a description is given of a sheet processing device according to according to an embodiment of the present disclosure, with reference to FIG. 51. FIG. 51 is a schematic view illustrating the overall configuration of a sheet processing device according to an embodiment of the present disclosure. A sheet processing device 100 according to the present embodiment is to separate two sheets (plies) of a two-ply sheet (hereinafter referred to as a lamination sheet S) and to insert and sandwich a sheet-shaped medium (hereinafter referred to as an inner sheet P) between the separated sheets of the two-ply sheet.

The lamination sheet S is a two-ply sheet in which two sheets are overlapped and bonded together at a portion (or a side) of the two-ply sheet. For example, there is a two-ply sheet in which a first side is a transparent sheet such as a transparent polyester sheet and the opposite side is a transparent or opaque sheet and bonded to the other sheet on one side of the two-ply sheet. The two-ply sheet also includes a lamination film.

The inner sheet P (to be inserted) is an example of the sheet medium that is inserted into the two-ply sheet. The sheet medium may be, for example, thick paper, postcards, envelopes, plain paper, thin paper, coated paper, art paper, tracing paper, and overhead projector (OHP) transparencies.

As illustrated in FIG. 51, a sheet processing device 100 includes a sheet tray 102, a pickup roller 105, and a conveyance roller pair 107. The sheet tray 102 functions as a first sheet loader on which the lamination sheets S are placed. The pickup roller 105 feeds the lamination sheet S from the sheet tray 102. The sheet processing device 100 further includes a sheet feed tray 103 as a second loader on which the inner sheet P is loaded, and a pickup roller 106 that feeds the inner sheet P from the sheet feed tray 103.

A conveyance sensor C1 is disposed downstream from the conveyance roller pair 107 in the sheet conveyance direction to detect the sheet conveyance position of the lamination sheet S. A conveyance sensor C2 is disposed downstream from the pickup roller 106 in the sheet conveyance direction to detect the sheet conveyance position of the inner sheet P.

The sheet processing device 100 includes an entrance roller pair 108 as a first conveyor, a winding roller 109 as a rotator, the exit roller pair 113 as a second conveyor, and the sheet ejection tray 104. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing device 100 further includes a separation claw 116 between the winding roller 109 and the exit roller pair 113. The separation claw 116 is movable in the width direction of the lamination sheet S.

A conveyance sensor C3 that detects the positions of a lamination sheet S and an inner sheet P being conveyed is disposed downstream from the entrance roller pair 108 in the sheet conveyance direction. An abnormality detection sensor C4 that detects the state of the lamination sheet S is disposed downstream from the winding roller 109 in the sheet conveyance direction. A conveyance sensor C5 that detects the position of the lamination sheet S being conveyed is disposed downstream from the exit roller pair 113 in the sheet conveyance direction.

The pickup roller 105, the conveyance roller pair 107, the entrance roller pair 108, and the winding roller 109 are examples of a first feeder. The pickup roller 106, the entrance roller pair 108 and the winding roller 109 are examples of a second feeder.

An operation panel 10 is provided on the exterior of the sheet processing device 100. The operation panel 10 serves as a display-operation device to display information of the sheet processing device 100 and receives input of the operation of the sheet processing device 100. The operation panel 10 also serves as a notification device to output a perceptual signal to a user. As an alternative, a notification device other than the operation panel 10 may be separately provided in the sheet processing device 100.

The sheet processing device 100 according to the present embodiment loads lamination sheets S and inner sheets P on separate trays. As a lamination sheet S is conveyed in the sheet processing device 100, the sheet processing device 100 separates and opens the lamination sheet S into two sheets and inserts the inner sheet P into an opening of the lamination sheet S. The exit roller pair 113 ejects and stacks the lamination sheet S, in which the inner sheet P has been inserted, onto the sheet ejection tray 104.

Figure 52:
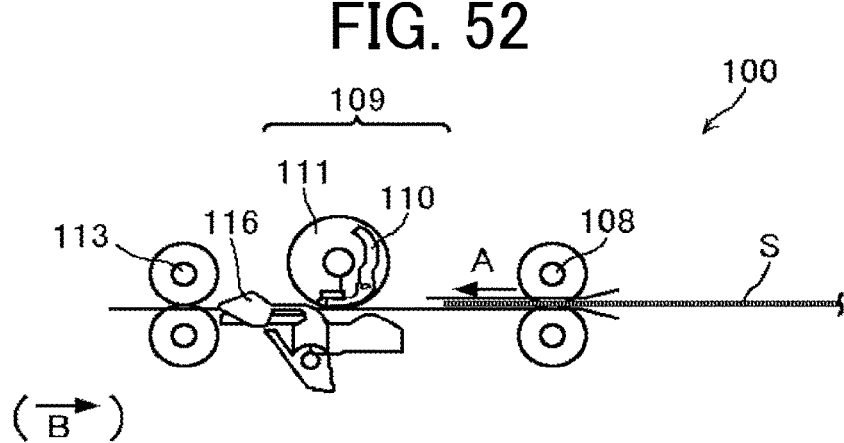
FIG. 52 is a schematic view illustrating a main part of the sheet processing device of FIG. 51.

FIG. 52 is a schematic view illustrating the main part of the sheet processing device of FIG. 51. As illustrated in FIG. 52, each of the entrance roller pair 108 and the exit roller pair 113 is, for example, two rollers paired with each other and driven by a driver such as a motor. The controller 800 causes the driver to control rotations of the entrance roller pair 108 and the exit roller pair 113. The entrance roller pair 108 is driven to rotate in one direction. The exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113. The sheet conveyance direction indicated by arrow A in FIG. 52 is referred to as a forward conveyance direction or a direction A.

The exit roller pair 113 can switch the direction of rotation between the forward direction and the reverse direction. The exit roller pair 113 conveys the lamination sheet S nipped by the rollers of the exit roller pair 113 toward the sheet ejection tray 104 (see FIG. 51) in the forward conveyance direction and also conveys the lamination sheet S toward the winding roller 109 in the direction opposite the forward conveyance direction (to convey the lamination sheet S in reverse). The sheet conveyance direction toward the winding roller 109, which is indicated by arrow B in FIG. 4 and a direction opposite to the forward conveyance direction, is referred to as a reverse conveyance direction or a direction B.

The sheet processing device 100 is provided with the winding roller 109 as a rotator and the separation claw 116 that are disposed between the entrance roller pair 108 and the exit roller pair 113. The winding roller 109 is driven by a driver such as a motor to rotate in the forward and reverse directions. The direction of rotation of the winding roller 109 is switchable between the forward direction (clockwise direction) and the reverse direction (counterclockwise direction). The controller 800 controls the driver to control rotations of the winding roller 109 and operations of the separation claw 116.

The winding roller 109 includes a roller 111 and a gripper 110 movably disposed on the roller 111 to grip the lamination sheet S. The gripper 110 that is movable grips the leading end of the lamination sheet S together with the roller 111. The gripper 110 may be formed on the outer circumference of the roller 111 as a single unit or may be formed as a separate unit. The controller 800 causes a driver to move the gripper 110.

Next, a description is given of a series of operations performed in the sheet processing device 100, with reference to FIGS. 51 to 62B. The series of operations performed by the sheet processing device 100 indicates the operations from separating the lamination sheet S to inserting the inner sheet P into the lamination sheet S. The controller 800 controls the series of operations performed by the sheet processing device 100. Note that, in FIGS. 53 to 62B, elements identical to the elements illustrated in FIGS. 51 and 52 are given identical reference numerals, and the descriptions these elements are omitted.

In FIG. 51, the lamination sheets S is loaded on the sheet tray 102 such that a part of the bonded side of the lamination sheet S is located downstream from the pickup roller 105 in the sheet feed direction (sheet conveyance direction). In the sheet processing device 100, the pickup roller 105 picks up the lamination sheet S from the sheet tray 102, and the conveyance roller pair 107 conveys the lamination sheet S toward the entrance roller pair 108.

Next, as illustrated in FIG. 52, the entrance roller pair 108 conveys the lamination sheet S toward the winding roller 109. In the sheet processing device 100, the entrance roller pair 108 conveys the lamination sheet S with the bonded end, which is one of four sides of the lamination sheet S, as the downstream side in the forward conveyance direction A as indicated by arrow A in FIG. 2.

Figure 53:
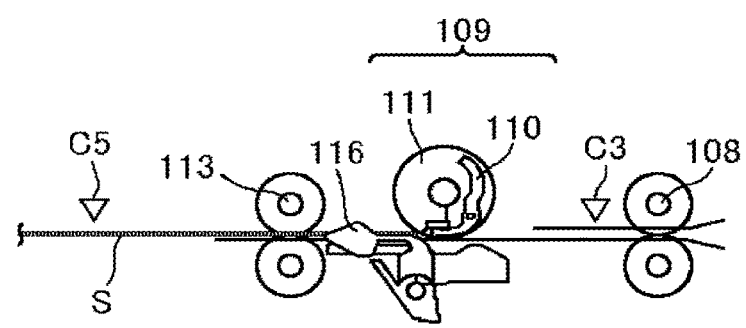
FIG. 53 is a schematic view illustrating the main part of the sheet processing device in a state subsequent to the state in FIG. 52.

Subsequently, as illustrated in FIG. 53, the controller 800 of the sheet processing device 100 temporarily stops conveyance of the lamination sheet S when the trailing end of the lamination sheet S in the forward conveyance direction has passed the winding roller 109. Note that these operations are performed by conveying the lamination sheet S from the conveyance sensor C3 by a specified amount in response to the timing at which the conveyance sensor C3 detected the leading end of the lamination sheet S.

Figure 54:
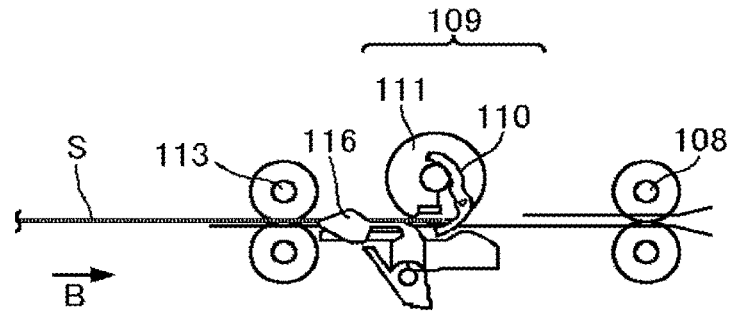
FIG. 54 is a schematic view illustrating the main part of the sheet processing device in a state subsequent to the state in FIG. 53.

Next, as illustrated in FIG. 54, the controller 800 of the sheet processing device 100 causes the gripper 110 to open and the exit roller pair 113 to rotate in the reverse direction to convey the lamination sheet S in the reverse conveyance direction (sheet conveyance direction B) toward the opened portion of the gripper 110.

Figure 55:
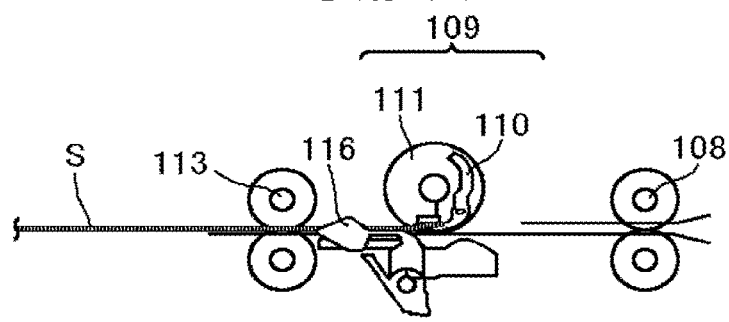
FIG. 55 is a schematic view illustrating the main part of the sheet processing device in a state subsequent to the state in FIG. 54.

Subsequently, as illustrated in FIG. 55, the controller 800 of the sheet processing device 100 causes the exit roller pair 113 to stop rotating to stop conveyance of the lamination sheet S when the end of the lamination sheet S is inserted into the opened portion of the gripper 110 and causes the driver to close the gripper 110 to grip the end of the lamination sheet S. Note that these operations are performed when the lamination sheet S is conveyed by the specified amount.

Figure 56:
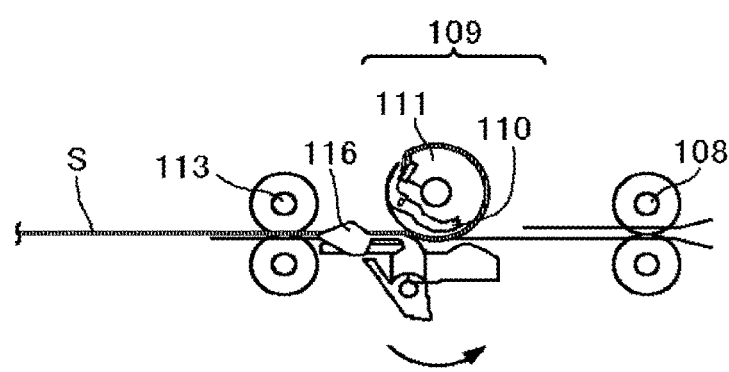
FIG. 56 is a schematic view illustrating the main part of the sheet processing device in a state subsequent to the state in FIG. 55.

Then, as illustrated in FIG. 56, the controller 800 of the sheet processing device 100 causes the driver to rotate the winding roller 109 in the counterclockwise direction in FIG. 6 to wind the lamination sheet S around the winding roller 109. Here, the lamination sheet S is wound around the winding roller 109 from the side where the two sheets of the lamination sheet S are overlapped but not bonded.

Figure 57:
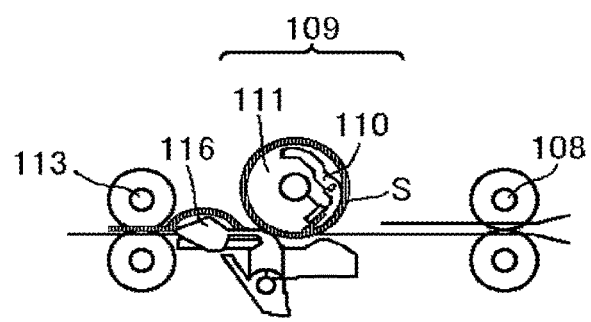
FIG. 57 is a schematic view illustrating the main part of the sheet processing device in a state subsequent to the state in FIG. 56.

As illustrated in FIG. 57, when the lamination sheet S that is the two-ply sheet is wound around the winding roller 109, a winding circumferential length difference is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets constructing the two-ply sheet. As the separation claws 116 are inserted into the space generated as described above, from both sides of the lamination sheet S, the space between the two sheets is reliably maintained. Note that these operations are performed by conveying the lamination sheet S from the conveyance sensor C5 by a specified amount in response to the timing at which the conveyance sensor C5 detected the leading end of the lamination sheet S.

Here, a description is given of the separation claw 116.

Figure 63:
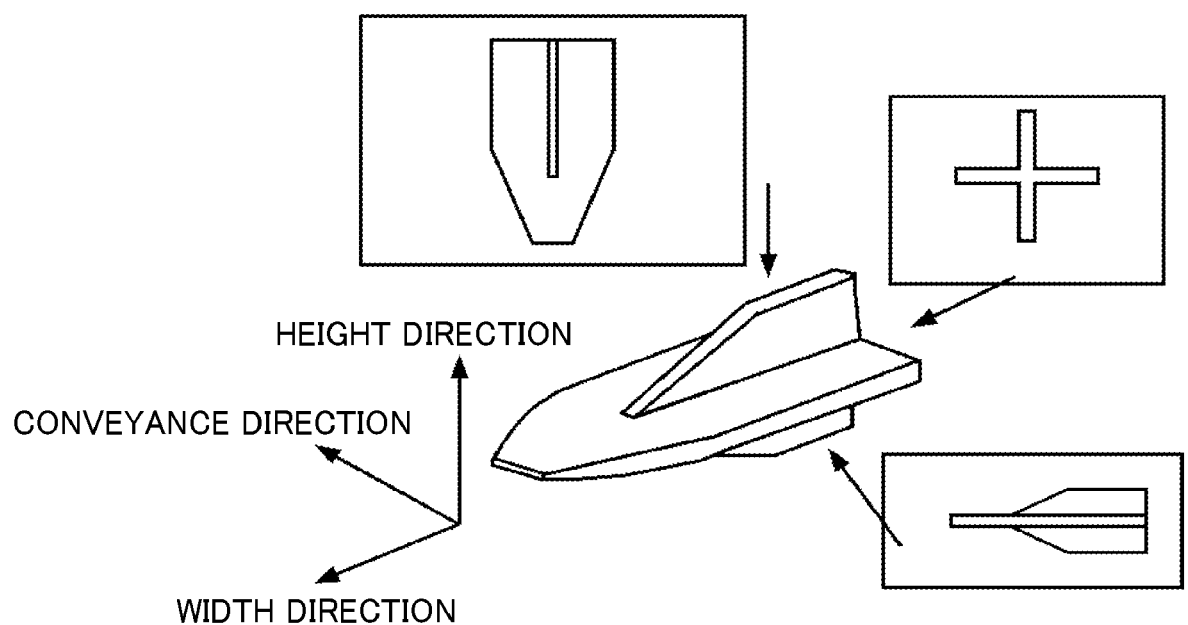
FIG. 63 is a schematic view illustrating one of separation claws provided in the sheet processing device.
Figure 64A:
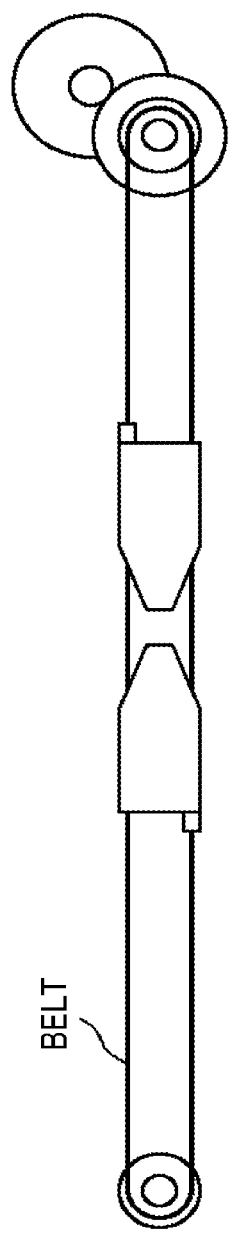
FIGS. 64A and 64B are schematic views, each illustrating an example of the drive configuration of the separation claw illustrated in FIG. 63.
Figure 64B:
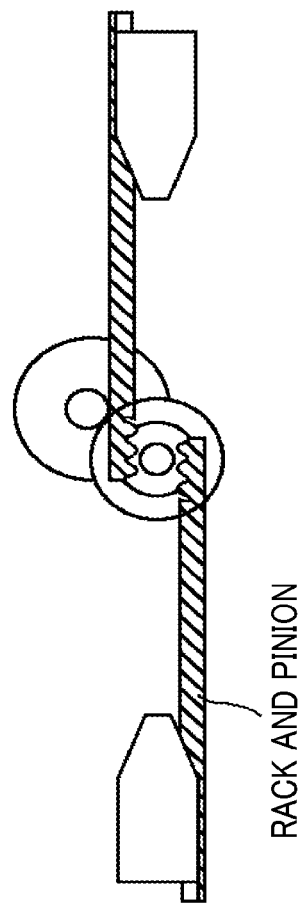
Figure 65:
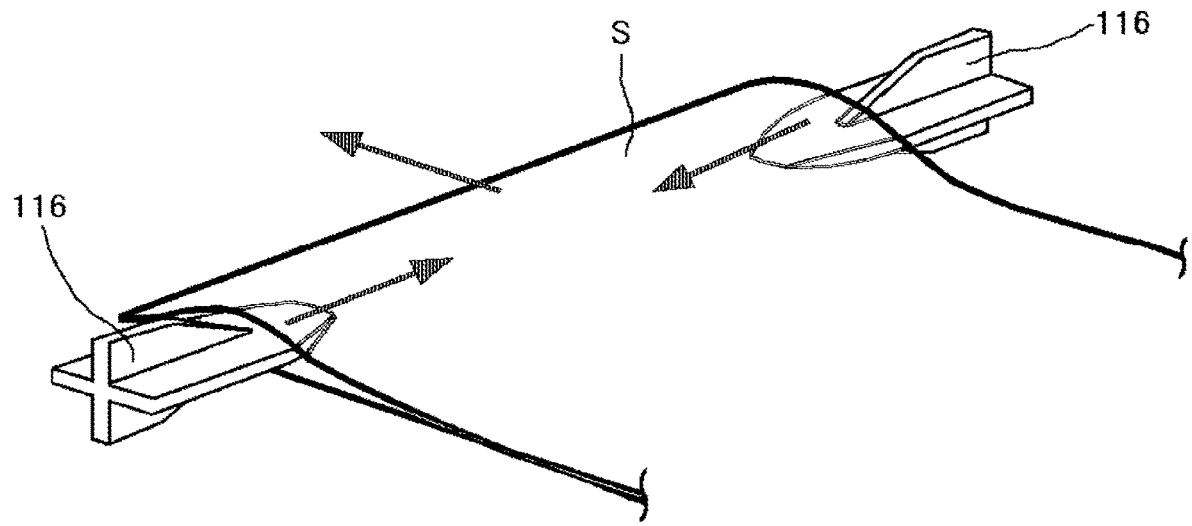
FIG. 65 is a perspective view illustrating a state in which the separation claws are inserted into a lamination sheet.

FIG. 63 is a schematic view illustrating the separation claw 116 of the sheet processing device 100. FIGS. 64A and 64B are schematic views illustrating an example of a drive configuration of the separation claw 116. Further, FIG. 65 is a perspective view illustrating a state in which the separation claws 116 are inserted in the lamination sheet S.

As illustrated in FIG. 63, when viewed from the upstream side in the sheet conveyance direction, the size in the height (vertical direction) of the separation claw 116 gradually increases from the center in the width direction to the trailing end (right end in FIG. 63). Further, when viewed from the vertical direction, the size of the separation claw 116 in the sheet conveyance direction gradually increases from the leading end to the center. When viewed from the width direction, the separation claw 116 has a cross shape.

Further, in the present embodiment, referring to FIGS. 64A and 64B, the two separation claws 116 are disposed facing each other and moved in the approaching direction and the separating direction, for example, by a belt drive mechanism as illustrated in FIG. 64A and by a rack and pinion mechanism illustrated in FIG. 64B.

As described above, in the present embodiment, each of the separation claws 116 having the above-mentioned shape is movable in the width direction of the lamination sheet S. Accordingly, the separation claws 116 are smoothly inserted into the gap created in the lamination sheet S as illustrated in FIG. 65.

Figure 58:
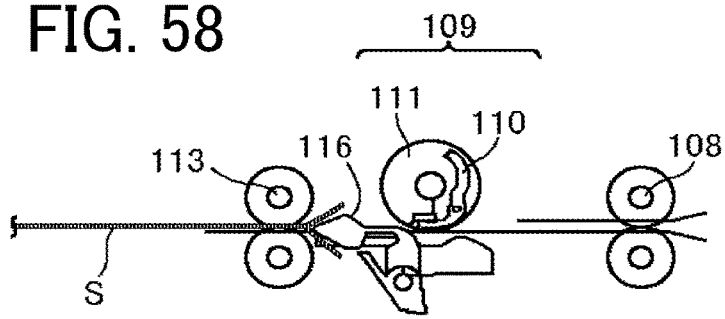
FIG. 58 is a schematic view illustrating the main part of the sheet processing device in a state subsequent to the state in FIG. 57.

A description of a series of operations of the sheet processing device 100 is continued below. With the separation claws 116 inserted in the space in the lamination sheet S, the controller 800 in the sheet processing device 100 causes the driver to rotate the winding roller 109 in the clockwise direction (see FIG. 57). The controller 800 then causes the space generated in the lamination sheet S to shift to the trailing end of the lamination sheet S in the forward conveyance direction (sheet conveyance direction A), as illustrated in FIG. 58. After the winding roller 109 has been rotated by a specified amount, the controller 800 causes the driver to open the gripper 110. As a result, the trailing end of the lamination sheet S is separated into the upper and lower sheets.

In this state, the controller 800 of the sheet processing device 100 causes the driver to temporarily stop the conveyance of the lamination sheet S and to further move the separation claws 116 in the width direction of the lamination sheet S to separate the whole area of the trailing end of the lamination sheet S. Note that these operations are performed by conveying the lamination sheet S from the conveyance sensor C5 by a specified amount in response to the timing at which the conveyance sensor C5 detected the leading end of the lamination sheet S.

Figure 66:
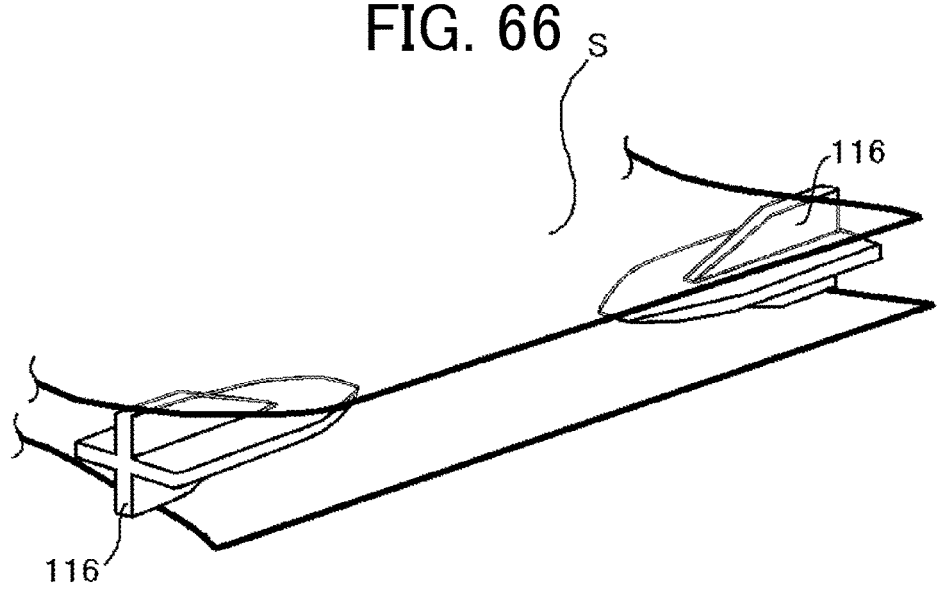
FIG. 66 is a perspective view illustrating the separation claws and the lamination sheet in a state illustrated in FIG. 58.

FIG. 66 is a perspective view illustrating the separation claws 116 and the lamination sheet S in the state illustrated in FIG. 58. Since each separation claw 116 further has a branching guide that functions as a guide to guide the two sheets separated from the lamination sheet S in different directions due to the above-described shape (see FIG. 63), the two sheets separated from the lamination sheet S may be kept in postures to be conveyed to different sheet conveyance passages.

Figure 67:
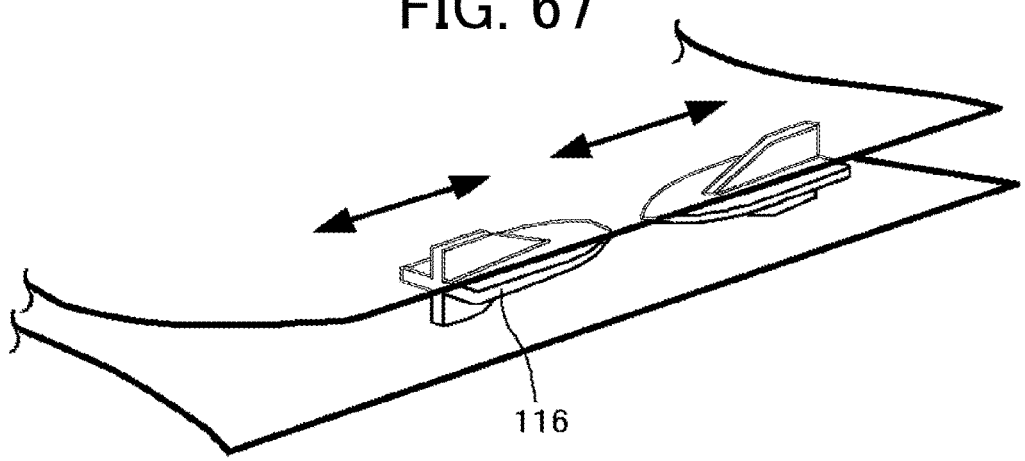
FIG. 67 is a perspective view illustrating the separation claws and the lamination sheet in another state illustrated in FIG. 58.

Further, since the separation claws 116 are movable in the width direction (see FIGS. 64A and 64B), the separation claws 116 are positioned suitably to support the postures of the two sheets of the lamination sheet S as illustrated in FIG. 67. Therefore, even when the size of the lamination sheet S and the rigidity (or retentivity corresponding to the propensity to retain a particular shape once applied, such as curvature of paper) of the lamination sheet S change, the two sheets separated from the lamination sheet S are guided in desired branching directions. This configuration eliminates the need for a lamination sheet separating member over the whole area in the width direction of the sheet conveyance passage and a driver to drive the lamination sheet separating member, thereby reducing the cost when compared with the configuration of a known sheet processing device.

Figure 59:
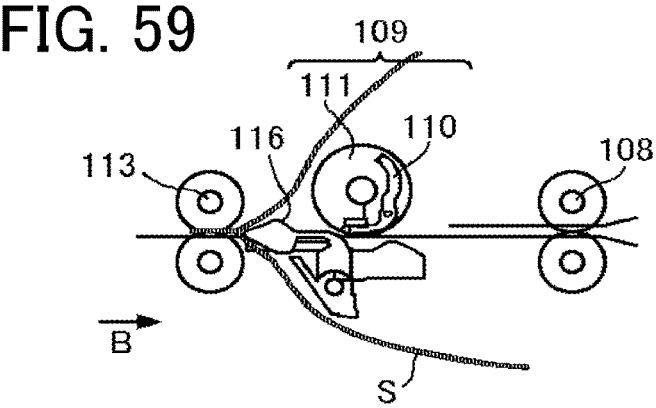
FIG. 59 is a schematic view illustrating the main part of the sheet processing device in a state subsequent to the state in FIG. 58.

Next, as illustrated in FIG. 59, after the separation claws 116 have separated the whole area of the trailing end of the lamination sheet S, the controller 800 of the sheet processing device 100 causes the driver to rotate the exit roller pair 113 in the counterclockwise direction in FIG. 59 to convey the lamination sheet S in the reverse conveyance direction (sheet conveyance direction B). That is, the separation claws 116 guide the two sheets separated from the lamination sheet S in the upper and lower directions, respectively, and therefore the two sheets are fully separated.

Then, the controller 800 of the sheet processing device 100 causes the driver to temporarily stop the conveyance of the lamination sheet S, so that the bonded portion of the lamination sheet S is held (nipped) by the exit roller pair 113. Accordingly, one end of the lamination sheet S is bonded as the bonded side of the lamination sheet S and the other end of the lamination sheet S is opened largely.

Note that these operations are performed by conveying the lamination sheet S from the conveyance sensor C5 by a specified amount in response to the timing at which the conveyance sensor C5 detected the leading end of the lamination sheet S.

Variation A description is given of the sheet processing device having another example of a sheet guide passage of the two sheets separated from the lamination sheet S, with reference to FIGS. 68A, 68B, and 68C. FIGS. 68A, 68B, and 68C are schematic views, each illustrating another example of a sheet guide passage of the two sheets separated from the sheet S. The sheet processing device 100 illustrated in FIG. 68A has the same sheet guide passages as the sheet processing device 100 illustrated in FIG. 59 to guide the upper and lower sheets in the same direction from the bonded portion of the lamination sheet S. Alternatively, as illustrated in FIG. 68B, the sheet processing device 100 may have sheet guide passages extending in different directions in an inverted S shape to guide the upper and lower sheets in different directions. Further, as illustrated in FIG. 68C, the sheet processing device 100 may have sheet guide passages extending in different directions in an S shape to guide the upper and lower sheets in different directions which are opposite the directions of the sheet guide passages in the sheet processing device 100 illustrated in FIG. 68B.

Figure 60:
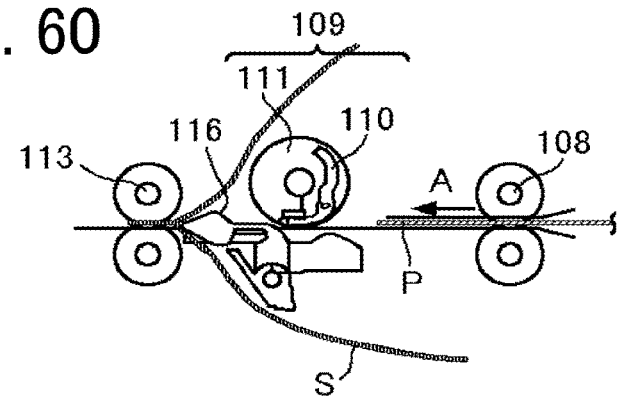
FIG. 60 is a schematic view illustrating the main part of the sheet processing device in a state subsequent to the state in FIG. 59.

Then, as illustrated in FIG. 60, the controller 800 of the sheet processing device 100 causes the entrance roller pair 108 to rotate to convey the inner sheet P conveyed from the sheet feed tray 103 (see FIG. 51) toward the exit roller pair 113 in the forward conveyance direction (sheet conveyance direction A).

Figure 61:
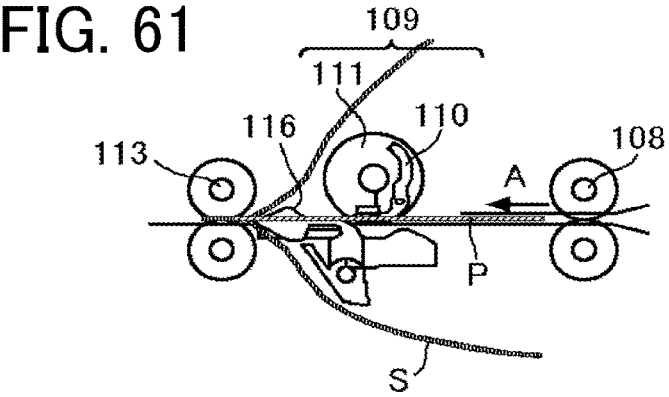
FIG. 61 is a schematic view illustrating the main part of the sheet processing device in a state subsequent to the state in FIG. 60.

Subsequently, as illustrated in FIG. 61, the controller 800 of the sheet processing device 100 causes the exit roller pair 113 to rotate so that the lamination sheet S and the inner sheet P converge to insert the inner sheet P into the lamination sheet S from the open portion (on the other end) of the lamination sheet S.

Figure 62A:
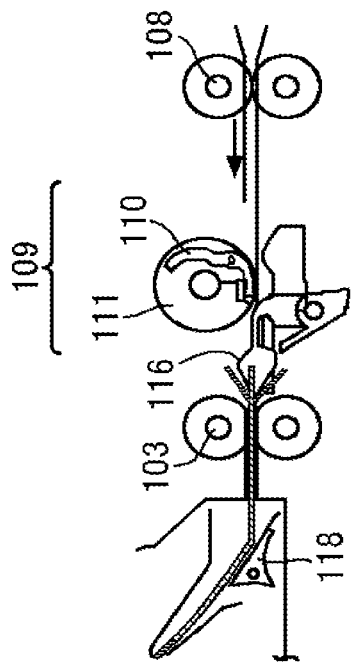
FIGS. 62A and 62B are schematic views, each illustrating the main part of the sheet processing device, in a state subsequent to the state in FIG. 61.

Then, as illustrated in FIG. 62A, the exit roller pair 113 of the sheet processing device 100 conveys the lamination sheet S in which the inner sheet P is inserted, in the forward conveyance direction (sheet conveyance direction A). Thus, the two sheets of the lamination sheet S are overlapped one on another again so as to close the open portion of the lamination sheet S. Then, a roller disposed downstream from the exit roller pair 113 ejects and stacks the lamination sheet S with the inner sheet PM inserted, on the sheet ejection tray 104 (see FIG. 51).

Figure 62B:
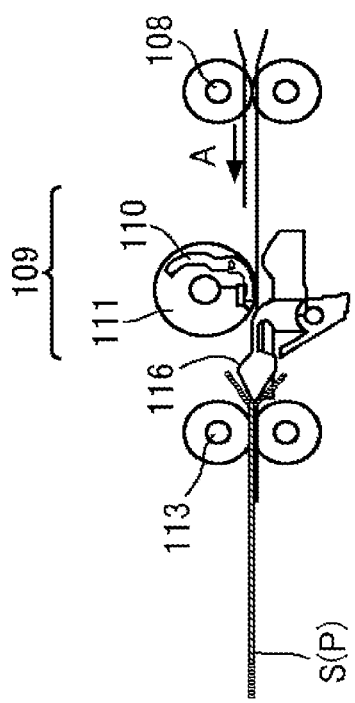

As an alternative example, in a case in which a sheet processing device includes a heat-pressure device capable of heating and pressing the lamination sheet S, as illustrated in FIG. 62B, a branching claw 118 may change (switch) the sheet conveyance passage of the lamination sheet S to convey the lamination sheet S to the heat-pressure device.

As described above, the controller 800 of the sheet processing device 100 according to the present embodiment causes the driver to open the lamination sheet S so as to insert and nip the inner sheet P into the lamination sheet S. Accordingly, since the configuration of the sheet processing device 100 is simpler than the configuration of a typical sheet laminator employing a vacuum device, the entire sheet processing device has a simpler and smaller configuration.

As illustrated in FIG. 51, the sheet processing device 100 according to the present embodiment loads the lamination sheet S and the inner sheet P on separate trays and feeds and conveys the lamination sheet S and the inner sheet P separately. Accordingly, the convenience is enhanced without loading the lamination sheet S and the inner sheet P in the predetermined order. Note that, in the present embodiment, the lamination sheet S is loaded on the sheet tray 102 and the inner sheet P is loaded on the sheet feed tray 103. However, the tray on which the lamination sheet S is loaded and the tray on which the inner sheet P is loaded are not limited to the above-described trays. For example, the inner sheet P may be loaded on the sheet tray 102 and the lamination sheet S may be loaded on the sheet feed tray 103.

Next, a description is given of a sheet laminator, an image forming apparatus, and an image forming system, each including the sheet processing device according to an embodiment of the present disclosure.

Figure 69:
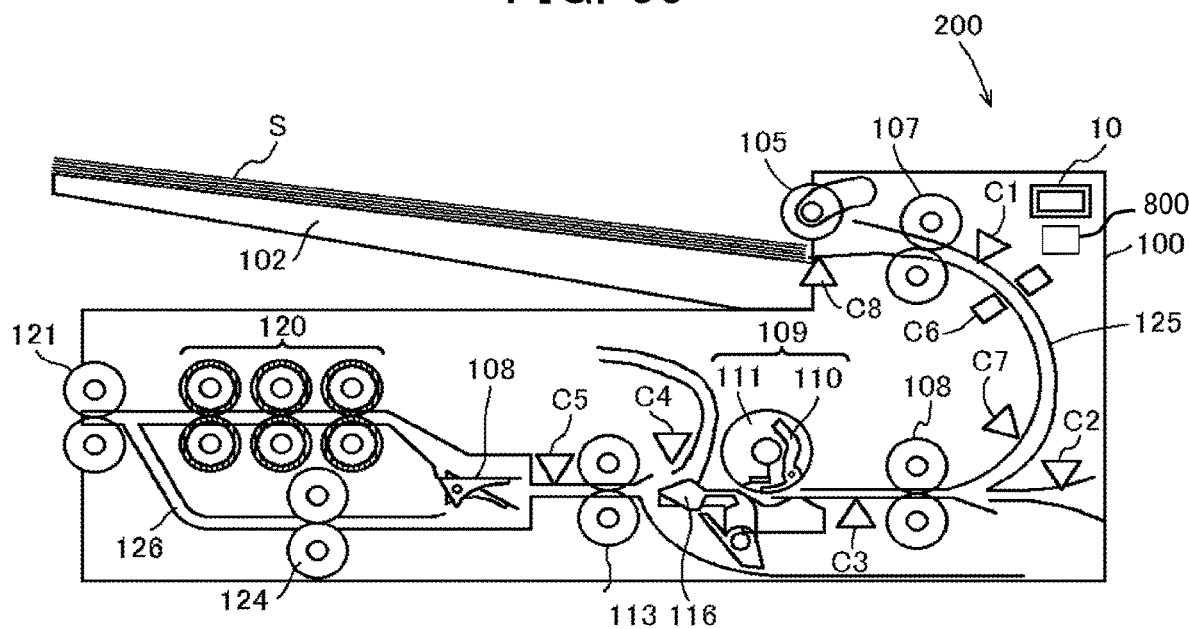
FIG. 69 is a schematic view illustrating the overall configuration of an example of a sheet laminator according to an embodiment of the present disclosure.

FIG. 69 is a schematic view illustrating the overall configuration of an example of a sheet laminator according to an embodiment of the present disclosure. As illustrated in FIG. 69, the sheet laminator 200 includes the sheet processing device 100 described above. The sheet laminator 200 includes, for example, a sheet tray 102, heat-pressing rollers 120, a heat-pressing conveyance path 128, and a non-heat-pressing conveyance path 126. The lamination sheet S is loaded on the sheet tray 102 in the laminate processing mode. The heat-pressing roller 120 is a heat pressing member that heats and presses the lamination sheet S fed from the sheet tray 102. The heat-pressing conveyance path 128 is provided with the heat-pressing rollers 120. The lamination sheet S is conveyed through the heat-pressing conveyance path 128 to a post-processing device 600 connected downstream of the sheet laminator 200 in the sheet conveyance direction. The post-processing device 600 is provided with the non-heat-pressing conveyance path 126. The lamination sheet S is conveyed to the post-processing device 600 connected downstream of the sheet laminator 200 in the sheet conveyance direction, without passing through the non-heat-pressing conveyance path 126. The sheet laminator 200 includes a multi-feed detection sensor C6 and an ejection roller 121. The multi-feed detection sensor C6 is disposed on a conveyance path 125 located downstream from the sheet tray 102 in the sheet conveyance direction. The multi-feed detection sensor C6 detects multi-feed of sheets. The ejection roller 121 is disposed downstream from the heat-pressing roller 120 in the sheet conveyance direction. Here, the multi-feed detection sensor C6 may be an ultrasonic sensor.

The sheet laminator 200 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations is carried out automatically without any aid of a user, and therefore the sheet laminator enhances and provides the convenience better than a sheet laminator employing a known technique.

The sheet laminator 200 can be used even in a mode in which the laminate processing is not performed, and specifically, also has an inserter function. In other words, the sheet tray 102 can be used in two modes, a laminate processing mode and a non-laminate processing mode. Accordingly, there can be provided a sheet laminator that prevents laminate films from sticking to each other, is compact and easy to use, and has a plurality of post-processing functions. In the present embodiment, two functions of an inserter and a laminator can be obtained without adding a connection machine, and a device having these post-processing functions can be downsized. More specifically, when a printed sheet or the like is inserted and stapled, a plurality of post-processing devices are connected to the downstream side and the size of the entire system may be increased. However, according to the present embodiment, the sheet laminator 200 can feed not only laminate films but also printed sheets and the like, thus allowing downsizing of the system.

On the conveyance path 125 from the sheet tray 102, a trailing-end detection sensor C8, a conveyance sensor C1, the multi-feed detection sensor C6, and a standby position sensor C7 are arranged in this order. The trailing-end detection sensor C8 detects the trailing end of a lamination sheet S. The conveyance sensor C1 detects the conveyance position of the lamination sheet S. The standby position sensor C7 detects the standby position of the lamination sheet S.

A branch claw 118 is disposed downstream from a conveyance sensor C5 in the sheet conveyance direction. The branch claw 118 switches the lamination sheet S to the heat-pressing conveyance path 128 or the non-heat-pressing conveyance path 126. The non-heat-pressing conveyance path 126 and the heat-pressing conveyance path 128 meet at a position upstream from the ejection roller 121 in the sheet conveyance direction. Through the non-heat-pressing conveyance path 126, the lamination sheet S is conveyed to the post-processing device 600 without passing through the heat-pressing conveyance path 128 provided with the heat-pressing rollers 120.

Figure 70:
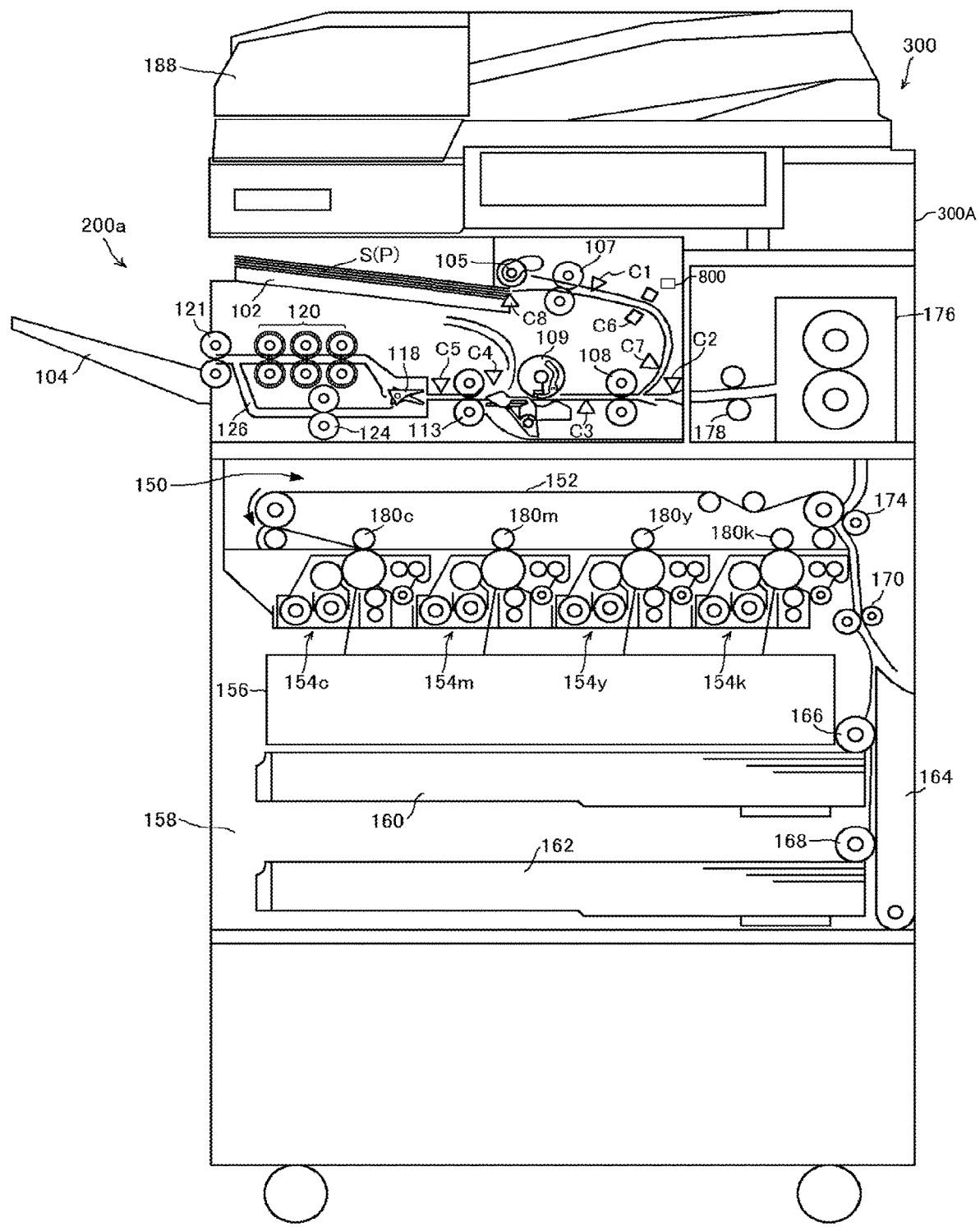
FIG. 70 is a schematic view illustrating the overall configuration of an image forming apparatus including a sheet laminator according to an embodiment of the present disclosure.

FIG. 70 is a schematic view illustrating the overall configuration of an image forming apparatus including a sheet laminator according to an embodiment of the present disclosure. An image forming apparatus 300 according to the present embodiment includes a sheet laminator 200a as a device that performs sheet lamination inside the image forming apparatus 300.

The sheet laminator 200a includes the sheet tray 102 on which the lamination sheet S or the inner sheet P are loaded. The sheet laminator 200a is capable of receiving the lamination sheet S, the inner sheet P, or both from the image forming apparatus 300. Accordingly, the image forming apparatus 300 (e.g., a printer or a copier) is capable of adding (forming) an image on the lamination sheet S or the inner sheet P by the in-line connection.

The configuration of the image forming apparatus 300 is described in detail. As illustrated in FIG. 70, the image forming apparatus 300 includes a housing 300A. The image forming apparatus 300 includes an intermediate transfer device 150 in the housing 300A. The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 70.

The image forming apparatus 300 further includes image forming devices 154c, 154m, 154y, and 154k for yellow (Y), magenta (M), cyan (C), and black (K), respectively, are disposed below the intermediate transfer device 150 in the housing 300A. The image forming devices 154c, 154m, 154y, and 154k are arranged in a quadruple tandem manner along an extended direction of the intermediate transfer belt 152. Each of the image forming devices 154c, 154m, 154y, and 154k includes a drum-shaped image bearer that rotates in the clockwise direction in FIG. 70. Various image forming components, for example, a charging device, a developing device, a transfer device, and a cleaning device, are disposed around each of the image forming devices 154c, 154m, 154y, and 154k. An exposure device 156 is disposed below the image forming devices 154c, 154m, 154y, and 154k in the housing 300A of the image forming apparatus 300.

A sheet feeder 158 is disposed below the exposure device 156 in the housing 300A of the image forming apparatus 300. The sheet feeder 158 includes a first sheet tray 160 that stores lamination sheets S and a second sheet tray 162 that stores inner sheets P. Note that the first sheet feed tray 160 is an example of a third sheet loader on which a two-ply sheet such as the lamination sheet S is loaded. Similarly, the second sheet feed tray 162 is an example of a fourth sheet loader on which a sheet medium (e.g., the inner sheet P) is loaded.

A first feed roller 166 is disposed at a position upper right of the first sheet feed tray 160. The first feed roller 166 feeds out the lamination sheet S one by one from the first sheet feed tray 160 to a sheet conveyance passage 164. A second sheet feeding roller 168 is disposed at the upper right of the second sheet tray 162 and feeds the inner sheets P from the second sheet tray 162 one by one to the sheet conveyance path 164.

The sheet conveyance passage 164 extends upwardly on the right side in the housing 300A of the image forming apparatus 300 and communicates with the sheet laminator 200a provided in the housing 300A of the image forming apparatus 300. The sheet conveyance passage 164 is provided with, e.g., a conveyance roller 170, a secondary transfer device 174 disposed facing the intermediate transfer belt 152, a fixing device 176, and a sheet ejection device 178 including an ejection roller pair, serially.

Note that the first feed roller 166, the conveyance roller 170, and the sheet conveyance passage 164 are examples of a third sheet feeder to feed the two-ply sheet from the first sheet feed tray 160 (third sheet loader). Further, the second feed roller 168, the conveyance roller 170, and the sheet conveyance passage 164 are examples of a fourth sheet feeder to feed a sheet medium from the second sheet feed tray 162 (fourth sheet loader). Further, the intermediate transfer device 150 and the fixing device 176 are examples of an image forming device that forms an image on a two-ply sheet or a sheet medium.

Next, a description is given of operations of the image forming apparatus 300 according to the present embodiment, to form an image on the lamination sheet S and then perform a sheet laminating operation on the lamination sheet S.

When forming an image on the lamination sheet S, firstly, an image reading device 188 reads the image on an original document, and the exposure device 156 then performs image writing. Thereafter, the image forming devices 154c, 154m, 154y, and 154k form respective color toner images on the respective image bearers. Then, primary transfer devices 180c, 180m, 180y, and 180k sequentially transfer the respective toner images onto the intermediate transfer belt 152, thereby forming a color image on the intermediate transfer belt 152.

By contrast, the image forming apparatus 300 rotates the first feed roller 166 to feed and convey the lamination sheet S to the sheet conveyance passage 164. Then, the lamination sheet S is conveyed by the conveyance roller 170 through the sheet conveyance passage 164 and is sent to a secondary transfer position in synchrony with movement of the color image on the intermediate transfer belt 152. Then, the secondary transfer device 174 transfers the color image formed on the intermediate transfer belt 152 as described above, onto the lamination sheet S.

After the image has been transferred onto the lamination sheet S, the fixing device 176 fixes the image on the lamination sheet S to the lamination sheet S, and the sheet ejection device 178 ejects to convey the lamination sheet S to the sheet laminator 200a.

Further, the image forming apparatus 300 rotates the second feed roller 168 to feed the inner sheet P to the sheet conveyance passage 164, and the sheet ejection device 178 ejects to convey the inner sheet P to the sheet laminator 200a.

As described above, the lamination sheet S on which the image has been formed and the inner sheet P are conveyed to the sheet laminator 200a, so that the sheet laminating operation is performed by the sheet laminator 200a. Since the details of the sheet laminating operation have been described above, the redundant descriptions are omitted.

According to the above-described configuration of the image forming apparatus 300 according to the present embodiment, the sheet laminator 200a may perform the sheet laminating operation after an image is formed on the inner sheet P. In addition, the sheet laminator 200a may perform the sheet laminating operation after the image forming operation has been performed on the inner sheet P and the lamination sheet S.

Next, a description is given of a sheet laminator, an image forming apparatus, and an image forming system, each including the sheet processing device according to another example of the present disclosure.

Figure 71:
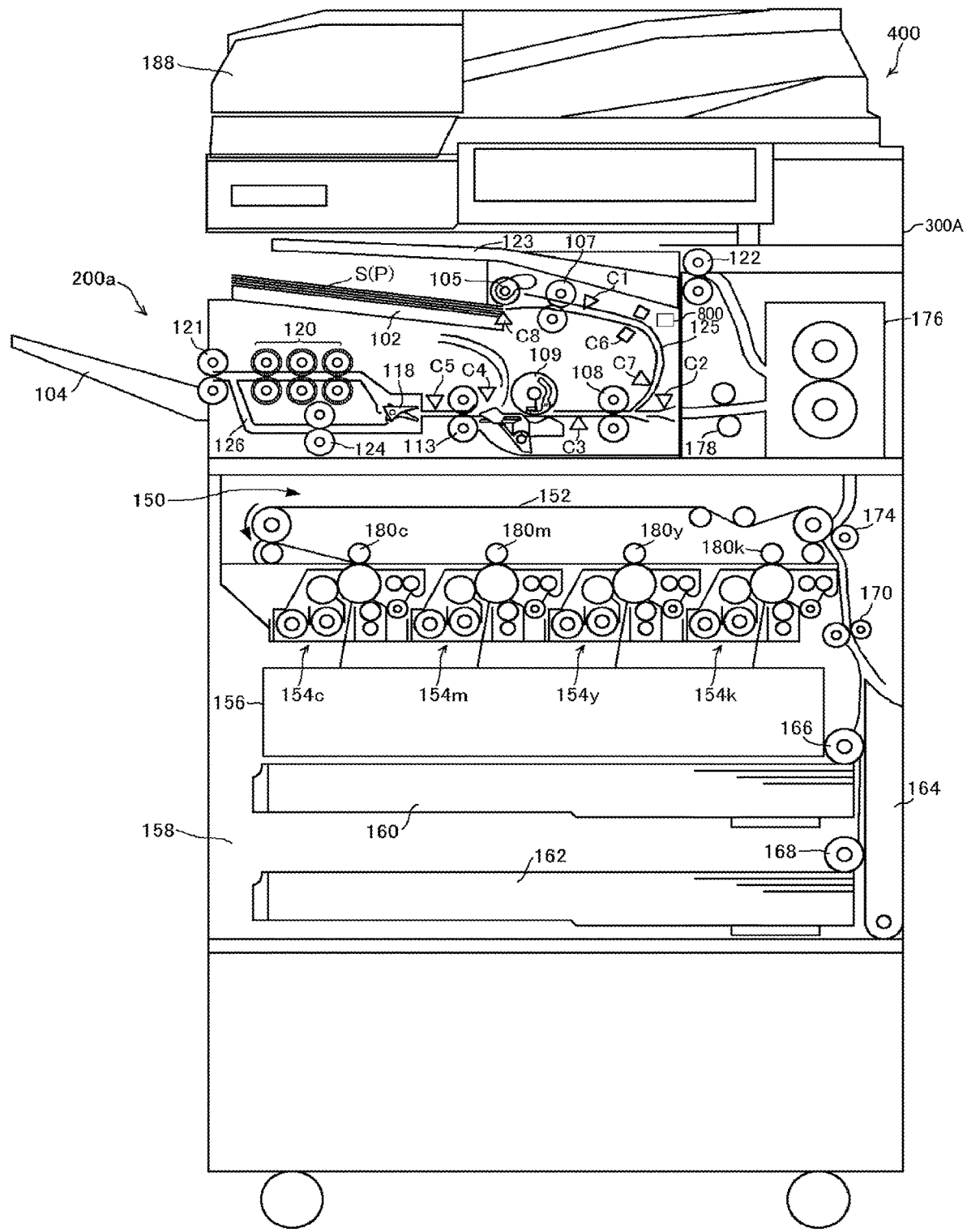
FIG. 71 is an overall configuration diagram illustrating a variation of an image forming apparatus including a sheet laminator according to an embodiment of the present disclosure.

FIG. 71 is a schematic view illustrating the overall configuration of an image forming apparatus including a sheet laminator according to a variation of the present disclosure. An image forming apparatus 400 illustrated in FIG. 71 is basically same as the image forming apparatus 300 illustrated in FIG. 70. However, different from the image forming apparatus 300 illustrated in FIG. 70, the image forming apparatus 400 includes a main ejection roller pair 122 and a main ejection tray 123, each of which is provided in a housing 400A of the image forming apparatus 400.

When the sheet laminating operation is not performed, the image forming apparatus 400 may eject the recording medium on which the image is formed, by a main ejection roller pair 122 to a main ejection tray 123. Accordingly, the image forming apparatus 400 does not decrease the image output speed when the sheet laminating operation is not performed.

Note that the image forming apparatus 400 may include the sheet laminator 200a in the housing 400A to be detachably attached to the housing 400A. That is, when the sheet laminating operation is not required, the sheet laminator 200a may be detached from the image forming apparatus 400.

In addition, in the sheet laminator 200a thus removed, the sheet feed tray 103 on which the inner sheet P is loaded and the pickup roller 106 to feed the inner sheet P from the sheet feed tray 103 may be attached to the sheet laminator 200a, so that the sheet laminator 200a is used as a stand-alone machine similar to the sheet laminator 200a illustrated in FIG. 69.

The image forming apparatus 300 illustrated in FIG. 70 and the image forming apparatus 400 illustrated in FIG. 71 may include a sheet processing device instead of the sheet laminator 200a. The image forming apparatus 400 illustrated in FIG. 71 may include a sheet processing device that is removably attached to the image forming apparatus 400.

Further, an image forming system may include the image forming apparatus 300 or 400, the sheet processing device 100 detachably attached to the image forming apparatus 300 or 400 or the sheet laminator 200 detachably attached to the image forming apparatus 300 or 400. Furthermore, another image forming system may further include at least one of a sheet feeder (a stacker), a case binding device, or both. Note that, in a case in which a lamination sheet S passes through a fixing device 176, the lamination sheet S is not bonded at the fixing temperature but is bonded by application of heat higher than the fixing temperature.

Although the image forming apparatus 300 illustrated in FIG. 70 and the image forming apparatus 400 illustrated in FIG. 71 employ electrophotography for image formation on the lamination sheet S and the inner sheet P in the description above, the image formation method is not limited to the above-described configuration. For example, inkjet, stencil printing, or other printing method may be employed in the image forming apparatuses 300 and 400.

Figures 72A, 72B, 72C:
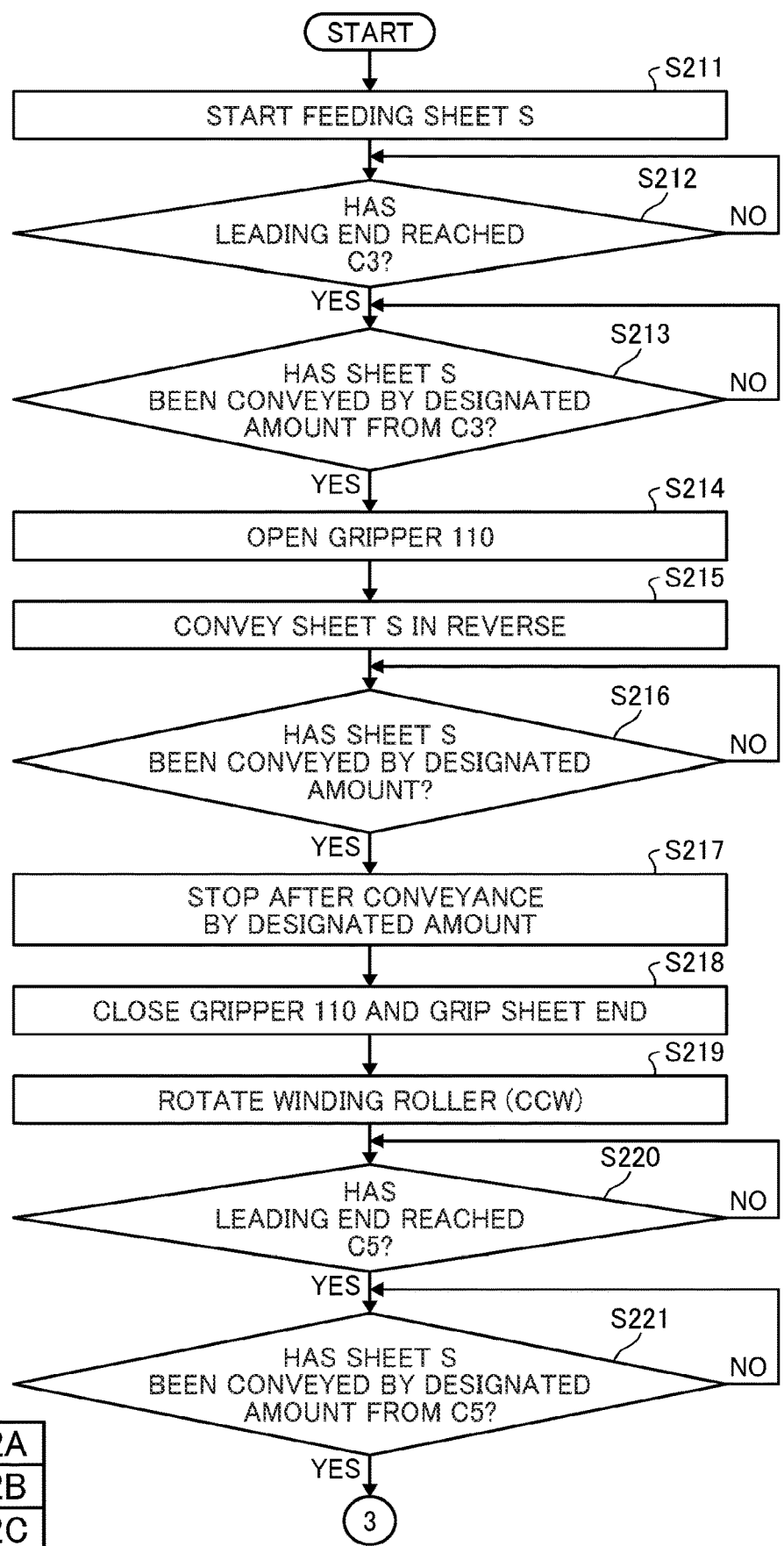
FIGS. 72A, 72B, and 72C is a flowchart illustrating a series of operations from feeding a sheet, inserting an inner sheet, and laminating the sheet with the inner sheet being inserted.
Figure 72B:
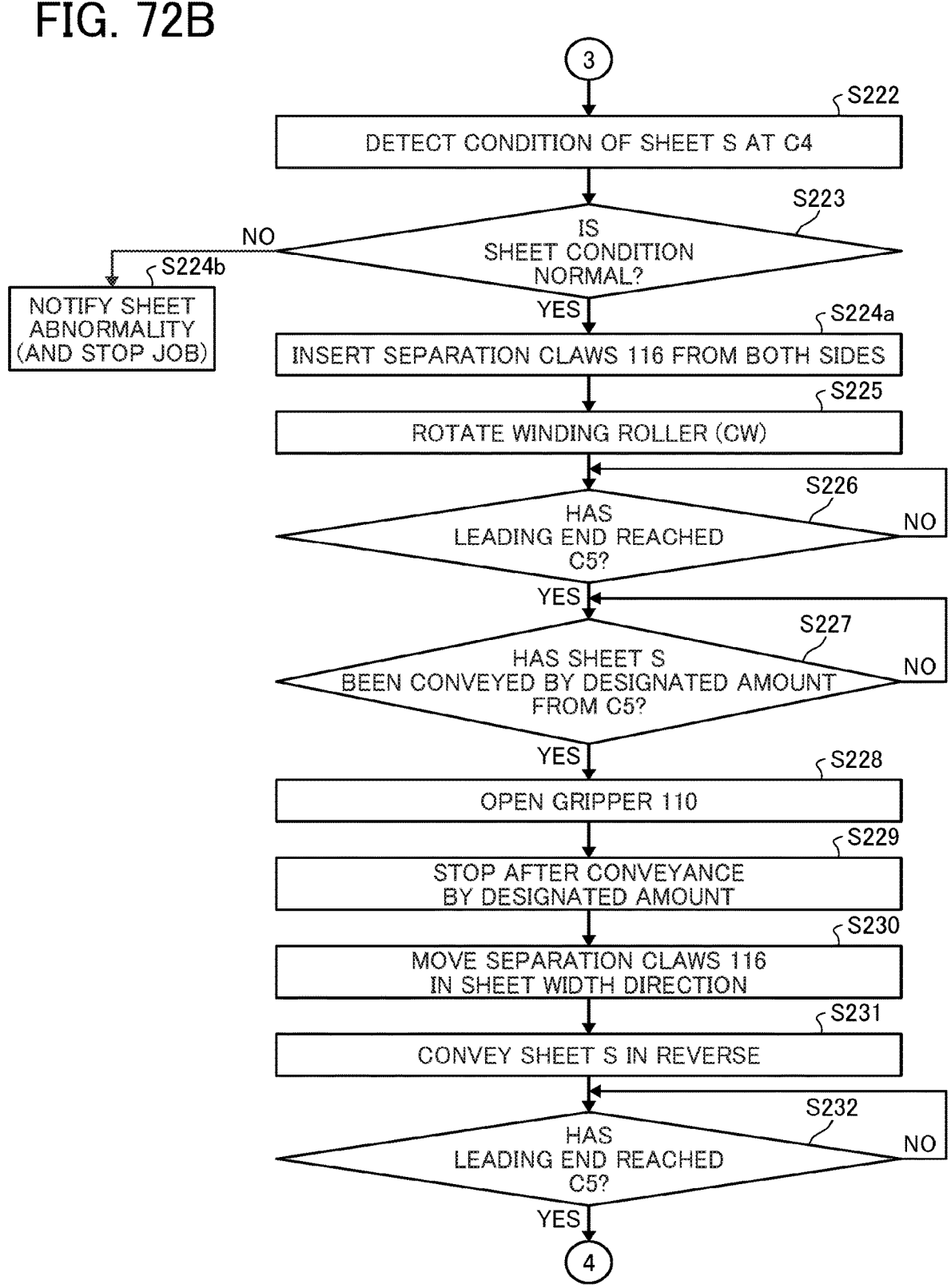
Figure 72C:
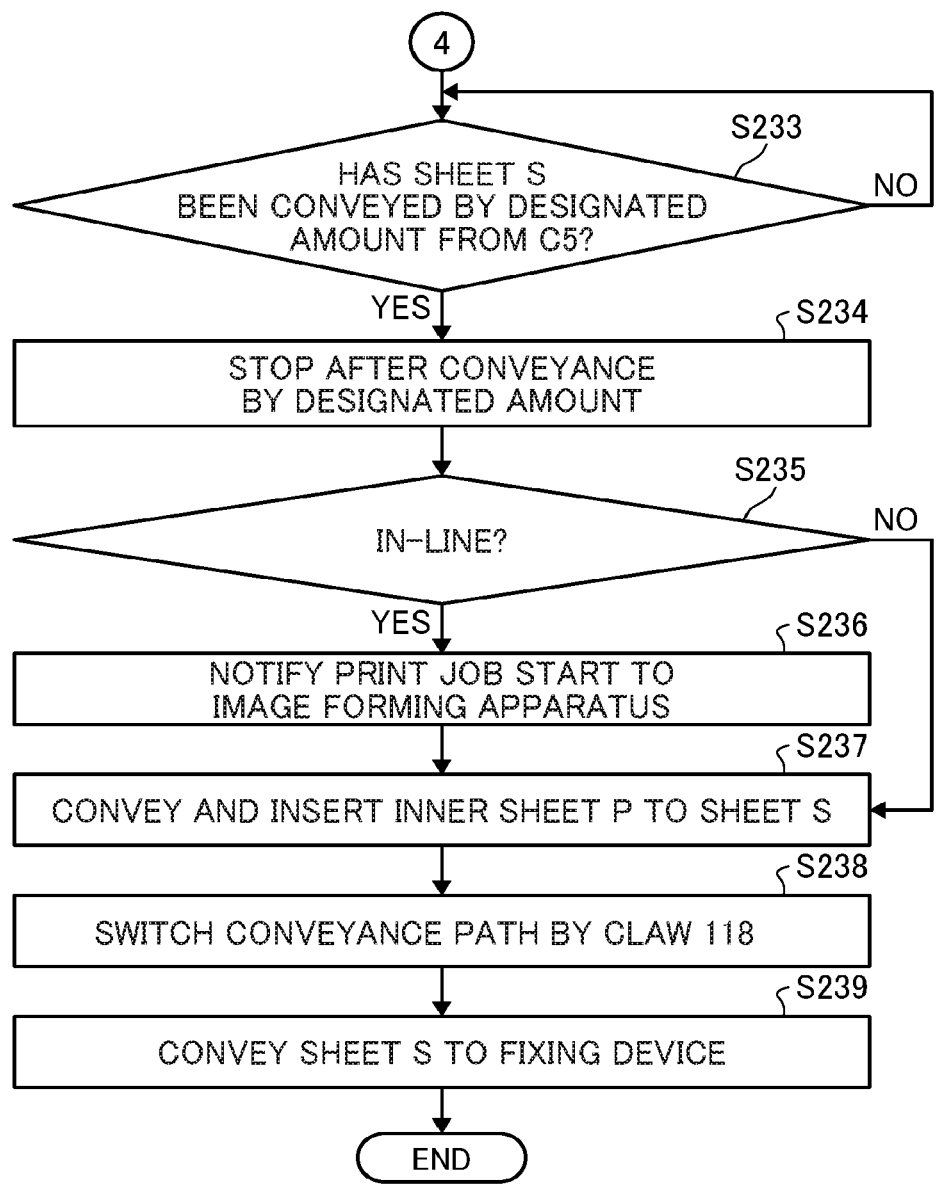

FIG. 72 including FIGS. 72A, 72B, and 72C is a flowchart illustrating a series of operations of feeding a lamination sheet, inserting an inner sheet, and laminating the lamination sheet with the inner sheet being inserted. A description is given of the series of operations, with reference to the reference numerals indicated in the flowchart of FIG. 50 including FIGS. 50A, 50B, and 50C.

First, in step S211 of FIG. 50A, the controller 800 of the sheet processing device 100 causes the driver to start feeding a lamination sheet S (see FIG. 51). In step S212 of FIG. 72A, the controller 800 of the sheet processing device 100 determines whether the leading end of the lamination sheet S has reached the conveyance sensor C3 based on the detection result of the conveyance sensor C3 (see FIG. 52). When the leading end of the lamination sheet S has not reached the conveyance sensor C3 (NO in step S212 of FIG. 72A), step S212 is repeated until the leading end of the lamination sheet S reaches the conveyance sensor C3. By contrast, when the leading end of lamination sheet S has reached the conveyance sensor C3 (YES in step S212 of FIG. 72A), the series of operations in the flowchart of FIG. 72 including FIGS. 72A, 72B, and 72C goes on to step S213. In step S213 of FIG. 72A, the controller 800 determines whether the lamination sheet S has been conveyed by the specified amount from the sheet sensor C3, that is, whether a specified time has passed since the sheet sensor C3 detects the leading end of the lamination sheet S. When the lamination sheet S has not been conveyed by the specified amount from the sheet sensor C3 (NO in step S213 of FIG. 72A), step S213 is repeated until the lamination sheet S is conveyed by the specified amount from the sheet sensor C3. By contrast, when the lamination sheet S has been conveyed by the specified amount from the sheet sensor C3 (YES in step S213 of FIG. 72A), the controller 800 of the sheet processing device 100 causes the driver to temporarily stop conveying the lamination sheet S (see FIG. 53). For example, the "specified amount" used here and those in subsequent steps are stored in a memory by a manufacturer based on empirical data. Subsequently, the controller 800 of the sheet processing device 100 causes the driver to open the gripper 110 in step S214 of FIG. 72A. Then, the controller 800 causes the driver to convey the lamination sheet S in the reverse conveyance direction in step S215 of FIG. 72A (see FIG. 54).

In step S216 of FIG. 72A, the controller 800 of the sheet processing device 100 determines whether the lamination sheet S has been conveyed by a specified amount. When the lamination sheet S has not been conveyed by the specified amount (NO in step S216 of FIG. 72A), step S116 is repeated until the lamination sheet S is conveyed by the specified amount. By contrast, when the lamination sheet S has been conveyed by the specified amount (YES in step S216 of FIG. 72A), the controller 800 causes the driver to temporarily stop conveying the lamination sheet S in step S217 of FIG. 72A. In step S218 of FIG. 72A, the controller 800 causes the driver to close the gripper 110 to grip the end of the lamination sheet S (see FIG. 55).

In step S219 of FIG. 72A, the controller 800 of the sheet processing device 100 causes the driver to rotate the winding roller 109 in the counterclockwise direction (i.e., in the reverse direction) and wind the lamination sheet S around the winding roller 109 (see FIG. 56). In step S220 of FIG. 72A, the controller 800 determines whether the leading end of the lamination sheet S has reached at the conveyance sensor C5. When the leading end of the lamination sheet S has not reached the conveyance sensor C5 (NO in step S220 of FIG. 72A), step S220 is repeated until the leading end of the lamination sheet S reaches the conveyance sensor C5. By contrast, when the leading end of sheet S has reached the conveyance sensor C5 (YES in step S220 of FIG. 72A), the series of operations in the flowchart of FIG. 72 including FIGS. 72A, 72B, and 72C goes on to step S221. In step S221 of FIG. 72A, the controller 800 of the sheet processing device 100 determines whether the lamination sheet S has been conveyed by the specified amount from the conveyance sensor C5. When the lamination sheet S has not been conveyed by the specified amount from the conveyance sensor C5 (NO in step S221 of FIG. 72A), step S221 is repeated until the lamination sheet S is conveyed by the specified amount from the conveyance sensor C5. By contrast, when the lamination sheet S has been conveyed by the specified amount from the conveyance sensor C5 (YES in step S221 of FIG. 72A), the controller 800 causes the abnormality state detector C4 to detect the state of the lamination sheet S in step S222 of FIG. 72B. Then, the controller 800 determines whether the state of the lamination sheet S is normal based on the detection results of the abnormality state detector C4 in step S223 of FIG. 72B.

The abnormality state detector C4 is an abnormality detector to detect the size of the gap between the two sheets of the lamination sheet S for the sheet processing device 100 to determine whether the size of the gap exceeds the predetermined threshold. In step S223 of FIG. 72B, the controller 800 of the sheet processing device 100 determines whether the state of the lamination sheet S is normal, that is, whether the size of the gap between the two sheets of the lamination sheet S is equal to or greater than the predetermined threshold based on the detection result of the abnormality state detector C4. When the state of the lamination sheet S is normal (YES in step S223 of FIG. 72B), the series of operations in the flowchart of FIG. 72 including FIGS. 72A, 72B, and 72C goes on to step S224a.

By contrast, when it is determined that the state of the lamination sheet S is abnormal, in other words, when the size of the gap is smaller than the predetermined threshold (NO in step S223 of FIG. 72B), the controller 800 of the sheet processing device 100 causes the operation panel 10 to display the abnormality (e.g., displays an error message) and stops the series of operations of sheet processing job in step S224b of FIG. 72B.

In step S224a, the controller 800 in the sheet processing device 100 controls the driver to insert, from both sides, the separation claws 116 into the gap generated between the sheets of the lamination sheet S (see FIG. 57). In step S225 of FIG. 72B, the controller 800 of the sheet processing device 100 causes the driver to rotate the winding roller 109 in the clockwise direction (i.e., in the forward direction) with the separation claws 116 inserted from both sides of the lamination sheet S, and convey the lamination sheet S in the forward conveyance direction.

Then, in step S226 of FIG. 72B, the controller 800 determines whether the leading end of the lamination sheet S has reached the conveyance sensor C5. When the leading end of the lamination sheet S has not reached the conveyance sensor C5 (NO in step S226 of FIG. 72B), step S226 is repeated until the leading end of the lamination sheet S reaches the conveyance sensor C5. By contrast, when the leading end of sheet S has reached the conveyance sensor C5 (YES in step S226 of FIG. 72B), the series of operations in the flowchart of FIG. 72 including FIGS. 72A, 72B, and 72C goes on to step S227. In step S227 of FIG. 72B, the controller 800 of the sheet processing device 100 determines whether the lamination sheet S has been conveyed by the specified amount from the sheet sensor C5. When the lamination sheet S has not been conveyed by the specified amount from the sheet sensor C5 (NO in step S227 of FIG. 72B), step S227 is repeated until the lamination sheet S is conveyed by the specified amount from the sheet sensor C5. By contrast, when the lamination sheet S has been conveyed by the specified amount from the sheet sensor C5 (YES in step S227 of FIG. 72B), the controller 800 causes the driver to open the gripper 110 in step S228 of FIG. 72B.

In step S229, the controller 800 in the sheet processing device 100 controls the driver to temporarily stop the conveyance of the lamination sheet S and, in step S230, move the separation claws 116 further in the sheet width direction (see FIG. 58). As a result, the trailing end of the lamination sheet S in the forward conveyance direction is separated into the upper and lower sheets.

In step S231, the controller 800 in the sheet processing device 100 controls the driver to convey the lamination sheet S in the reverse conveyance direction. Then, in step S232 of FIG. 72B, the controller 800 determines whether the leading end of the lamination sheet S in the forward conveyance direction has reached the conveyance sensor C5. When the leading end of the lamination sheet S has not reached the conveyance sensor C5 (NO in step S232 of FIG. 72B), step S232 is repeated until the leading end of the lamination sheet S reaches the conveyance sensor C5. By contrast, when the leading end of sheet S has reached the conveyance sensor C5

(YES in step S232 of FIG. 72B), the series of operations in the flowchart of FIG. 72 including FIGS. 72A, 72B, and 72C goes on to step S233. In step S233, the controller 800 in the sheet processing device 100 determines whether the lamination sheet S is conveyed by the specified amount after the conveyance sensor C5 detects the leading end of the lamination sheet S. In response to a determination that the lamination sheet S is conveyed by the specified amount from the conveyance sensor C5 ("Yes" in step S233), the controller 800 suspends the sheet conveyance in step S234 (see FIG. 59). As a result, the separation of the lamination sheet S is completed.

Subsequently, in step S235 of FIG. 72C, the controller 800 of the sheet processing device 100 determines whether to perform the image forming operation (with an inline image forming apparatus) on the inner sheet P to be inserted into the lamination sheet S. When the image forming operation is performed with an inline image forming apparatus (YES in step S235 of FIG. 72C), the controller 800 of the sheet processing device 100 sends a signal to notify the inline image forming apparatus to start the print job (printing operation) to form an image on the inner sheet P in step S236 of FIG. 72C. Then, the series of operations moves on to step S237 of FIG. 72C.

By contrast, when the image forming operation is not performed with an inline image forming apparatus (NO in step S235 of FIG. 72C), the series of operations moves on to step S237 of FIG. 72C.

In S237, the sheet processing device 100 conveys the inner sheet P in the forward conveyance direction to be inserted in the opening of the lamination sheet S (see FIGS. 60 and 61).

Then, in step S238 of FIG. 72B, the controller 800 causes the driver to rotate the branch claw 118 to switch (change) the sheet conveyance passage of the lamination sheet S. In step S239, the lamination sheet S sandwiching the inner sheet P is conveyed to the heat pressing device (fixing device Md), and heat and pressure are applied to complete the laminate processing (see FIG. 62B).

Figure 73:
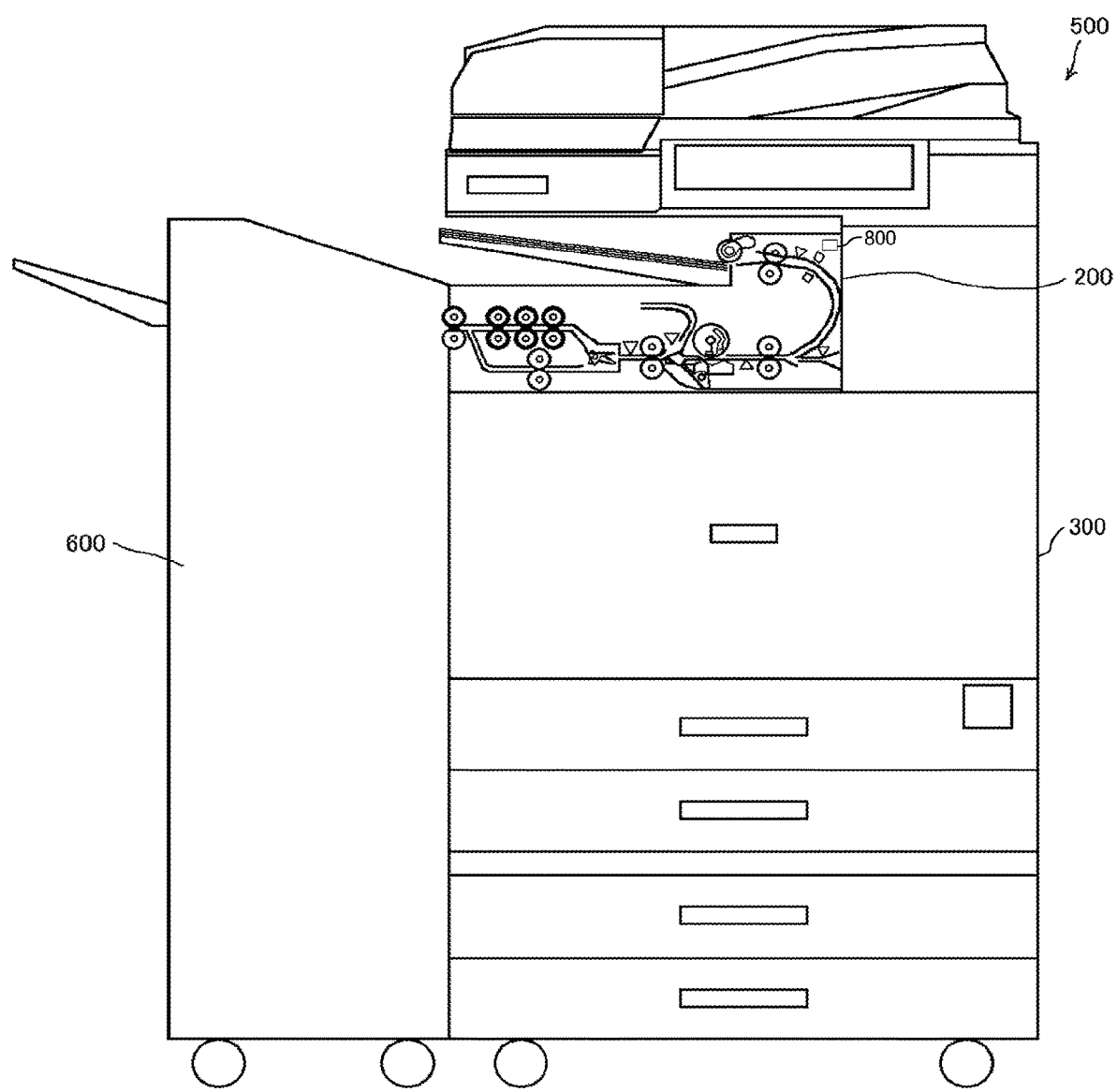
FIG. 73 is a schematic view illustrating an image forming system including a sheet laminator according to an embodiment of the present disclosure.

FIG. 73 is a schematic view illustrating an image forming system including a sheet laminator according to an embodiment of the present disclosure. An image forming system 500 according to an embodiment of the present disclosure includes an image forming apparatus 300, a sheet laminator 200 inside the image forming apparatus 300, and a post-processing device 600 disposed downstream from the sheet laminator 200 in the sheet conveyance direction. The post-processing device 600 can staple, for example, printed sheets. The image forming apparatus 300 according to the present embodiment is the same as the image forming apparatus 300 illustrated in FIG. 70, and some details are omitted in FIG. 73.

Figure 74:
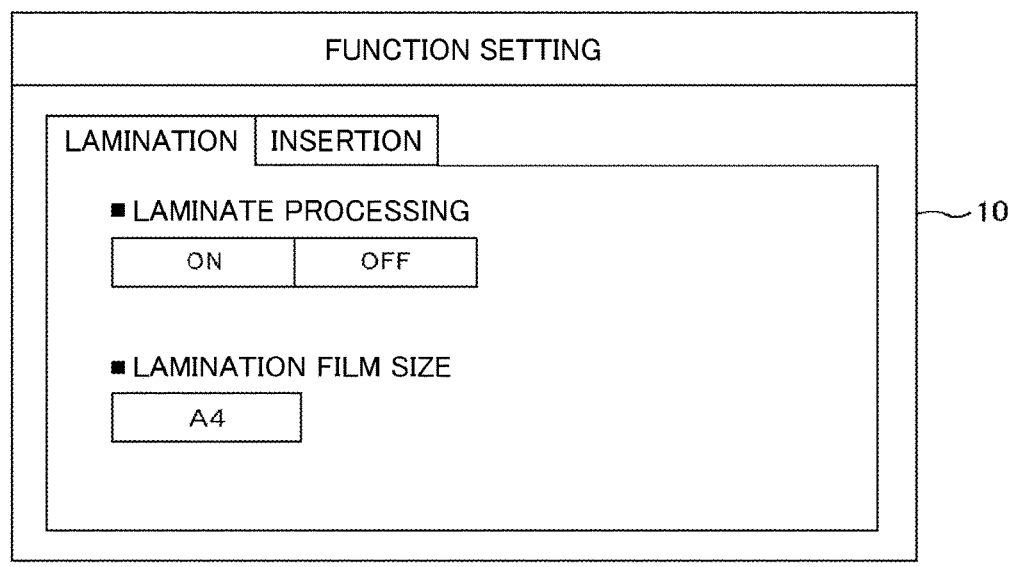
FIG. 74 is a diagram illustrating an example of a function selection screen displayed on an image forming apparatus according to the present embodiment.

FIG. 74 is a diagram illustrating an example of a function selection screen displayed on the image forming apparatus according to the present embodiment. As illustrated in FIG. 74, the user can select whether to perform the laminate processing by selecting ON and OFF on the operation screen of the image forming apparatus 300, and can also select the size of a lamination film. For the operation screen of the image forming apparatus 300, the operation panel 10 installed on the exterior portion of the sheet processing device 100 or the sheet laminator 200 can be used. As described above, the sheet laminator 200 has a switching device that switches between a laminate processing mode and a non-laminate processing mode. Such a configuration allows the user to make any print settings. In this example, the user first selects "lamination" from the operation panel 10, selects the laminate processing "ON", and selects "A4" as the "lamination film size".

When the laminate processing is performed, a series of operations described above in relation to FIGS. 72A, 72B, and 72C is performed. On the other hand, when the laminate processing is not performed, the sheet laminator 200 conveys a sheet S conveyed from the image forming apparatus 300 so that the sheet S passes through the non-heat-pressing conveyance path 126 without passing through the heat-pressing rollers 120. Thus, the sheet S is ejected to the post-processing device 600 downstream in the sheet conveyance direction. Providing the non-heat-pressing conveyance path 126 in the sheet laminator 200 allows the next print job to be started without waiting for the heat-pressing roller 120 to cool down after the laminate processing of the sheet S. Thus, an advantage can be obtained that the waiting time of the user can be shortened.

Figure 75:
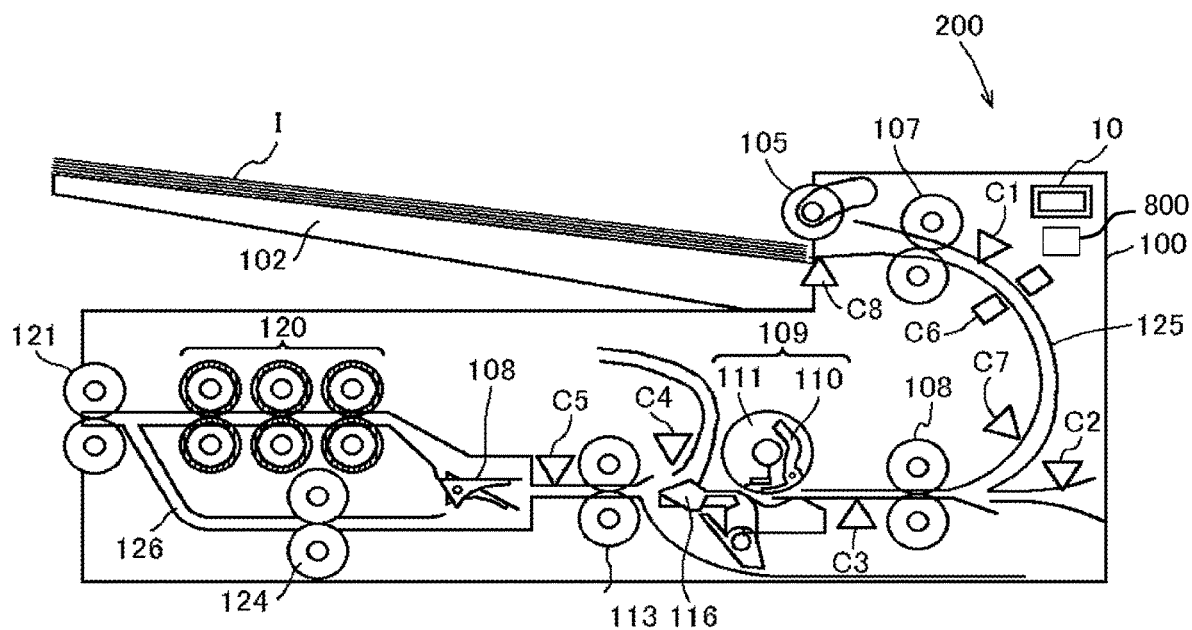
FIG. 75 is an overall configuration diagram illustrating an example of a sheet laminator including the sheet processing device according to an embodiment of the present disclosure.

FIG. 75 is an overall configuration diagram illustrating an example of a sheet laminator including the sheet processing device according to an embodiment of the present disclosure. As described above, the sheet tray 102 can be used in two modes, a laminate processing mode and a non-laminate processing mode. In the non-laminate processing mode, as illustrated in FIG. 75, the sheet laminator 200 according to the present embodiment includes insertion sheets I loaded on the sheet tray 102 and has a configuration as an inserter having an insertion function. The sheet laminator 200 inserts the insertion sheets I before or after sheet-shaped media conveyed from the image forming apparatus 300 and conveyed to the post-processing apparatus 600. The image forming apparatus 300 is connected to the upstream side of the sheet laminator 200 in the sheet conveyance direction. The insert sheet I is a printed sheet or an unprinted sheet. Thus, the sheet laminator 200 can function as an inserter without increasing the number of sheet trays.

Figure 76:
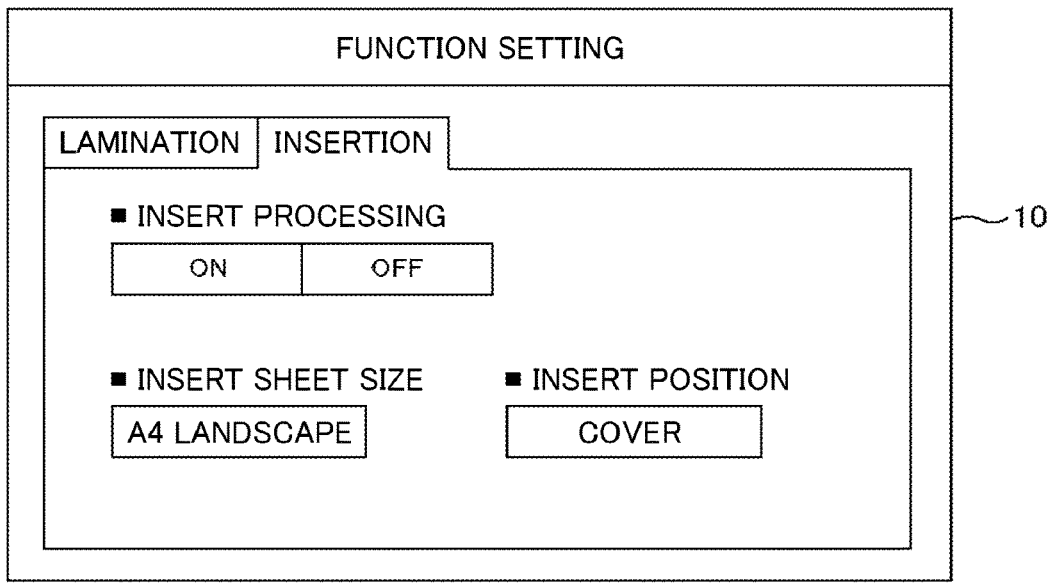
FIG. 76 is a diagram illustrating an example of an insert processing setting screen displayed on an image forming apparatus according to an embodiment of the present disclosure.

FIG. 76 is a diagram illustrating an example of an insert processing setting screen displayed on the image forming apparatus according to the present embodiment. An operation panel 10 installed on the exterior of the sheet processing device 100 can be used for the setting screen of the insert processing of the image forming apparatus 300. Accordingly, the user can operate the operation panel 10 to determine the size of an insertion sheet I loaded on the sheet tray 102 and the order of the insertion sheet I to be inserted between the lamination sheets S conveyed from the image forming apparatus 300. In this example, the user first selects "insertion", selects the insert processing "ON", selects "A4 landscape" as the insertion sheet size, and selects "cover" as the insert position.

In the insert processing, when a plurality of sheets S are conveyed from the image forming apparatus 300, the insertion sheet I loaded on the sheet tray 102 can be inserted at the position set at the insert position. Accordingly, the post-processing apparatus 600 can perform post-processing on a sheet bundle including the insertion sheet I.

The sheet laminator 200 illustrated in FIG. 75 has a function of determining whether a sheet loaded on the sheet tray 102 matches the selected processing setting. For example, the sheet laminator 200 stops a sheet when the sheet fed from the sheet tray 102 reaches the standby position sensor C7, and the multi-feed detection sensor C6 as a determination device determines whether the sheet is one sheet or a plurality of sheets. As a result of the determination, the sheet laminator 200 determines that the sheet fed from the sheet tray 102 is a sheet-shaped medium if there is one sheet, and determines that the sheet is a lamination film if there are a plurality of sheet. If the sheet loaded on the sheet tray 102 is different from the selected print setting, the sheet laminator 200 determines as abnormality and notifies the user of the occurrence of an error. For example, a beep sound is generated or an error display is displayed on the operation screen (operation panel 10) of the image forming apparatus 300. Such a configuration can prevent erroneous operation by the user.

Here, the multi-feed detection sensor C6 may be an ultrasonic sensor. Thus, the function as the determination device can be enhanced, and the sheet-shaped medium and the lamination film can be reliably distinguished.

When it is determined that there is an abnormality, the sheet laminator 200 may stop conveying a sheet S conveyed from the sheet tray 102. Such a configuration can reduce waste of the lamination film or sheet-shaped medium due to erroneous operation by the user. At this time, the sheet S stopped inside the sheet laminator 200 can be ejected to the post-processing device 600 through the non-heat-pressing conveyance path 126 by switching the branch claw 118. Such a configuration can reduce the trouble of the user removing the sheet S inside the sheet laminator 200.

Further, when it is determined that there is an abnormality, the sheet S conveyed from the sheet tray 102 may be ejected without stopping. Such a configuration allows the user to reduce the trouble of jam removal processing.

If the trailing end of the sheet S does not pass through the trailing-end detection sensor C8 when it is determined that there is an abnormality, the trailing end of the sheet S does not interfere with the stacked sheets S. Accordingly, the sheet S can be returned to the sheet tray 102 by reversely rotating the conveyance roller pair 107 serving as the conveyor. Such a configuration can reduce the time and effort for the user to process the jam and return the ejected sheet. The trailing end position of the sheet S may be estimated from the standby position sensor C7 and the sheet size.

Figure 77:
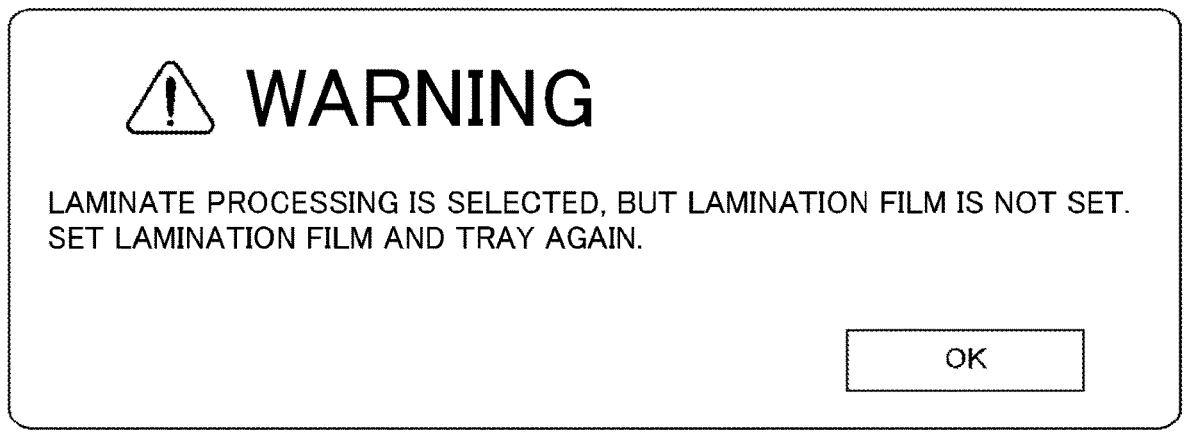
FIG. 77 is a diagram illustrating an error display displayed on an operation panel of an image forming apparatus.
Figure 78:
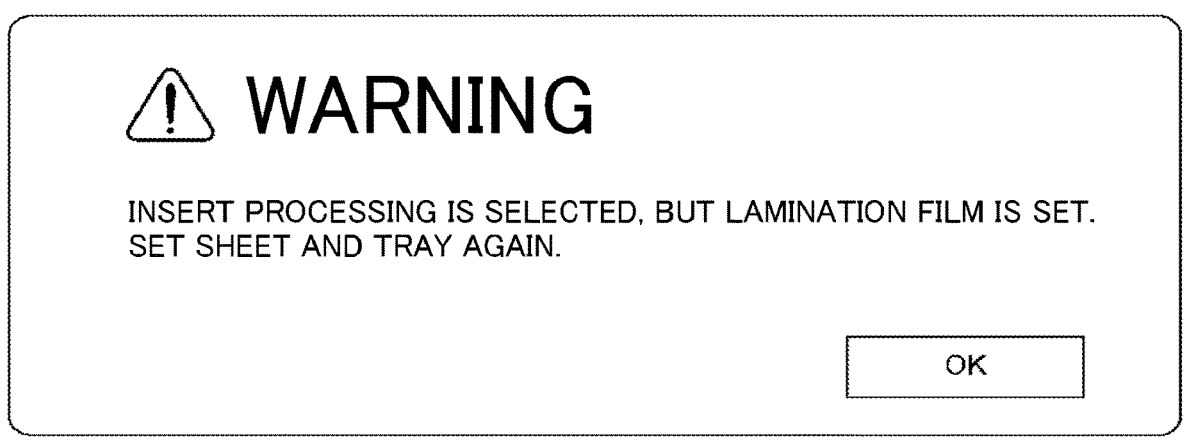
FIG. 78 is a diagram illustrating an error display displayed on an operation panel of an image forming apparatus.

FIGS. 77 and 78 are diagrams illustrating examples of an error display displayed on the operation panel 10 of the image forming apparatus 300. FIG. 77 illustrates an error display in a case where it is determined that the laminate film is not set in a state where the laminate processing is selected. In this example, a message "laminate processing is selected, but no lamination film is set. Set lamination film and try again." is displayed.

FIG. 78 illustrates an error display when it is determined that the lamination film is set with the insert processing selected. In this example, a message "insert processing is selected, but lamination film is set. Set sheet and tray again." is displayed. Thus, the user can check the sheets loaded on the sheet tray 102 according to such error display, reset the sheets, and then start printing again.

Figure 79B:
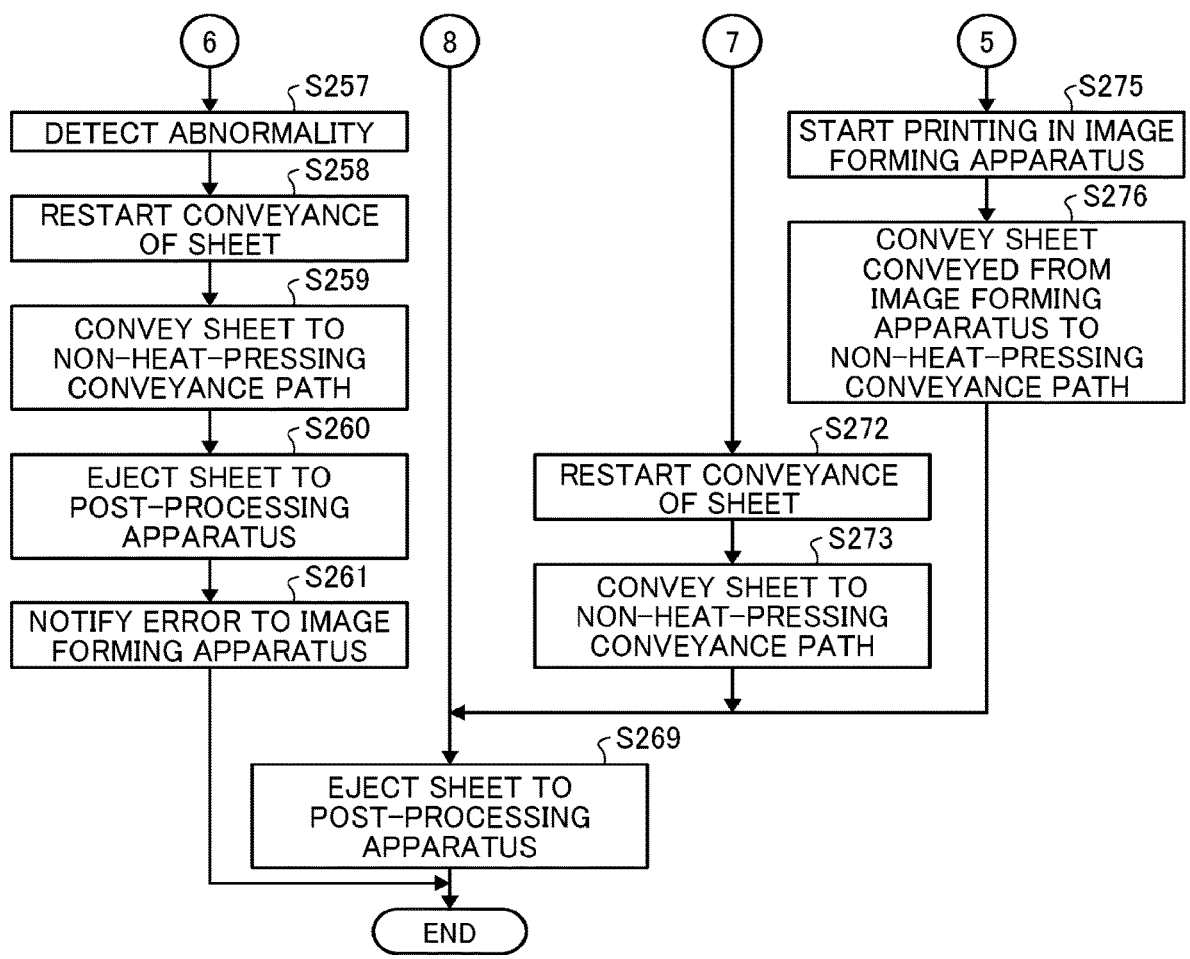

FIGS. 79A and 79B is a flowchart illustrating a series of operations in an image forming system 500 from the selection of the laminate processing or the insert processing to the ejection of a sheet to the post-processing device 600. First, in step S251, when the laminate processing or the insert processing is set on the operation panel 10 of the image forming apparatus 300 (YES in S251), the sheet laminator 200 feeds a sheet from the sheet tray 102 before the image forming apparatus 300 starts the print job (S252).

Next, when the fed sheet reaches the standby position sensor C7 (S253), the sheet laminator 200 stops the sheet conveyance (S254), and the controller 800 determines, with the multi-feed detection sensor C6, whether the conveyed sheet is a lamination film (S255).

When the combination of the set processing and the conveyed sheet does not match (NO in S256), the sheet laminator 200 restarts the sheet conveyance (S258) while determining that it is abnormal (S257), conveys the sheet to the heat-pressed conveyance path 126 (S259), ejects the sheet to the post-processing device 600 (S260), and sends an error notification to the image forming apparatus 300 (S261). Upon receiving the error notification, the image forming apparatus 300 displays an error screen on the operation panel 10.

Alternatively, when the combination of the set processing and the conveyed sheet matches (YES in S256), the set processing is the laminate processing, and the conveyed sheet is a lamination film (YES in S262), the controller 800 of the sheet laminator 200 restarts conveying the sheet (S263), and performs the sheet separating operation described above (S264). After the lamination sheet separating operation is completed (S265), the controller 800 notify a print job start of the image forming apparatus 300 (S266). The sheet laminator 200 inserts an inner sheet P into separated lamination sheet S (S267), conveys the lamination sheet S to the heat-pressing rollers 120 (fixing device Md), and performs the laminate processing (S268). Next, the lamination sheet S is ejected to the post-processing device 600 (S269).

Alternatively, when the combination of the set processing and the conveyed sheet matches (YES in S256), the set processing is the insert processing, and the conveyed sheet is a sheet-shaped medium (sheet of paper) (NO in S262), the sheet laminator 200 notifies the image forming apparatus 300 of the start of the print job (S270). Then, until the number of sheet-shaped media conveyed from the image forming apparatus 300 matches the number set as the insert position (NO in S271), the sheet-shaped medium conveyed from the image forming apparatus 300 is ejected to the post-processing apparatus 600 through the non-heat-pressing conveyance path 126 (S274). When the number of sheet-shaped media conveyed from the image forming apparatus 300 matches the number of sheets set as the insert position (YES in S271), the controller 800 restarts the conveyance of the sheet (S272). The sheet is ejected to the post-processing device 600 (S269) through the heat-pressing conveyance path 126 (S273).

The controller 800 determines whether the selected mode matches the sheet loaded on the sheet tray 102 by the sheet determination process in step S255, and then notifies the image forming apparatus 300 of the start of the print job (S266, S270). Such a configuration can avoid the occurrence of jam inside the image forming apparatus 300 when an error occurs.

Alternatively, when neither the laminate processing nor the insert processing is selected (NO in S251), the printing operation of the image forming apparatus 300 is started (S275). The sheet laminator 200 causes the sheet-shaped medium conveyed from the image forming apparatus 300 to pass through the non-heat-pressing conveyance path 126 (S276) and be ejected to the post-processing apparatus 600 (S269).

As described above, the sheet laminator 200 according to an embodiment of the present disclosure allows insertion sheets I to be loaded and fed from the sheet tray 102 that loads and feeds lamination films are loaded and fed, and thus has the laminate processing mode in which the laminate processing is performed and the insert processing mode in which an insertion sheet I is inserted without performing laminate processing. Accordingly, two functions of an inserter and a laminator can be obtained without adding a connection machine, and a device having these post-processing functions can be downsized. Accordingly, there can be provided a sheet laminator that prevents laminate films from sticking to each other, is compact and easy to use, and has a plurality of post-processing functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. The elements of the above-described embodiments can be modified without departing from the gist of the present disclosure, and can be appropriately determined according to the application form.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A sheet processing device configured to sandwich a sheet-shaped medium in a two-ply sheet in which two sheets are overlaid and partially bonded, the sheet processing device comprising:
   a separator configured to separate the two sheets of the two-ply sheet;
   a conveyor disposed downstream from the separator in a sheet conveyance direction and configured to convey the two-ply sheet; and
   a switching member disposed downstream from the conveyor in the sheet conveyance direction and configured to switch a conveyance path of the two-ply sheet to convey the two-ply sheet to a fixing path on which fixing processing is performed on the two-ply sheet or a non-fixing path on which no fixing processing is performed on the two-ply sheet.

2. The sheet processing device according to claim 1, further comprising circuitry configured to perform:
   a laminate processing mode in which the sheet-shaped medium is sandwiched between the two sheets of the two-ply sheet, the two-ply sheet is conveyed to the fixing path, and laminate processing is performed on the two-ply sheet; and
   a sheet-shaped medium insertion mode in which the sheet-shaped medium is sandwiched between the two sheets and the two-ply sheet is conveyed to the non-fixing path and ejected.

3. The sheet processing device according to claim 1, further comprising an operation panel configured to select whether to convey the two-ply sheet to the fixing path or the non-fixing path.

4. The sheet processing device according to claim 1, further comprising:
   a fixing device disposed on the fixing path;
   a detector configured to detect an abnormality in the fixing device; and
   circuitry configured to control processing of the two-ply sheet according to a detection result of the abnormality.

5. The sheet processing device according to claim 4, wherein when the detector detects the abnormality in the fixing device disposed on the fixing path, the circuitry is configured to cause the conveyor to convey the two-ply sheet to the non-fixing path.

6. The sheet processing device according to claim 4, wherein when the detector detects the abnormality in the fixing device disposed on the fixing path, the circuitry is configured to cause the conveyor to convey the two-ply sheet to the non-fixing path with the sheet-shaped medium inserted in the two-ply sheet.

7. The sheet processing device according to claim 4, wherein when the detector detects the abnormality in the fixing device disposed on the fixing path, the circuitry is configured to cause the conveyor to convey the two-ply sheet and the sheet-shaped medium separately to the non-fixing path.

8. A sheet laminator comprising:
   the sheet processing device according to claim 1; and
   a heat-pressing member configured to heat and press the two-ply sheet.

9. An image forming apparatus comprising the sheet processing device according to claim 1.

10. An image forming system comprising the image forming apparatus according to claim 9.

* * * * *